United States Patent [19]

Stone et al.

[11] Patent Number: 4,628,532

[45] Date of Patent: Dec. 9, 1986

[54] ALPHANUMERIC HANDPRINT RECOGNITION

[75] Inventors: David H. Stone, West Hartford; Leon A. Pintsov, Manchester; Donald P. D'Amato, Avon, all of Conn.

[73] Assignee: Scan Optics, Inc., East Hartford, Conn.

[21] Appl. No.: 513,403

[22] Filed: Jul. 14, 1983

[51] Int. Cl.[4] ............................................. G06K 9/48
[52] U.S. Cl. .......................................... 382/21; 382/25
[58] Field of Search .................................... 382/21–22, 382/25, 60

[56] References Cited

U.S. PATENT DOCUMENTS

| | | | |
|---|---|---|---|
| 3,541,511 | 11/1970 | Genchi et al. | 382/25 |
| 3,766,520 | 10/1973 | Patterson | 382/21 |
| 3,863,218 | 1/1975 | Oka et al. | 382/21 |
| 3,899,771 | 8/1975 | Saraga et al. | 382/21 |
| 4,361,830 | 11/1982 | Honma et al. | 382/25 |

FOREIGN PATENT DOCUMENTS

| | | |
|---|---|---|
| 1106972 | 3/1968 | United Kingdom . |
| 1280155 | 7/1972 | United Kingdom . |
| 1287604 | 9/1972 | United Kingdom . |
| 1320243 | 6/1973 | United Kingdom . |
| 1593665 | 7/1981 | United Kingdom . |

*Primary Examiner*—Leo H. Boudreau

[57] ABSTRACT

The recognition of patterns is accomplished through boundary tracing and subsequent storage of encoded range testable data commensurate with the occurrence, interrelationship and orientation of geometric features on the pattern boundaries. The encoded data is compared with generalized prototypes which define the geometric shape of all probable permutations of all possible patterns to be recognized, a match between the encoded data and a prototype constituting identification of the pattern.

13 Claims, 35 Drawing Figures

FIG. 4

| CHAIN CODE ELEMENT (LOWER 3 BITS) | 2 X 2 DATA ARRAY FROM TRACE MEMORY REFERENCED TO CURRENT POINT | TRACE MEMORY ADDRESS CHANGE | |
|---|---|---|---|
| | | IF WHITE | IF BLACK |
| 0 | X O<br>□ O O | + Y | − Y |
| 1 | X O<br>X O<br>□ | + X, + Y | − Y |
| 2 | O O<br>X O<br>□ | + X | − X |
| 3 | O O<br>X X □ | + X, − Y | − X |
| 4 | O O □<br>O X | − Y | + Y |
| 5 | □<br>O X<br>O X | − X, − Y | + Y |
| 6 | □<br>O X<br>O O | − X | + X |
| 7 | □ X X<br>O O | − X, + Y | + X |

□ = CURRENT POINT IN TRACE MEMORY

O = POINTS IN 2 X 2 ARRAY CHECKED FOR BLACK POINT

X = POINTS IN 2 X 2 ARRAY NOT CHECKED FOR BLACK POINT

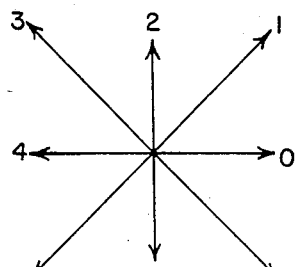

MOVE DIRECTION $$A = 1/2 \sum_{i=1}^{N-1} (\Delta Y_i \delta X_i - \Delta X_i \delta Y_i)$$

$$\Delta X_i = X_i - X_0 = \sum_{j=1}^{i-1} \delta X_i$$

$$\Delta Y_i = Y_i - Y_0 = \sum_{j=1}^{i-1} \delta Y_i$$

$$A = 1 + N/2 - 1$$

$$-I_{lake} = A + N/2 - 1$$

$$I_{segm} = A + N/2 + 1$$

FIG. 9

SPUR (S) A VERY SHARP CONVEXITY WITH PARALLEL SIDES, USUALLY A STROKE ENDING 
STUB (T) A VERY SHARP CONVEXITY WITH SHORTER PARALLEL SIDES 
WEDGE (W) A SHARP CONVEXITY WITH APPROXIMATELY PERPENDICULAR SIDES 
CURL (C) A SHORT, SMOOTH CONVEXITY 
ARC (A) A LONG, SMOOTH CONVEXITY 
NULL (N) A VERY SMALL CONCAVITY 
INLET (I) A SMALL, SHARP CONCAVITY 
BAY (B) A LONG, SMOOTH CONCAVITY 
FIG. 10

5
FIG. 11A
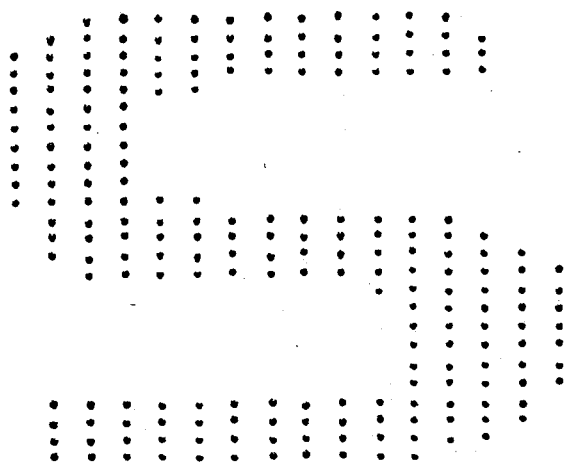
FIG. 11B
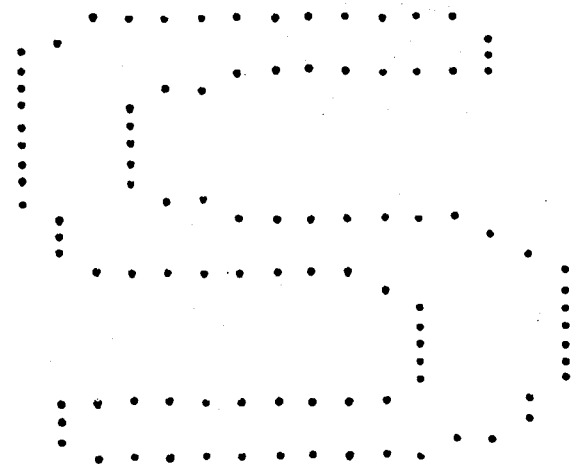
FIG. 11C

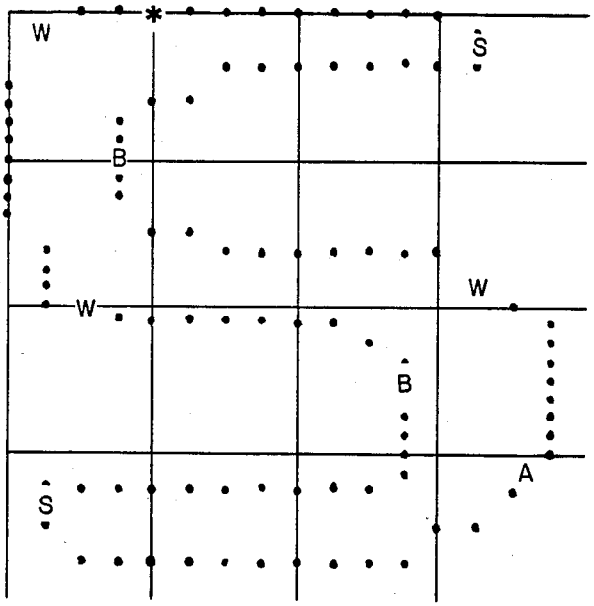

FIG. 15

SEGMENT LEVEL CHECKING TABLE

| LEVEL | LOW EXIT | HIGH EXIT | LOW EXIT MINIMUM LENGTH | LOW EXIT NEXT LEVEL | HIGH EXIT MINIMUM LENGTH | HIGH EXIT NEXT LEVEL |
|---|---|---|---|---|---|---|
| NI | NEGINF | −1 | ------ | ----- | 3 | EO |
| EO | −1 | 2 | INFINITY | NI | INFINITY | PI |
| PI | 3 | 6 | 7 | EO | 7 | P2 |
| P2 | 6 | 14 | 1 | PI | INFINITY | P3 |
| P3 | 7 | INFNTY | 1 | PI | ------ | ----- |

FIG. 12A

LAKE LEVEL CHECKING TABLE

| LEVEL | LOW EXIT | HIGH EXIT | LOW EXIT MINIMUM LENGTH | LOW EXIT NEXT LEVEL | HIGH EXIT MINIMUM LENGTH | HIGH EXIT NEXT LEVEL |
|---|---|---|---|---|---|---|
| NI | NEGINF | −2 | ------ | ----- | 0 | EO |
| EO | −4 | 4 | INFINITY | NI | INFINITY | PI |
| PI | 2 | INFNTY | 2 | EO | ------ | ----- |

FIG. 12B

| LEVEL | ENTRY MMA | EXIT MMA | DURATION | IP TYPE |
|---|---|---|---|---|
| E0 | 2 | 4 | 3 | |
| P1 | 5 | 6 | 2 | |
| P2 | 7 | 10 | 2 | |
| P3 | 11 | 15 | 5 | 3 |
| P1 | 16 | 16 | 1 | |
| E0 | 17 | 17 | 1 | |
| N1 | 20 | 36 | 17 | -1 |
| E0 | 37 | 40 | 2 | |
| P1 | 41 | 42 | 2 | |
| P2 | 43 | 45 | 3 | 2 |
| P1 | 46 | 61 | 14 | 1 |
| E0 | 62 | 65 | 4 | |
| P1 | 66 | 67 | 2 | |
| P2 | 70 | 71 | 2 | |
| P3 | 72 | 76 | 5 | 3 |
| P1 | 77 | 77 | 1 | |
| E0 | 100 | 101 | 2 | |
| N1 | 102 | 117 | 16 | -1 |
| E0 | 120 | 120 | 1 | |
| P1 | 121 | 122 | 2 | |
| P2 | 123 | 125 | 3 | 2 |
| P1 | 126 | 127 | 2 | |
| E0 | 130 | 134 | 5 | |
| P1 | 135 | 136 | 2 | |
| P2 | 137 | 142 | 4 | 2 |
| P1 | 0 | 1 | 2 | |

FIG. 14

| | | |
|---|---|---|
| RUL - IN2 | | ; FLAG TOP, BAR BOTTOM ONE |
| JSL | INITTCT,PC | |
| CSWORD | | |
| WORD | SEGLAK | ;CHECK A SUMMARY WORD |
| WORD | 000377 | ;I SEGMENT AND 0 LAKES |
| WORD | 000001 | |
| BRKNE | | |
| JSL | TESTCNT, PC | |
| CSWORD | | |
| WORD | SOESWO | ; TOTAL, ST/SP, IN/BY |
| WORD | 177767 | |
| WORD | 077567 | ;7 TOTAL, 3-4 ST/SP, 3 IN/BA |
| BRKNE | | |
| JSL | TESTCNT,PC | |
| CLOKAL | | |
| WORD | 7 | ; 7 FEATURES DESIRED |
| WORD | 047547 | ; WD,ST,SP,X23,YO,NE,N,NW |
| WORD | 004147 | |
| WORD | 061567 | ; IN,BY,X23,Y23,E,NE,N |
| WORD | 001560 | |
| WORD | 033757 | ; ST,SP,X3,Y3,SE,E,NE |
| WORD | 003757 | |
| WORD | 033757 | ;ST,SP X0,Y3,NW,W,SW |
| WORD | 033714 | |
| WORD | 015667 | ;IN,3Y,X12,Y23,N,NW,W, |
| WORD | 015460 | |
| WORD | 063227 | ; IN,BY,X012, Yo,W,SW,S |
| WORD | 060020 | |
| WORD | 063317 | ;ST,SP,X0I,Y0I,W.SW.S |
| WORD | 060017 | |
| BRKNE | | |
| JSL | TESTCNT,PC | |
| JMP | CORRECT | |

FIG. 20

CHARACTER N
FEATURE LIST

1. BAY   X0 Y1 S
2. SPUR  X0 Y3 S
3. SPUR  X0 Y0 N
4. BAY   X3 Y3 N
5. SPUR  X3 Y0 N
6. SPUR  X3 Y3 S

|    |          |       |       |              |
|----|----------|-------|-------|--------------|
| 1  | S(T)     | X23   | Y23   | E,SE,S       |
| 2  | S(T)     | X0123 | Y0123 | ANY          |
| 3  | B        | X0123 | Y12   | SE,S,SW      |
| 4  | S(T)     | X0123 | Y0123 | ANY          |
| 5  | S(T)     | X01   | Y23   | SE,S,SW      |
| 6  | DUMMY    |       |       |              |
| 7  | CONVEX   | X01   | Y0    | SW,W,NW,N    |
| 8  | B(I)     | X0123 | Y01   | NW,N,NE      |
| 9  | A(C,W)   | X23   | Y01   | NE,E,SE      |
| 10 | S(T)     | X0123 | Y0123 | ANY          |
| 11 | B(I)     | X0123 | Y12   | NE,E,SE,     |
| 12 | S(T,W,C) | X123  | Y123  | NE,E,SE      |

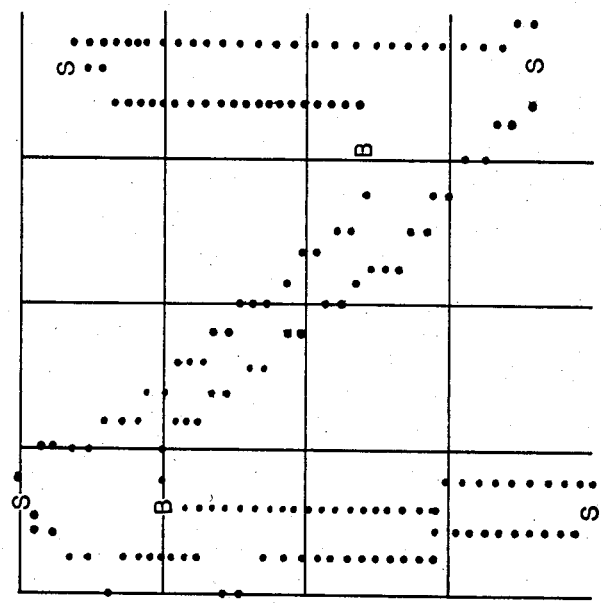
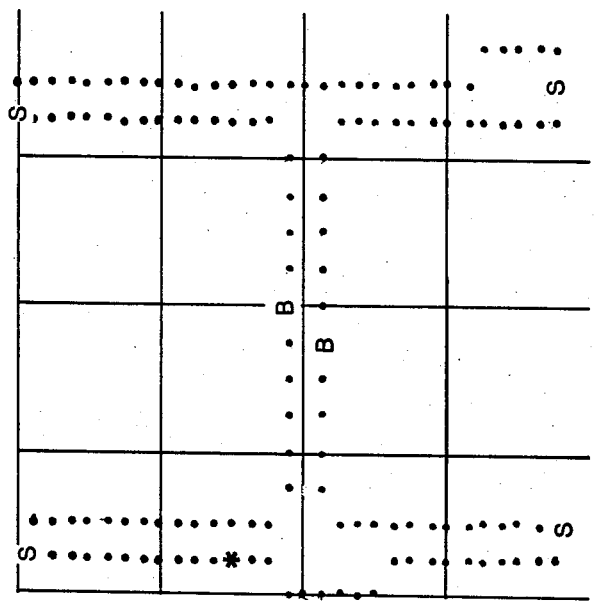
FIG. 26

FIG. 27
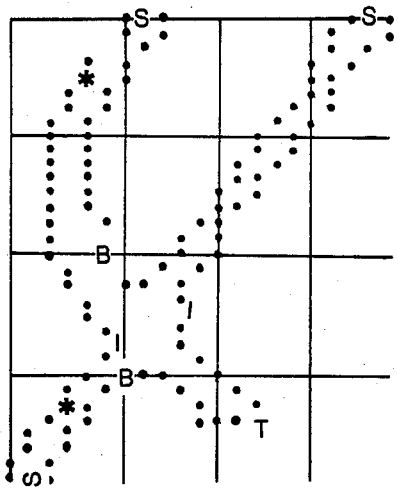
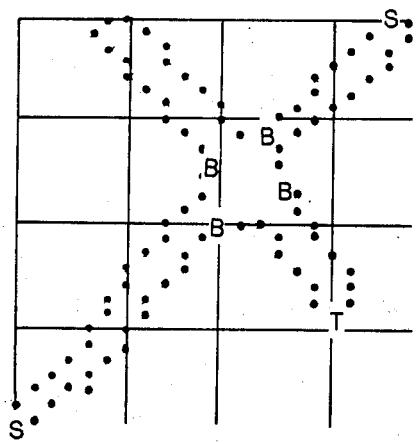
CHARACTER Y
FEATURE LIST
1. SP X1 Y0 NE
2. BAY X0 Y1 NE
3. SP X3 Y0 NE
4. INL X1 Y2 E
5. ST X2 Y3 SE
6. BAY X1 Y2 S
7. SP X0 Y3 S
8. INL X0 Y2 W
CHARACTER X
FEATURE LIST
1. SP X0 Y0 NW
2. BAY X2 Y1 N
3. SP X3 Y0 NE
4. BAY X2 Y1 E
5. ST X2 Y2 SE
6. BAY X1 Y2 S
7. SP X0 Y3 SW
8. BAY X1 Y1 W

ALPHANUMERIC HANDPRINT RECOGNITION

BACKGROUND OF THE INVENTION

(1) Field of the Invention

The present invention relates to the identification of objects and the like which may be converted into two dimensional binary representations for purposes of such identification and particularly to the machine identification of data such as hand printed characters. More specifically, this invention is directed to optical recognition apparatus and especially to character recognition apparatus which may read hand printed alphanumeric characters at high speed and with a high degree of accuracy. Accordingly, the general objects of the present invention are to provide novel and improved methods and apparatus for such character recognition.

(2) Description of the Prior Art

Optical character recognition systems are known in the prior art. Examples of such prior art systems may be seen from U.S. Pat. Nos. 3,159,815, 3,196,398, 3,303,465, 3,417,372, 3,541,511, 3,609,685, 3,629,828, 3,723,970, 3,737,855, 3,766,520, and 4,097,847. Character recognition systems have evolved from those which could identify only machine printed letters and numerals to systems which have the capability of identifying, with an acceptably high degree of accuracy, hand written characters appearing within pre-selected fields. However, for reasons which will be briefly discussed below, those prior systems which had the capability of recognizing alphanumeric hand printed characters have not previously achieved commercial success.

A practical commercial system for the recognition of hand printed characters must meet two somewhat contradictory requirements. Thus, the rejection and substitution rates must be very low for data of the quality typically encountered in the optical character reading environment. However, in order to justify the comparative high cost of such equipment, a hand printed character reading system must have a high data throughput rate. In the prior art, the performance of equipment designed to recognize hand printed characters degraded rapidly as the quality of the data became poorer. While there have previously been comparatively uncomplicated systems which had the capability of reading excellent quality data at high speed, such systems were characterized by a rapid increase in the rejection and substitution rates as the data quality decreased. Those complex character reading systems that have had the ability to analyze poor quality data, particularly to analyze the subtle shape distinctions in certain conflict pairs, have been characterized by a data throughput rate which was too slow for commercial application.

SUMMARY OF THE INVENTION

The present invention overcomes the above-briefly discussed and other deficiencies and disadvantages of the prior art by providing a novel and improved technique, which is particularly well-suited for the recognition of alphanumeric hand printed characters, characterized by exceedingly low rejection and substitution rates and high data throughput rate. The invention uses a structural syntactic pattern recognition technique to achieve the requisite high operational speed for high quality data while being able to analyze input information in-depth with only a moderate reduction in operational speed when data quality decreases. Apparatus in accordance with the invention is comprised of high speed dedicated logic which is used for those parts of the recognition algorithm which are performed frequently and detailed programmed logic for the less frequently needed complex analysis such as that specific to a single character prototype.

In accordance with the present invention, input data obtained from a conventional image sensor is serially subjected to two stages of pre-processing. This pre-processing is comprised of boundary tracing followed by feature extraction. During boundary tracing, the periphery of a character or image of an object, which has been read and stored in memory, is traced. Information in the form of "move" vectors or chain codes, which indicate directional changes between points on the periphery is obtained during tracing and is stored in a "chain code" memory. Feature extraction is the process of analyzing the data in the "chain code" memory to determine the presence of pre-defined geometrical features on the boundary of any segment (or piece) of an image, for example the image of a character. In accordance with a preferred embodiment of the invention, which is employed to identify hand printed characters, eight pre-defined geometric features are utilized and the position within the "character box" and the direction of each feature are identifiable attributes of interest. Feature extraction is itself a two-step process. In the first step, the boundary trace data in the chain code memory is searched for regions of significant convex or concave curvature and points on the periphery of the character are identified as "points of interest" if they meet pre-determined conditions. Thereafter, these "points of interest" are catagorized by feature type. The feature extraction logic also calculates the area of a closed trace boundary or trace sector, the approximate distance between a pair of points on a boundary, the relative and absolute positions of points within a rectangle, the direction of boundary curvature about a point on the boundary and the approximate area of deviation from a straight line. The feature extraction process may also locate a point along a pre-determined section of boundary closest to some other defined point and calculate the approximate distance to that point. The information obtained by pre-processing is encoded and stored in the form of summary words. Thus, after boundary tracing and feature extraction, a character is represented by one or more summary word lists. The number of summary words in a list depends upon the complexity of the character.

The next step in accordance with the present invention is a classification process wherein the summary words are compared with stored prototypes in a series of tests which are performed at high speed. A particular combination of tests for any one prototype character may be referred to as a "rule". As a result of testing by "rules", the character may be accepted or passed to the next rule which represents another prototype. Characters which are not accepted by any prototype are rejected. Since the information which represents the character being read is stored in a short and convenient form, it is suitable for repetitive testing and, since each prototype can be easily described, the classification procedure is reduced to a number of standardized tests which can be carried out with high speed.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 4 is a "move" table which indicates the steps which will be recognized by the apparatus of FIG. 1 during the tracing of a character;

FIG. 9 is a representation of the technique of searching for "lakes" and segments which will be employed in conjunction with the boundary tracing procedure;

FIG. 10 is a representation of the geometric features which may be identified by the present invention and subsequently used to determine characters.

FIGS. 11A, 11B and 11C are respectively an example character read by the apparatus of FIG. 1, the line memory image of that character and the boundary trace of that character.

FIGS. 12A and 12B are level checking tables which are utilized by the feature extraction logic of the apparatus of FIG. 1;

FIG. 14 is a tabulation of data from the plot of FIG. 13;

FIG. 15 depicts the location and type of each feature on the character trace of FIG. 11C;

FIG. 20 is a code for the rule of FIG. 19;

FIG. 26 is an example of two potentially conflicting characters and

FIG. 27 is an example of two further potentially conflicting characters.

DESCRIPTION OF THE DISCLOSED EMBODIMENT

Figure 1:
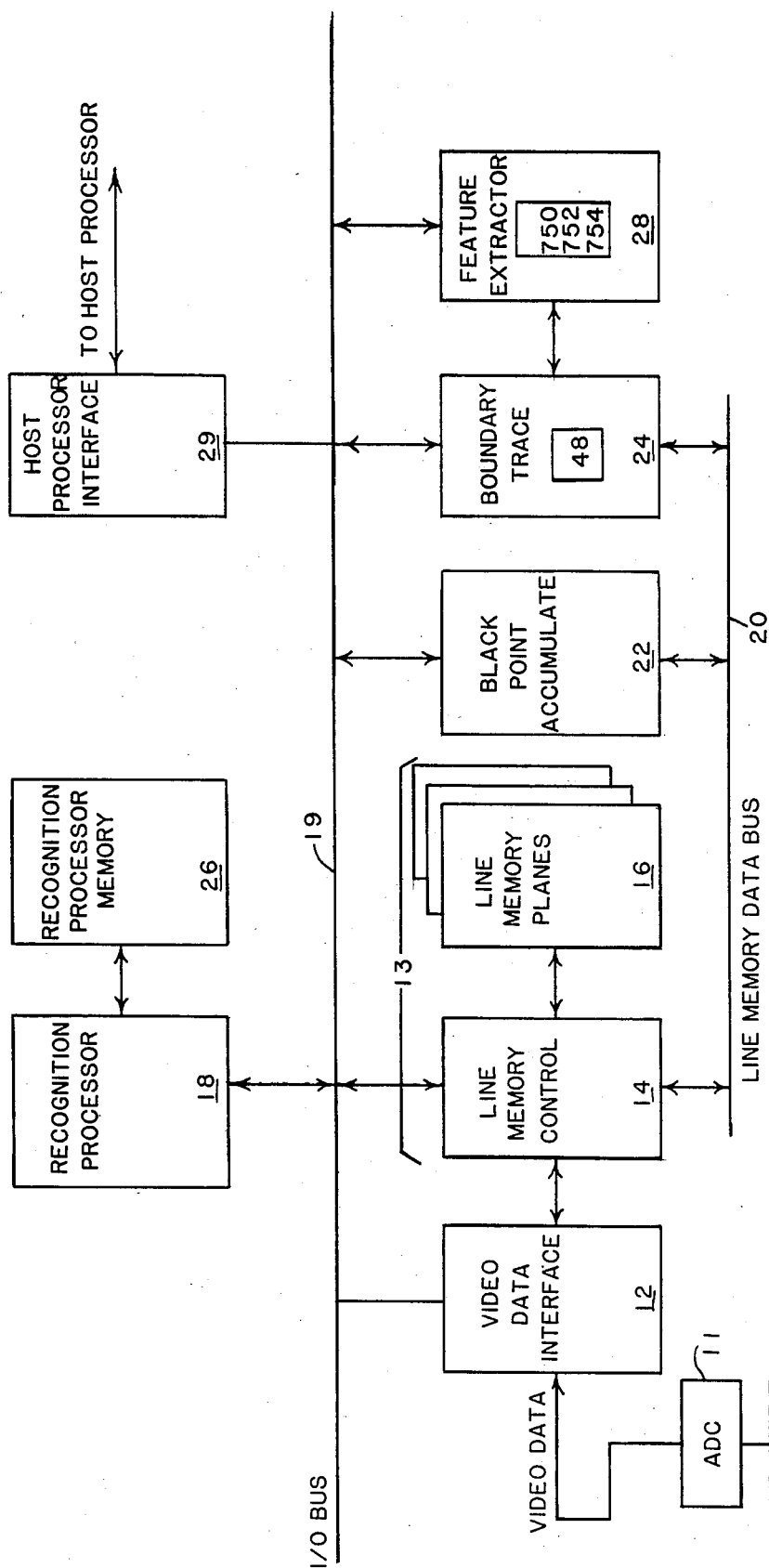
FIG. 1 is a block diagram of apparatus in accordance with a first embodiment of the present invention.
Figure 2:
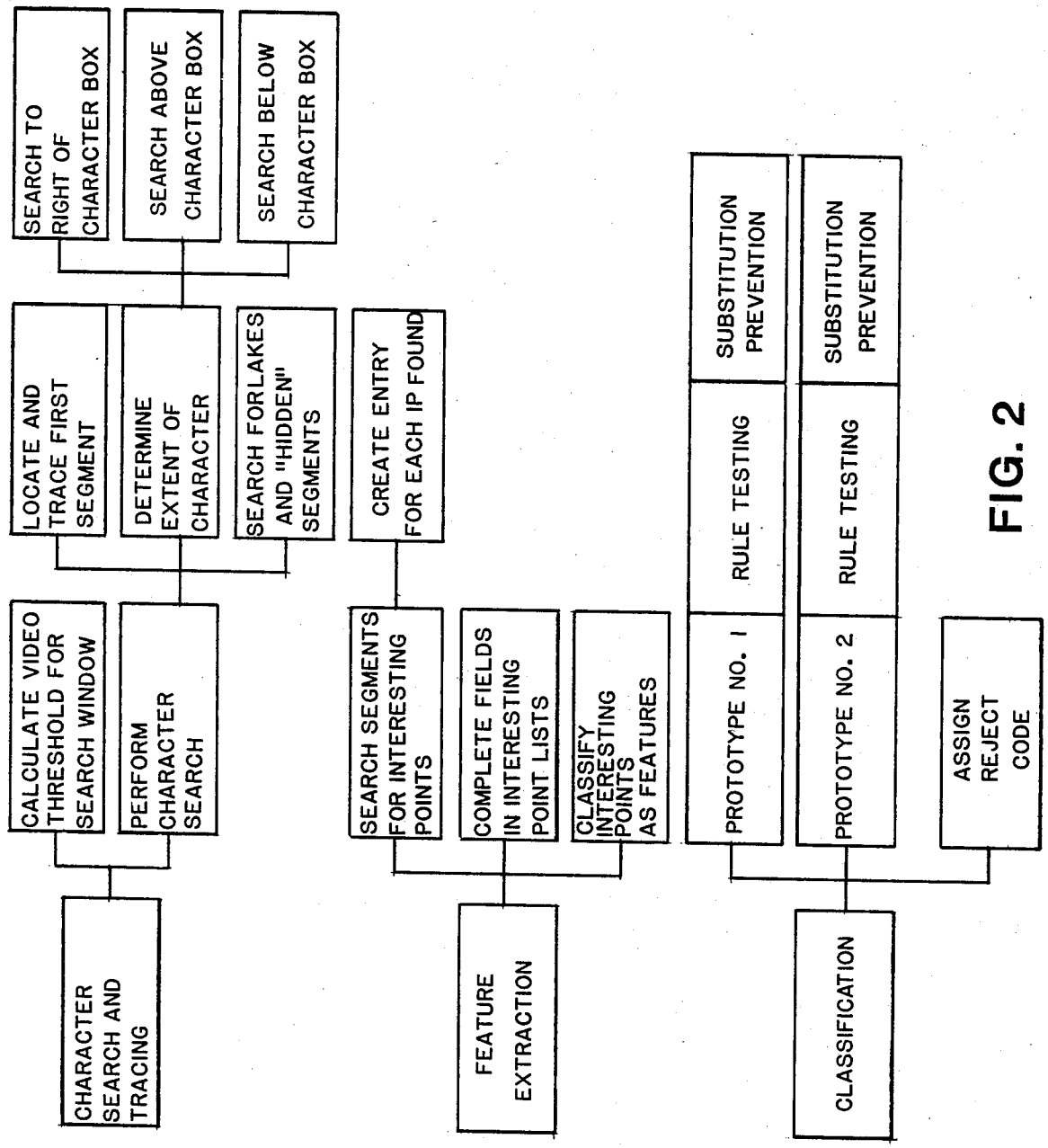
FIG. 2 is a flow chart which depicts the various operations performed on inputted data employing the embodiment of FIG. 1.

With reference to FIG. 1, an optical character reader in accordance with the present invention is depicted in general block diagram form. Printed data is acquired, from within the boundary of a read area on a document, by means of an image sensor 10. The image sensor 10 will typically comprise either a charge coupled-type device or an image dissector tube. In accordance with one reduction to practice of the invention, the spatial resolution selected was 144 points per inch on both the x and y axes. The image sensor 10 will "read" a preselected portion of a document transported into registration with the sensor, the portion of the document being of appropriate size so as to permit the accumulation of sufficient data to completely surround a character or plural characters.

Image sensor 10 will provide an analog signal commensurate with the contrast variations in the portion of the document which is "read". This analog data is digitized in an analog-to-digital convertor 11. The output of convertor 11 will typically consist of grey scale information commensurate with eight pre-selected levels of darkness, i.e., to three bits of precision. Convertor 11 may, if necessary or desirable, provide compensation for variations in paper contrast, ambient lighting conditions, etc.

The digitized data provided at the output of convertor 11 is delivered, via a video data interface 12, to a dynamic random access data storage system 13 comprised of a line memory control 14 and a plurality of line memory planes 16. The video data interface 12 organizes and controls the writing of data to line memory 13 in response to commands provided by a recognition processor 18 via input/output bus 19. These commands include the "reset" and "start" commands for the interface and address information, specifically the absolute "page" coordinates of the data being loaded into the memory 13. These "page" coordinates will be a function of where within that portion of the document being "read" the information commensurate with the digital data being processed was located. Recognition processor 18 also provides the line memory coordinates where the captured and digitized data will be stored in the line memory planes.

The dynamic random access memory 13 will, as noted, comprise a "line memory" which may be of the type described in U.S. Pat. No. 4,120,049. The controller 14 is a dual port device whereby it may be controlled over input/output bus 19 or over a line memory bus 20. Controller 14 may also be controlled by interrace 12. Controller 14 includes memory coordinate circuitry for translating the line memory coordinates, which comprise the address information received from interface 12 and via busses 19 and 20, to memory plane addresses whereupon the digitized data is stored in such a manner that it may be read out of memory 13 in parallel fashion, and in 4×4 modules for example, in response to readout commands provided over bus 19 by processor 18 or over bus 20 in the manner to be described below. The line memory 13 includes a "wrap-around" feature in the y coordinate. Thus, memory 13 may function as a memory which appears to be much larger in the y direction than it actually is. The data stored in the line memory may be read by the recognition processor 18, a black point accumulator 22 and boundary trace logic 24. A sequence of threshold levels based upon the frequency of occurrence of the various grey levels within an image is experimentally predetermined. The threshold level results in the data read from the line memory planes 18 being commensurate with a black/white image of the data outputted by the image sensor 10, i.e., all data read out of the line memory planes will be classified as either being above or below the calculated threshold level. These black/white "images" will be defined by bits or points.

The black point accumulator 22 comprises sequencer driven logic, accumulator and "comparator" PROM's which, in response to commands from processor 18 and on a per character basis, accumulate black points over a determined area. The black point accumulator 22 and the boundary trace logic 24 will, in the disclosed embodiment, singly read the data stored in the line memory planes 16. The sequence in which the data stored in the line memory is analyzed will be controlled by recognition processor 18. By way of example, the read-out of the line memory may be switched from the boundary trace logic 24 to accumulator 22 when the boundary trace logic 24 completes a segment trace. The boundary trace logic 24, in receipt of a command to start tracing the boundary of a segment or lake of a character starting at the coordinates, i.e., the memory address where a white-to-black or black-to-white transition occurred, in the manner to be described below, will trace the boundary of the segment or "lake" of the character on which the transition occurred. When the boundary of the segment or lake has been completely traced, as indicated by a return to reading the line memory address from which the trace started, the recognition processor 18 in conjunction with accumulator 22 will perform certain tests which determine whether the character's boundary has been completely traced, i.e., tests will be performed to determine whether there may be unconnected segments and/or "lakes" which were missed during the initial boundary trace. The black point accumulator 22 and the boundary trace logic 24 will be described in greater detail below.

The recognition processor 18 comprises a microprogrammable general purpose microcomputer which includes a memory 26. The program for communicating with a host data processor is stored in the ROM portion of memory 26 while the character recognition algorithm and programs are stored in the RAM portion of memory 26.

An optical character reader in accordance with the present invention further comprises dedicated logic 28, which aids feature extraction from the boundary trace data, and a host processor interface 29. The feature extraction logic 28 receives and temporarily stores "move" data, i.e., chain codes, generated by the boundary trace logic 24. Feature extraction logic 28 is connected to the input/output bus 19 and controlled by recognition processor 18. Information resulting from a plurality of specific calculations performed on the chain codes are outputted from feature extraction logic 28. This information is used by processor 18 to determine the summary words which define characters.

Before describing the construction and operation of the black point accumulator 22, boundary trace logic 24 and feature extraction logic 28 in detail, the function of each of these sub-systems will be further described. The present invention employs a structural pattern recognition technique, i.e., the structure associated with a pattern will be determined, encoded and then employed to identify that pattern. Further in accordance with the present invention, this encoding and identification will be performed at a high rate of speed. More specifically, each character the system must recognize will be defined by a compact description of its boundary and certain of its topological characteristics, such as lakes and segments, The presence or absence of the boundary defining features on the boundary and topological characteristics is ascertained by a sequential testing procedure.

In accordance with the present invention, in order to generate the requisite compact description of the character boundary and topological characteristics, two stages of pre-processing of the digitized data stored in the line memory planes 16 is employed. These two stages of pre-processing comprise boundary tracing, in the boundary trace logic 24, and feature extraction, obtained from the results of calculations performed in the feature extraction logic 28. The information obtained by this pre-processing is coded and stored in recognitio processor memory 26 as a compact list of sixteen-bit "summary" words. Thus, after pre-processing, an input character will be represented by one or more summary word lists, with the number of summary words in a list depending on the complexity of the character. The classification procedure, which is performed by the recognition processor 18, comprises the matching of the summary word lists commensurate with the input character against a series of stored prototypes. This matching, and further testing as necessary to recognize certain difficult patterns, will be discussed in greater detail below.

Character tracing constitutes the process of location of all of the disconnected segments and included "lakes" of a character. As employed herein, the term "segment" refers to an area enclosed by a single, closed, continuous exterior trace and includes strokes, i.e., lines, and dots. A "lake" is an area enclosed by a single, closed, continuous interior trace. A lake is always contained within a segment. In order to fully describe the boundary of the character, each of its segments and lakes must be found and its boundary traced. In accordance with the present invention a chain-code technique of boundary encoding is employed, i.e., an eight-direction chain-code is utilized, and the boundary trace logic 24 thus provides a series of chain-code sequences that fully describe the boundary of the character to the feature extraction logic 28.

In accordance with the present invention, eight geometrical features are defined and the boundary of every segment or lake is searched for the presence of these pre-defined features. The first step in this boundary analysis is a curvature search for "interesting" points to identify those points on the boundary with the highest curvature within each region of curvature. The curvature value can be either positive, for convex curvature, or low, i.e., negative, for concave curvature over the region. Each "interesting" point is characterized as one of the eight feature types and a direction and position will be associated with each feature. Eight directions and sixteen positions are possible for each feature. In order to facilitate the identification of the features and to determine their relationship to each other, feature extraction logic 28 outputs the results of several calculations.

In order for the boundary trace logic 24 to perform a trace, a suitable black point on the periphery of the trace must be located first. This is accomplished by processor 18 with the assistance of the black point accumulator 22. A segment search window is divided into a series of columns, which may be four-bits wide for example, which are examined from left to right. If a column is found to contain at least a pre-selected number of black points, as accumulated by accumulator 22, line memory data within that column is examined by processor 18, from top to bottom, to locate a black-to-white or a white-to-black transition. The coordinates of the black point at the transition and the direction of the transition, i.e., the direction in which the examination was progressing when the transition was detected, are delivered to boundary trace logic 24 and the tracing of the boundary of the character will begin.

Figure 3:
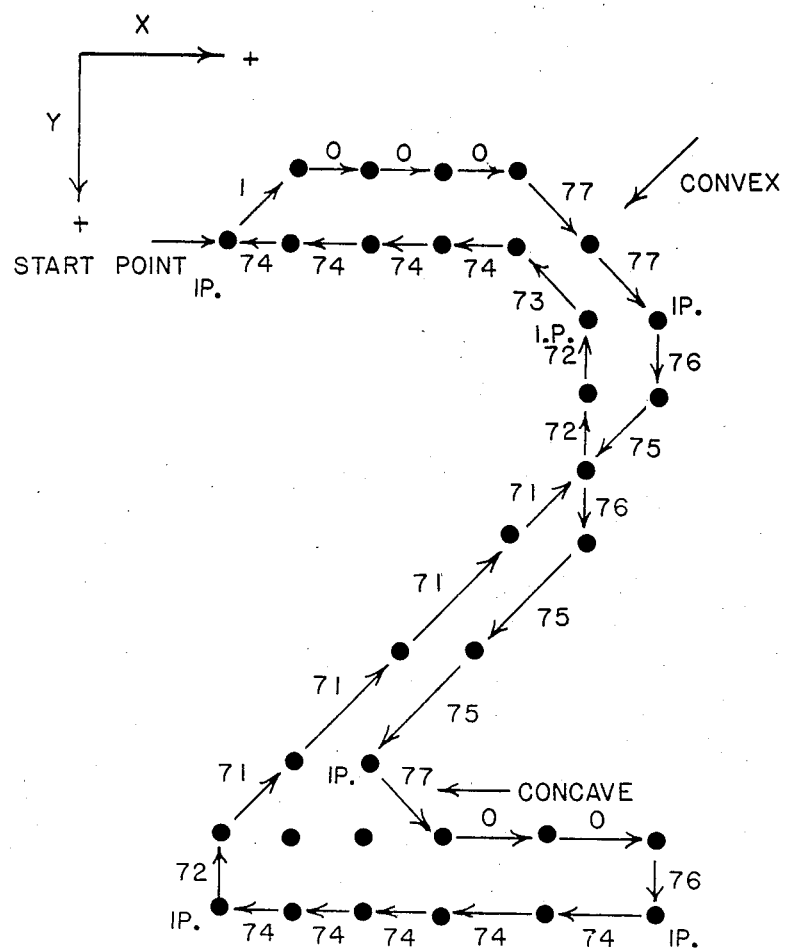
FIG. 3 is a representation of a stored character as read from the line memory of the apparatus of FIG. 1, FIG. 3 indicating the values of the "moves" made in tracing the boundary of a character.

The boundary tracing process consists of following the periphery of all of the segments and lakes of a character. As each black point on the periphery is found the direction from the previous point is recorded as a "move" or chain code element. Thus, the trace information, which will be stored in chain code memories 750, 752, or 754 which comprises part of feature extraction logic 28, will consist of "move" vectors, i.e., chain code elements, which indicate the direction between adjacent black points on the periphery of the character segments and lakes. FIG. 3 shows an example trace of a hand printed character, the coordinate convention used in line memory 13 being shown at the upper left corner. The arrows between the black points indicate moves required to get from one black point to the next and are a vector representation of the chain code elements. Each of these moves is coded as a two digit octal, i.e., a six bit number, which comprises the chain code element. The chain code elements are determined by finding the next black point on a segment boundary moving in the clockwise direction and using the changes in x and y to form the chain code element in accordance with the convention of a "hyper" move vector system. All vectors in this system have unity magnitude and one of eight directions (see FIG. 4), the six-bit direction information allowing rotation of more than 360°. The chain code elements are initialized to a value between zero and seven which is dependent upon the search direction. From this point the chain code elements will have a negative net change of octal −10 as the trace proceeds clockwise around the exterior of a segment and a net change of octal +10 for an interior trace which is performed in the counter-clockwise direction. The chain code element information for a "2" is depicted in FIG. 3. It is to be noted that the chain code elements become more negative as a convex section of the character is traced and become more positive as a concave section is traced. The most significant bit of the 6-bit hypermove code is to be interpreted as a sign bit.

Since the data commensurate with the characters to be recognized is stored in the line memory planes 16, the line memory must be accessed and this is accomplished via the line memory bus 20. The boundary trace logic 24 can increment and decrement, via line memory control 14, the line memory read addresses, request read cycles and read data by means of bus 20. Rather than attempt to trace the data directly in the line memory planes 16 of memory 13, small sections of data are read from the line memory into a boundary trace memory 48 in boundary trace logic 24. The trace memory 48 will typically comprise an 8×8 array which will hold four 4×4 sections of data read from the line memory. A limit boundary, established within the trace memory 48, is located such that if the trace crosses this limit boundary, indicating that the trace is moving toward the edge of the trace memory, the boundary trace logic 24 will read additional data from line memory planes 16, in the direction the trace is moving, into memory 48.

To explain the foregoing in somewhat more detail, after the recognition processor has defined a start point utilizing data from the black point accumulator 22 and initialized the boundary trace logic, the boundary trace logic will load trace memory 48 and the trace will begin in the clockwise direction, i.e., white to the left and black to the right moving along the trace direction. If the boundary in trace memory 48 is crossed the trace will stop and the boundary trace logic 24 will shift current data in the trace memory and load additional data from the line memory into the trace memory to thereby enable the trace process to continue. By way of example, if the trace is moving to the right and the right limit boundary is crossed, logic 24 will then move the right-half of its trace memory into the left half. Next, two 4×4 words will be read from the line memory into the now clear right-half of the trace memory 48. Tracing will then resume until the boundary is crossed again. If the trace crosses the boundary on a diagonal, for example moving downwardly and to the right, the lower right quadrant of the trace memory will be transferred to the upper left quadrant and three 4×4 words will be accessed from the line memory to refill the trace memory. In this manner the entire boundary of the character segment which comprises the black point which has been initially located will be traced. This process has the advantage of requiring a small memory for the tracing process. Also, the above-described process becomes more efficient as the size of the character increases because only the data of interest is accessed from the line memory.

The boundary trace logic 24 implements a tracing algorithm which will follow black points on the periphery of a pattern. This algorithm looks at data around a reference point, the reference point being the last traced black point. The data search sequence is controlled by trace controller 66 of FIG. 5 and is further described below. When a new black point is found the trace memory 48 address is relocated so that the new black point becomes the reference point and the tracing algorithm will then operate to find the next black point. The chain-code sequences delivered to the feature extraction logic 28 from boundary trace logic 24, as explained above, comprise 6-bit chain code elements.

Figure 5:
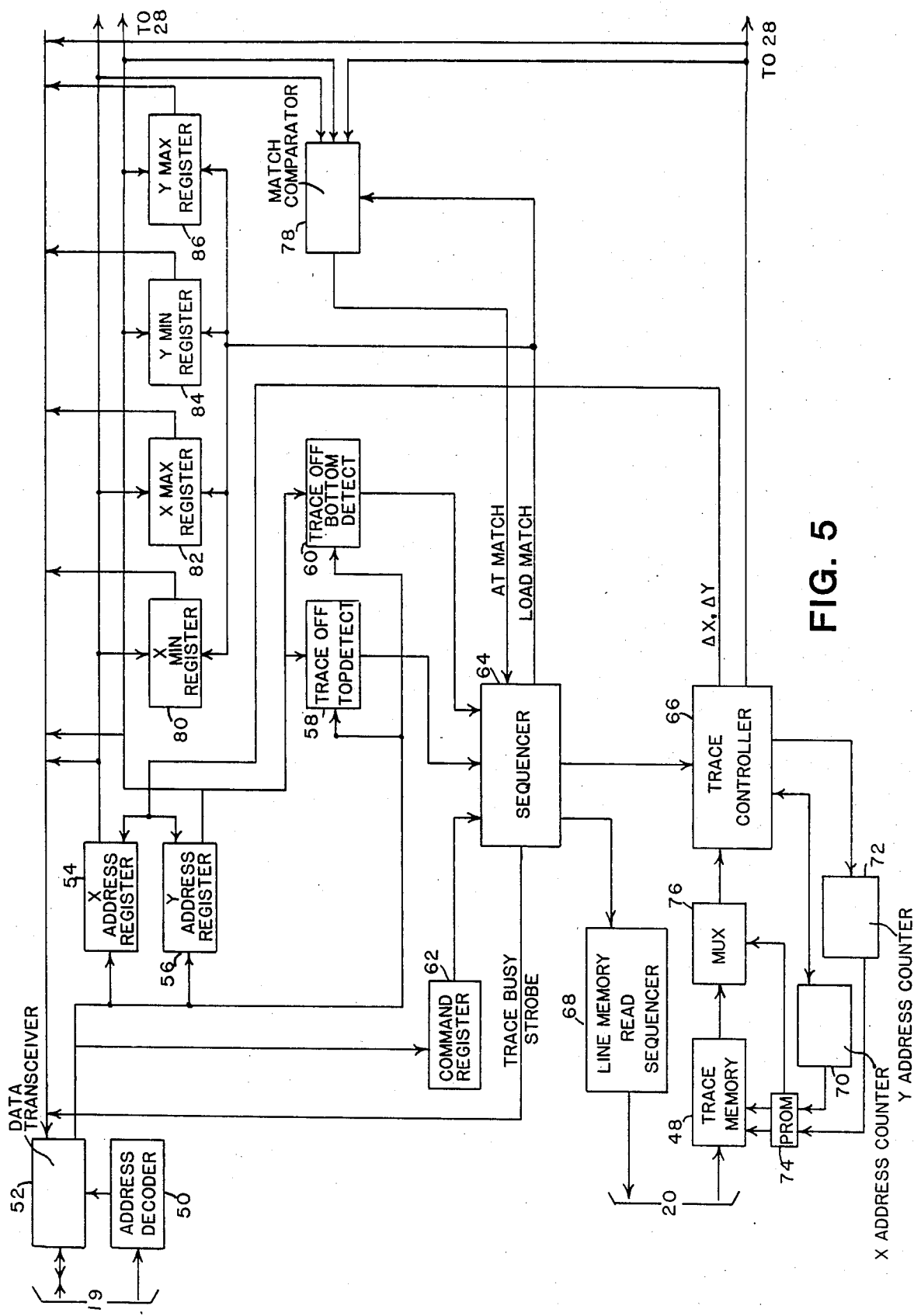
FIG. 5 is a functional block diagram of the boundary trace logic of the apparatus of FIG. 1.
Figures 1, 6:
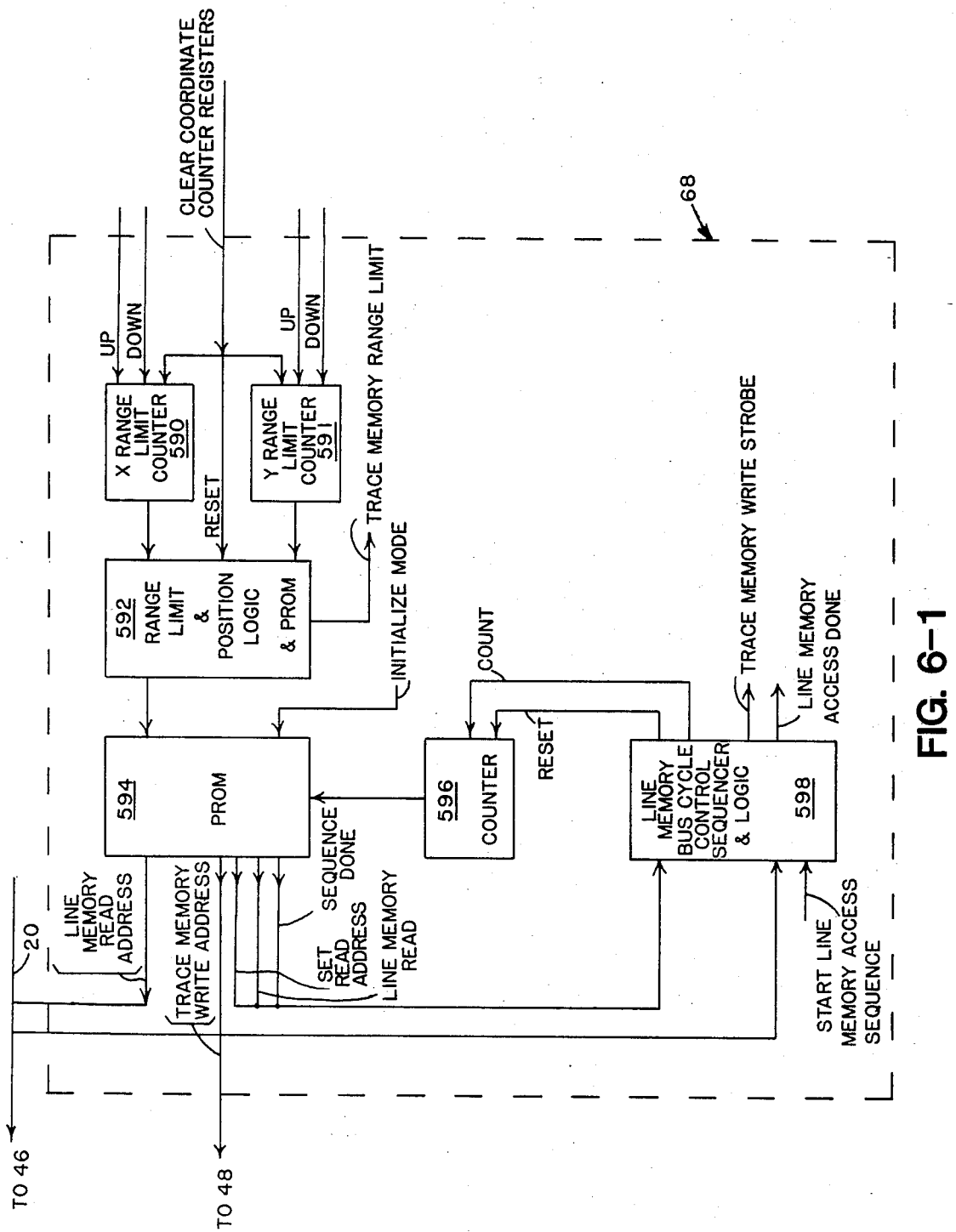
FIG. 6 is a functional block diagram of the trace controller and line memory read sequencer of the circuitry depicted in FIG. 5.
Figures 2, 6:
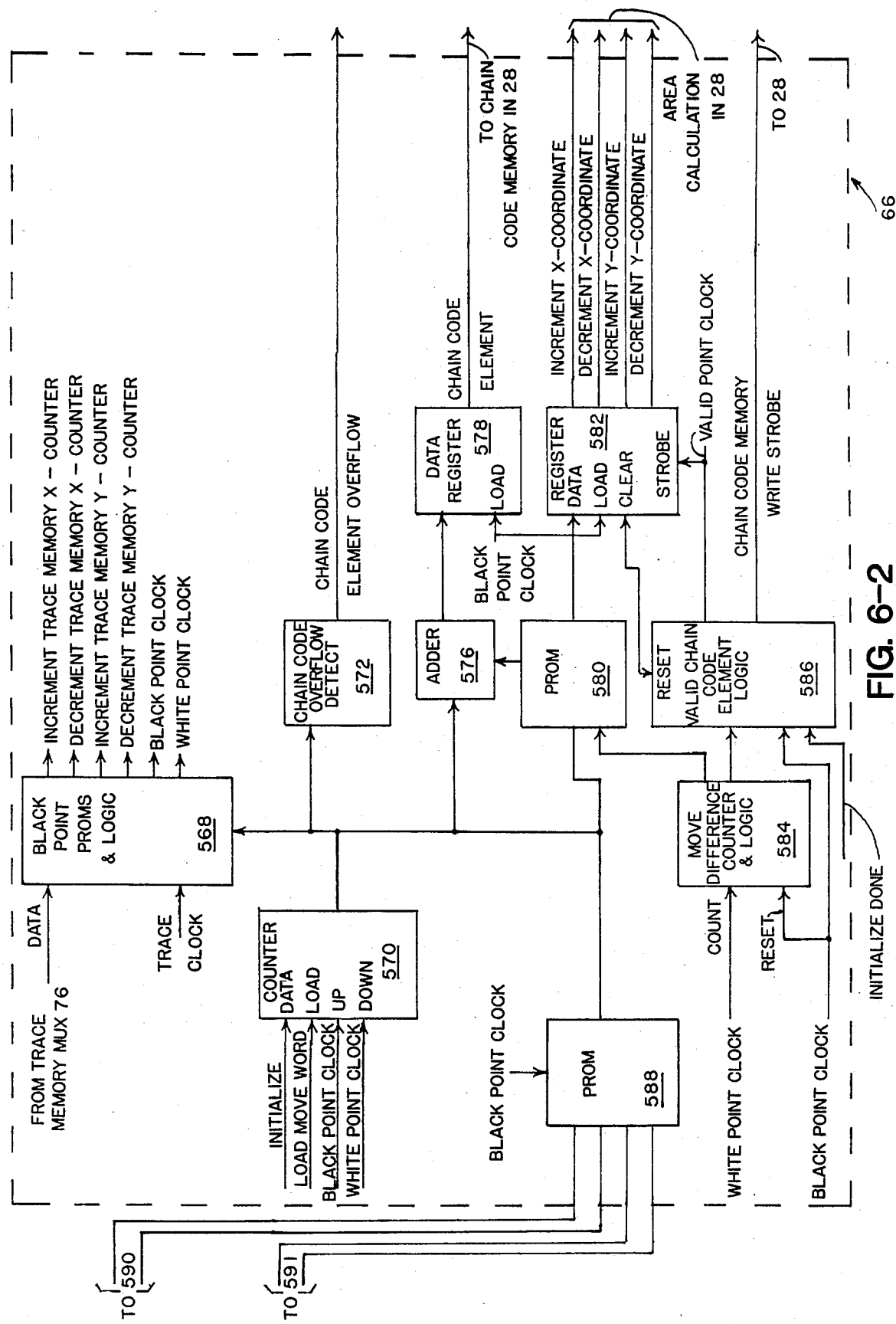
Figure 7:
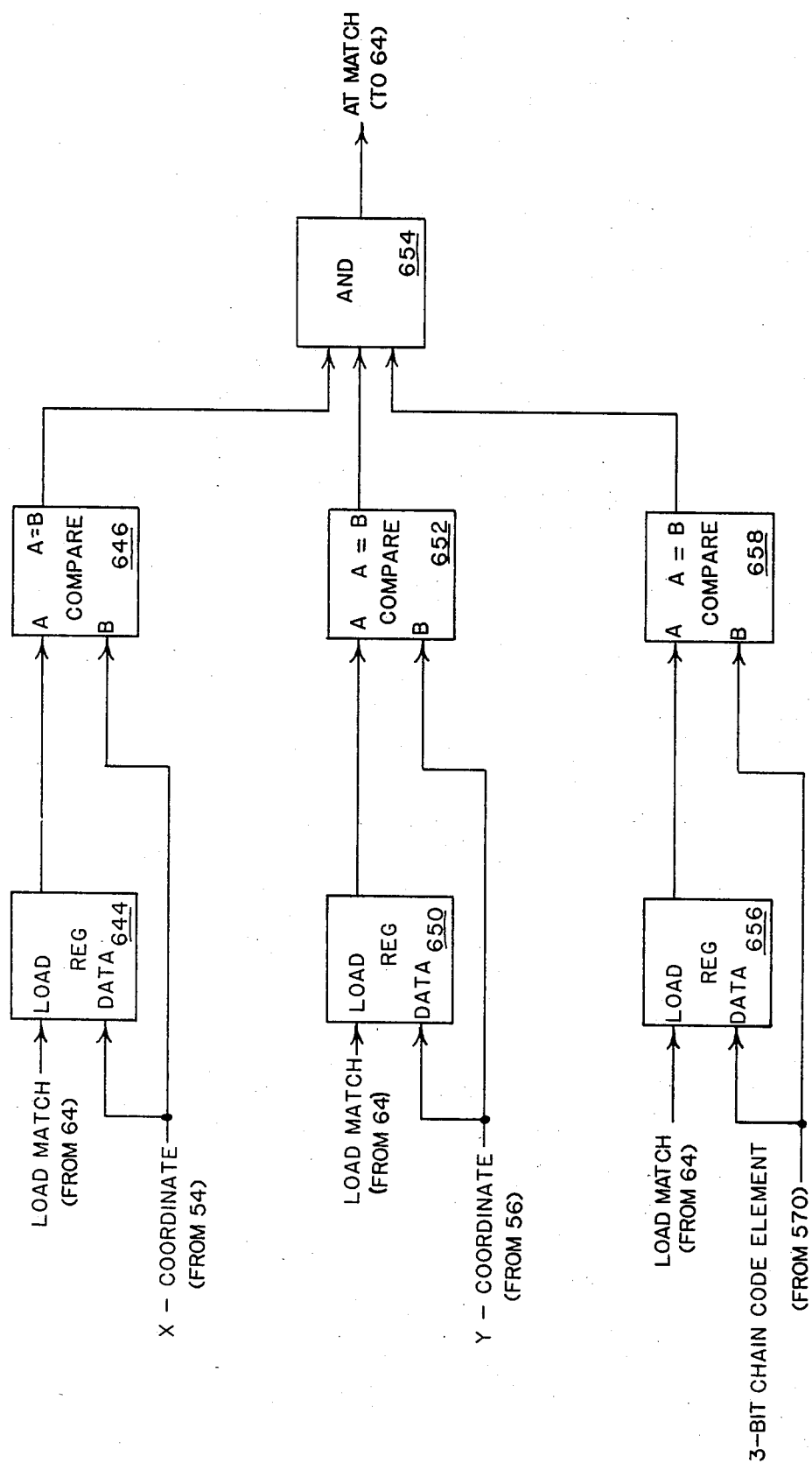
FIG. 7 is a functional block diagram of the match comparator of the circuitry of FIG. 5.

Referring now to FIG. 5, the boundary trace logic 24 is depicted in a functional block diagram. Operation of the boundary trace logic is initiated by commands received, via input/output bus 19, from the recognition processor 18. The information received includes an enabling signal, delivered to an address decoder 50, and data which comprises the address in the line memory 13 of the initial black point on the previously determined white-to-black or black-to-white transition. This transition point address data is supplied to a data transceiver 52. The address decoder 50, which includes a bus cycle logic and timing circuit, detects when the recognition processor is writing to the boundary trace logic 24 and, in response thereto, signals the data transceiver 52 with a write strobe. The address decoder 50 also detects when the recognition processor 18 is reading status information and data from boundary trace logic 24 and enables a multiplexer in transceiver 52 to transfer the desired signal to bus 19. The data transceiver 52 will include "write" data receivers, the "write" strobes which cause the writing of data received from bus 19 to the proper components, the above-mentioned read data multiplexer and status logic circuitry which provides input information to the multiplexer. Upon initiation of a boundary trace operation, for example subsequent to location of a black point on the boundary of a segment stored in the line memory, the x coordinate of the black point will be written into an address register 54 and the y coordinate of the black point will be written into an address register 56. Additionally, the top limit, i.e., the Y minimum coordinate, of a valid character space will be written into a Y-top limit detector 58 which comprises a register and associated comparator. Similarly, the bottom limit, i.e, the Y-maximum coordinate of the valid character space, will be written into the Y-bottom limit detector 60. The boundary trace operation will be initialized by delivering an initialized trace command and the search direction code, provided by recognition processor 18, to a command register 62. The search direction code will indicate in which of four directions the search was made by processor 18 to find the initial black point in the line memory planes 16. The four possible directions are top to bottom, bottom to top, left to right and right to left. Upon completion of initializing of the boundary trace logic 24, trace sequencer logic 64 will be enabled by an output from command register 62. Sequencer logic 64 will generate a "busy flag" signal and also generate a "clear" signal. This "clear" signal will reset the "valid" chain code elements logic in controller 66, and will pre-set trace memory range limit detection and position counters in a line memory read sequencer 68 and will reset range limit logic which is also in line memory read sequencer 68. The sequencer 64 also provides an "initialize mode" signal to a read only memory in the line memory read sequencer 68. Sequencer 64 additionally issues a "start line memory access sequence" signal to a line memory bus cycle control sequencer in line memory read sequencer 68. The trace controller 66 and line memory read sequencer 68 are depicted in functional block diagram form in FIG. 6 . The description below of the boundary trace logic 24 will simultaneously refer to FIGS. 5, 6 and 7.

The receipt by bus sequencer 598 of line memory read sequencer 68 of a "start line memory access sequence" signal from sequencer 64 initiates a sequence of reading a block of data comprising four 4×4 "binary picture elements" from the line memory planes 16 into the boundary trace memory 48. Thus, the line memory read sequencer PROM 594 provides control signals to line memory bus 20 to cause the incrementing and decrementing of the x and y address registers in the line memory control 14. Line memory bus cycle sequencer 598 provides line memory read sequence signals to line memory bus 20 to cause the line memory controller 14 to read data from memory planes 16. Sequencer 598 then strobes the line memory data which is being read into the trace memory 48. The sequencer 598 additionally resets a counter 596 before starting any line memory operations and increments counter 596 after each line memory operation. The line memory access sequence PROM 594 determines which, and in what order, line memory operations occur when the line bus cycle control sequencer 598 receives a "start" command from sequencer 64, the control signals delivered to sequencer 598 including "set read address" and "line memory read" commands. As noted, line memory address registers in line memory control 14 are incremented and decremented through the "line memory read address" signals which are outputted from PROM 594.

The locations in trace memory 48 where information, i.e., picture elements, are stored is controlled by "trace memory write address" signals provided by PROM 594, the information being written into memory 48 in response to a "write strobe" signal provided by sequencer 598. When the line memory access sequence is complete, as indicated by the appearance of a "sequence done" signal at the output of PROM 594, the sequencer 598 will generate a "line memory access done" signal which is delivered to sequencer 64. The "initialized mode" signal supplied to PROM 594 by sequencer 64 causes the PROM 594 to sequence the reading of four 4×4 "picture elements" surrounding the "located black point" in line memory into trace memory 48. The counter 596, controlled by sequencer 598, addresses the locations in PROM 594 for each step of the line memory access sequence.

While the line memory access progresses, the trace sequencer 64 waits for the "line memory access done" signal from line bus cycle control sequencer 598. After receiving a "line memory access done" signal from sequencer 598, the trace sequencer 64 presets a trace memory 48 X-read address counter 70 with "counter initialized data" signals. Counter 70 is thus set with the starting X-address which is a function of search direction information, the search direction information being a part of the data read into command register 62. The sequencer 64 also commands the presetting of the trace memory Y-read address counter 72 thereby setting the starting Y-address. The starting Y-address is also a function of search direction information which is a part of the information in command register 62. The trace sequencer 64 additionally provides, to trace controller 66, a "counter initialize data" signal which pre-sets a trace chain code element counter 570 thereby setting the starting chain code element to a value which is a function of the search direction code in command register 62. Sequencer 64 includes a "three point trace initialize counter" which is reset during this period to thereby set an "initialize done" signal in the false state to indicate that the three point trace initialize operation is "busy". The sequencer 64 also provides "trace clock" signal pulses for sequencing the boundary trace operation for three points. The trace operation generates chain code elements which define the direction from one black point on the character segment boundary to the next black point using the grid coordinate representation of FIG. 4. As explained above, the direction is such that, when moving along a segment from one black point to the next in order, the white area outside of a segment is on the left.

In order to generate a chain code element representing the direction from the "current" black point to the "next" black point, 2×2 segments of the grid coordinate space surrounding and adjacent to the current black point coordinate are searched for black points. The search starts by looking at a 2×2 segment known to lie either in the white area outside the character segment or to contain points on the boundary of the segment. The presetting of the trace memory X and Y-read address counters 70 and 72 permits this searching mode. The position of the 2×2 element relative to the current black point corresponds to the chain code element having a value defined by the output of the trace chain code element counter 570 in trace controller 66. As noted above, counter 570 is pre-set along with the trace memory address counters 70 and 72 so that the relative position of the 2×2 element to the current black point and to the chain code element for the current black point correspond.

A 2×2 segment of data from boundary trace memory 48 is generated by feeding the outputs of the trace memory address counters 70 and 72 into a pattern PROM and logic array 74 which generates the read address signals for memory 48. Thus, data contained within the desired 2×2 "picture elements" is extracted from trace memory 48 and delivered to a multiplexer 76.

The 2×2 data signals from multiplexer 76 and the chain code element signals from counter 570 of trace controller 66 are routed to a trace address change and black point detector 568, which includes a PROM and logic, in trace controller 66. The detector 568 uses the "chain code element" signals from counter 570 to determine which of the data signals in the 2×2 picture element to search for black, i.e., picture, points to determine if the current chain code element stored in counter 570 represents the chain code element connecting to the next black point on the segment border. If detector 568 does not detect a black point it will output a "white point clock" which is synchronized with the "trace clock" signal from sequencer 64. This "white point clock" signal will decrement the chain code element counter 570 by one count thereby rotating the direction represented by the chain code element from the current black point by 45° in the clockwise direction. Detector 568 will simultaneously output increment or decrement signals for the trace memory x counter 70 and y counter 72 which change the trace memory address in such a manner as to rotate the 2×2 element selected by PROM 74 by 45° in the clockwise direction about the "current" black point in trace memory 48. The operation is then repeated with the 2×2 data from multiplexer 76 and the "chain code element" from counter 570 being tested in detector 568 for a black point. If a black point is still not detected, another "white point clock" signal, along with the proper increment/decrement trace memory x and y counter signals for 45° clockwise rotation of the 2×2 elements about the "current" black point, is generated and the process repeats.

The generation of "white point clocks" and the clockwise rotation of both the "chain code element" and the 2×2 "picture" element about the "current" black point continues until a black point is detected by detector 568 or, in the case of a single unconnected black point, no surrounding black points are detected and the chain code element counter 570 continues to count down until chain code overflow detect logic 572 detects that counter 570 has passed the maximum negative chain code element value allowed. Should this happen, logic 572 will output a "chain code element overflow" signal which is delivered to the sequencer 64 which produces a signal which stops the tracing process. Sequencer 64 will also, at this time, generate clear signals which reset the command register 62 clearing the initialized trace command and removing the "busy flag" thereby informing recognition processor 18 that the initialization process is complete, albeit unsuccessful.

The "chain code element overflow" signal from logic circuit 572 is also inputted to the status logic circuit in data transceiver 52 thus enabling the recognition processor 18 to read the status of the trace initialize operation through the input/output bus read data multiplexer which is also part of transceiver 52.

When detector 568 detects a black point in the 2×2 element appropriate for the chain code element in counter 570 a "black point clock" signal is generated in synchronism with the "trace clock" signal. During the trace initialize operation this "black point clock" signal is delivered as an input to a further PROM 588 in trace controller 66. The "chain code element signal" from counter 570 is also inputted to PROM 588. PROM 588 generates increment/decrement signals for the trace memory x and y range limit counters 590 and 591 in line memory read sequencer 68. The "black point clock" signal from detector 568 is also inputted to "valid chain code element" logic 586 which, in conjunction with signals from a "move difference" logic circuit 584, will generate a "valid point clock" signal in synchronism with the "black point clock" signal. The function of the "move difference" logic 584 will be described in greater detail below. The "valid chain code element" logic 586 generates, in addition to the "valid point clock" signal, a chain code memory write strobe signal which is delivered to the feature extraction logic 28. This chain code memory write strobe signal is inhibited by the "initialize done" signal from sequencer 64 being false during the initialize trace operation. The "black point clock" signal from PROM 568 also resets the counter in the move difference counter/logic circuit 584, resetting occurring on the trailing edge of the "black point clock". The "black point clock" further strobes the corrected "chain code element" from an adder 576, which is connected to the output of counter 570, into a chain code element data register 578. Data register 578 is connected to the chain code memories 750, 752 and 754 through multiplexer 746 in feature extraction logic 28.

It is to be noted that the information in register 578 is ignored during the trace initialize operation since chain code elements are not stored in chain code memory during boundary trace initialization. The "black point clock" from detector 568 also causes a "coordinate clocks register" 582 to be loaded with increment/decrement data for incrementing/decrementing x address register 54 and y address register 56 on the next "black point clock", this data being provided by "correction and x and y coordinate address increment/decrement," PROM 580. The "black point clock" signal is also fed back to counter 570 to cause this counter to be incremented on the trailing edge of the clock, this incrementing causing the rotation of the chain code element by 45° in the counter-clockwise direction thus enabling proper operation of the next black point detect and chain code element determination cycle.

As previously noted, the detector 568 also outputs increment/decrement signals which are delivered to the trace memory x and y address counters 70 and 72 to insure that the addressed 2×2 element in trace memory 48 will be positioned about the next detected black point in conjunction with the chain code element in counter 570.

The "valid point clock" signal from logic circuit 586 comprises the strobe signal for controlling read-out of the coordinate clocks register 582. Thus, upon generation of the "valid point clock" signal, register 582 will provide the increment/decrement signals which result in the x and y coordinate counters 54 and 56 being incremented or decremented so as to define the position of the valid black point in the line memory planes 16. The "valid point clock" signal from logic circuit 586 also increments the three point trace initialize counter in sequencer 64, this counter tracking the number of valid black points traced during the initialize operation. After three points have been traced, the initialize counter in sequencer 64 will output an "initialize done" signal. The "initialize done" signal removes the "busy flag" from the output of sequencer 64 thus informing the recognition processor 18 that the initialize process has been completed. The "initialize done" will also stop the "trace clock" signal and reset command register 62 thereby clearing the initialize trace command. Sequencer 64 also generates a "load match" signal which causes the loading of the current value of the x address register 54 into a register 644 (FIG. 7) of a match comparator 78 (FIG. 5). The current value of the y address register 56 is similarly loaded into a register 650 in comparator 78. The lower three bits of the chain code element from chain code element counter 570 of trace controller 66 is loaded into register 656 of match comparator 78. The information in registers 644, 650 and 656 identifies what will be the first point on the segment to be traced when a trace continue command is issued from processor 18.

Figure 8:
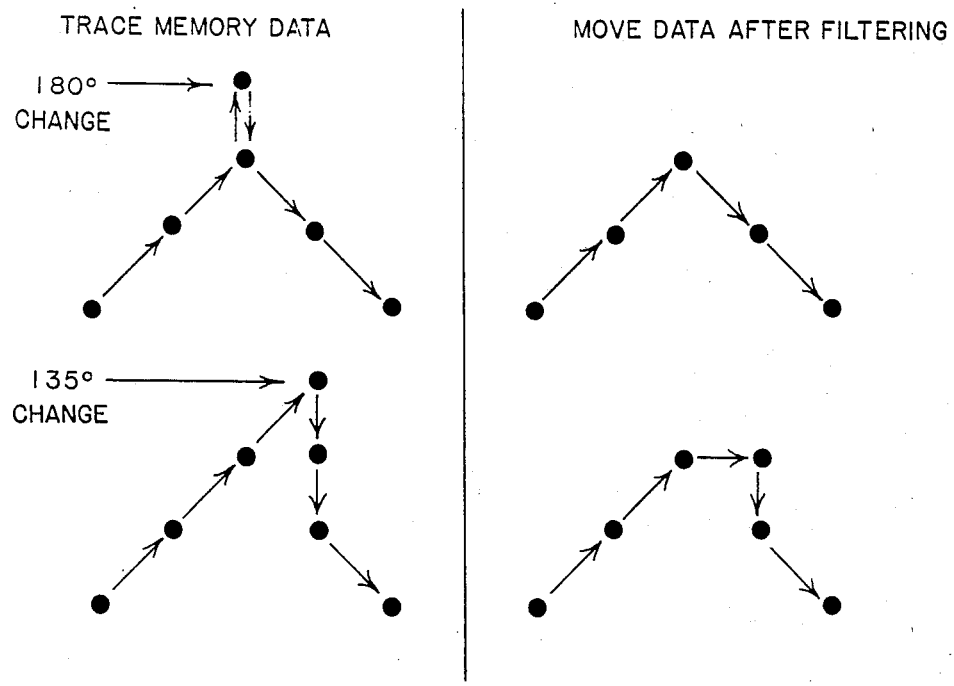
FIG. 8 is a graphical representation of the filtering action performed by the circuitry of FIG. 5.

The operation of black point PROMS and logic 568 is depicted in FIG. 4. The column labeled "Move Code" corresponds to the least three significant bits in chain code element counter 570 and also corresponds to the diagram labeled "Move Direction" in FIG. 4 the diagram showing the actual direction of the move from the referenced black point in trace memory 48. The groups of two or three dots in the column labeled "DATA" in the table indicate which elements in the 2×2 array addressed by X-Address counter 70 and Y-address counter 72 are tested for a black point for the particular chain code element in counter 570. The data under "Trace Memory Address Change" in FIG. 4 indicate how X-Address counter 70 and Y-Address counter 72 are increemented/decremented depending on detection of a black point ("If black" column) or on non-detection of a black point ("If white" column). The move difference counter in logic circuit 584, PROM 580 and valid chain code element logic 586 of trace controller 66 provide a means for filtering out black points on a boundary that cause "sharp" changes in trace direction. A "sharp" change is defined as a 135° or 180° difference between sequential chain code elements in clockwise rotation. The effect of this filtering operation is illustrated in FIG. 8. The move difference counter logic 584 counts the number of white point clocks generated by detector 568 thus accumulating the degree of rotation of the "current" chain code element from the previous element. If counter 584 detects a 180° rotation of, i.e., difference between, two adjacent chain code elements it will provide a signal to the "valid chain code element" logic 586 to inhibit the generation of "valid point" clock signals. The two chain code elements will thus be prevented from being recognized as valid elements and, accordingly, the x and y address registers 54 and 56 will not be changed. Also, the three point trace initialize counter in sequencer 64 will not be incremented and the "chain code memory write strobe" signal from logic circuit 586 will be inhibited. Inhibiting the strobe signal from logic circuit 586, if the trace continue operation is active, will prevent the two 180° apart chain code elements from being written into the chain code memories 750, 752 or 754 in feature extraction logic 28. If counter 584 detects a 135° difference between two adjacent chain code elements, by sensing a number, for example three, of white point clocks, logic circuit 584 will provide an input signal to PROM 580 which, in turn, outputs a signal to adder 576 to produce a corrected chain code element in place of the two chain code elements which caused the 135° difference. The PROM 580 also alters the x and y coordinate increment and decrement signals to the coordinate clocks register 582 so that these signals correspond to the corrected chain code element. Further, the logic circuit 584 is caused to deliver, to logic circuit 586, a signal which causes a "valid point clock" signal to be generated corresponding to the corrected chain code element.

During the trace initialize and actual tracing operations the "black point clock" signals from detector 568 are inputted to the PRO 588 along with the "chain code element" signal from counter 570. The PROM 588, in response to the input signals provided thereto, generates "increment/decrement" signals for the range limit x and y counters 590 and 591 of the line memory read sequencer 68. These counters are thus caused to count in synchronism with the "black point clock" signals and the counters thus track the location of the current black point in the trace memory 48.

The outputs of counters 590 and 591 are inputted to the range limit detection and position logic 592 which includes a further PROM. Logic circuit 592, by means of comparing the outputs of counters 590 and 591, detects when the position of the black point in trace memory 48 is such that there is insufficient data in memory 48 for all the possible 2×2 elements about the black point to be accessed. When this condition occurs, logic circuit 592 provides the "trace memory range limit" signal to sequencer 64 which results in the stopping of the "trace clock" signal delivered to PROM 568 of trace controller 66. The PROM 568, and its associated logic, in response to not receiving the "trace clock" signals, halts the trace operation. The trace sequencer 64 also, in response to the receipt of the "trace memory range limit" signal from logic circuit 592, provides a "start line memory access sequence" signal which is inputted to the line memory bus cycle control sequencer 598. Sequencer 598, in conjunction with counter 596 and PROM 594, causes the reading into trace memory 48 of data from the line memory planes 16 which defines a 4×4 area in the manner described above. However, at this time the "initialize mode" signal from sequencer 64 will be in the "off" condition and thus the PROM 594 will respond to position signals from circuit 592 to determine which memory elements are to be read into trace memory 48 to provide sufficient data around the "current" black point in memory 48 for the tracing operation to continue. When the line memory read sequence is complete, sequencer 598 will generate the "line memory access done" signal which will be inputted to sequencer 64. This "line memory access done" signal will cause sequencer 64 to re-activate the "trace clock" signal thus allowing the trace operation to be continued.

After the trace initialize operation has been completed, the status of the initialization being read by processor 18 over bus 19, the segment boundary trace operation is initiated by processor 18 by writing the "trace continue" command to command register 62. The address counter 736 of feature extraction logic 28 and the area computation circuits 830, 832, 860, 862, 878 and 880 of the feature extraction logic 28 are also initialized by processor 18. Memory select logic 738 is also set by processor 18 to enable the chain code element memory 750, 752, or 754 in which the chain code elements from trace logic 24 are to be stored, and chain code memory length register 710 is set to maximum. In response to a "trace continue" command, sequencer 64 will output "trace clock" signals which allow the trace operation to continue from the point at which it stopped during the initialize mode, the "trace continue" signal being provided to sequencer 64 by command register 62.

When a "trace continue" command is written to command register 62, the trace operation will proceed as described above with "chain code memory write strobe" signals additionally being outputted from the valid chain code element logic circuit 586 through gate 748 thus generating write strobes to chain code memories 750, 752 or 754. Accordingly, chain code elements will be passed from register 578 through multiplexer 746 and written into the chaincode memory of feature extraction logic 28. Increment/decrement x/y coordinate signals from register 582 will be passed through multiplexers 760 and 790 and on to the aforementioned area computation circuits thus causing the 2A area operation, which will be described below, to proceed during tracing. A trace busy signal from sequencer 64 causes multiplexers 760 and 790 to select signals from register 582.

During the trace operation the minimum and maximum values of the x and y coordinates, i.e., the extremes of the trace, are tracked by comparator logic in registers 80, 82, 84 and 86. The "load match" signal outputted from sequencer 64 at the end of the initialize operation causes circuits 80 and 82 to be loaded with the current x-coordinate value from register 54 and circuits 84 and 86 to be loaded with the current y-coordinate from register 56. During the trace operation the compare logic in circuit 80 will compare the trace minimum x-coordinate value in a register in circuit 80 to the current x-coordinate value from register 54. If the x-coordinate is less than the stored minimum, the new x-minimum coordinate is loaded into the register in circuit 80 in synchronism with the "valid point clock" generated by the valid chain code element logic 586. In similar fashion, a register in circuit 82 "saves" the trace x-maximum coordinate, a register in circuit 84 "saves" the trace y-minimum coordinate and a register in circuit 86 "saves" the trace y-maximum coordinate. After the trace operation is complete, the minimum and maximum x and y coordinates, i.e., the "current character box", may be read by recognition processor 18.

The trace operation will continue until sequencer 64 stops the "trace clock" signals, thus terminating the trace operation, and generates a "clear" signal which resets command register 62. The "clear" signal clears the trace command and lowers the busy flag thus informing recognition processor 18 that the trace operation has been completed.

The sequencer 64 will cause the trace operation to be terminated if any of four input signals are "true", these input signals being an "off-top" limit signal from detector 58, a "off-bottom" limit signal from detector 60, a chain code memory overflow signal from a chain code "memory address at maximum", compare logic circuit 740, and an "at match" signal from AND gate 654 in match comparator 78. The chain code "memory address at maximum" signal from comparator 740 indicates that there is no more space to save chain code elements. The "off-top" limit signal from detector 58 indicates that the Y-coordinate has exceeded the top limit value (y-minimum) stored in register 58, i.e., the trace is "off-top". The "bottom" limit signal from detector 60 indicates that the Y-coordinate has exceeded the bottom limit value (y-maximum) stored in detector 60, i.e., is "off-bottom". The "at match" signal, outputted from gate 654, indicates that the trace operation has reached the point from which it was started, i.e., the segment boundary has been completely traced. The "at match" signal is generated when gate 654 receives signals from all three comparators 646, 652 and 658 of match comparator 78. Comparator 646 provides an output signal when the current value of the x-coordinate stored in register 54 equals the value stored in register 644 by the "load match" signal from sequencer 64 at the end of the trace initialization operation. In similar fashion, comparator circuit 652 equates the y-coordinate signal from register 56 with the y-coordinate stored in register 650 at the end of trace initialization. Circuit 658 compares the "chain code element" signal from chain code element counter 570 to the chain code element value stored in register 656 at the end of initialization.

When the trace operation has been halted and the busy flag "lowered", recognition processor 18 can read the status of the boundary trace operation in the status logic of data transceiver 52 to see which of the four input signals to sequencer 64 caused termination of the tracing operation, i.e., the information in transceiver 52 will indicate whether the trace has been completed, as indicated by the output of gate 654 of match comparator 78, whether the trace is "off-top" or "off-bottom" as indicated by detectors 58 and 60 respectively or whether there has been an a chain code memory overflow sensed by comparator 740.

In the boundary tracing operation, described above, it is important that every segment and included lake of a character be located and traced. However, to maximize data throughput, it is necessary to minimize the searching required to locate all segments and lakes and also to avoid the tracing of any previously traced segments or lakes. The black point accumulator 22 helps achieve the foregoing under the control of recognition processor 18 and, in so doing, performs a black point count summing function. The accumulator 22 is interfaced with the input/output bus 19 and the line memory bus 20. In operation the accumulator 22 is effectively a logic sub-system interposed between the line memory 13 and input/output bus 19. Once the operation of the accumulator 22 has been started by means of a command signal received over the input/output bus 19 from recognition processor 18, i.e., once accumulator has been initialized to the starting coordinates of the column to be accumulated and instructed as to how many 4×4 memory sections to accumulate, this logic circuit will run on the line memory bus 20, automatically incrementing the line memory 13 addresses in line memory control 14 until it has completed its task.

Character boundary tracing is performed in five phases utilizing accumulator 22 and boundary trace logic 24 operating in conjunction. In the first phase, the leftmost segment of the character is found by a sequential column by-column search of a segment search window. A se9ment search window is a "box" defining a region in the line memory within which the search for a segment of a character is to take place. The segment search window comprises a portion of a character search window which is itself a "box" which defines a region in the line memory within which the search for a character will take place. The size of the character search window is set by the application software. The first phase search is for the purpose of detecting a white-toblack or black-to-white transition within any four-column wide strip. The logic circuitry in accumulator 22 determines the number of black points in each column. If there are less than a pre-selected number of black points, three points for example, the column is skipped and the next column is examined. If at least the pre-selected minimum number of black points are detected, the column is divided into two two-bit wide vertical vectors and the line memory data within each vector is examined, from top to bottom, to locate a black-to-white or a white-to-black transition. The coordinates of the black point at the first transition located and the direction of that transition are supplied to the boundary trace logic 24 via bus 19 whereupon a boundary trace operation will begin.

During the second phase of the character tracing procedure, a fixed area to the right of the first segment located and traced is searched for any additional, i.e., untraced, segments. During the third and fourth phases of character tracing regions respectively located above and below previously traced segments are searched. The rectangle defined by the outer limits of all of these searched areas defines the character search window or box.

During the second, third and fourth phases of the character tracing operation the area of search never includes any previously located segment. In this manner, the repetition of previous traces is avoided and the full extent of the character may usually be efficiently determined. Embedded segments, that is, those segments which exist within the rectangular boundary of a previously traced segment, and lakes are located and traced during the fifth phase. A black point accounting procedure is used during phase five to minimize the need for extensive searching.

The accumulator 22 includes a PROM and associated logic circuitry. All data read out of the line memory into accumulator 22, after multiplexing, is delivered to the PROM which functions as a look-up table, i.e., the eight bit word of the 2×4 sample is translated by the PROM into a number commensurate with the number of black points in the sample. Recognition processor 18 sets up the line memory control 14 to select the accumulate direction the selected direction being included in the 16-bit input words provided by processor 18.

Additionally, under the control of processor 18, the accumulator 22 will load the search limit, i.e., the height of the column to be examined, into its own input register. These preliminary steps having been completed, the accumulator 22 will work on its own. The recognition processor 18 will interrogate the accumulator 22 output register to determine whether the operation of the circuit has been completed. The output of accumulator 22 consists of one 16-bit word, which is read on input/output bus 19, containing the number of black points accumulated in the sweep of the column.

To discuss the operation of accumulator 22 in greater detail, during phase one, i.e., the locate first segment phase, the entire character search window is searched for the left-most segment of the character. If the first segment is found while searching the left-most 2-bit vertical vector of the character search window, the rest of the vector is searched for other segments to determine exactly where the left edge of the character is. As new segments are found along that vector, the "current" character box is enlarged to include the new segments found. The rectangular region which contains the entire first segment is considered to be the "current" character box.

During the second through fourth phases, briefly described above, the extent of the character is determined by an iterative search procedure. In the second phase, using the "current" character box as a reference point, an area to the right of this box is searched for additional segments belonging to the character being traced. During this phase the segment search window used extends to the end of and has the same height as the character search window, i.e., the segment search window is located to the right of the "current" character box with a space of one scan unit in between. If a new segment is found, the "current" character box is extended to include the new segment and the second phase search is repeated. Phase two is completed when no additional segments are found to the right of the character box, i.e., to the right of the smallest rectangle which encloses the entire character.

In the third phase of the determination of the extent of a character, an area above the top of the "current" character box is searched. This area is bounded on the top by the top edge of the character search window. This area is bounded on the left by the left edge of the "current" character box and, if necessary, the left boundary will be truncated by the left edge of the character search window. The area being described is bounded on the bottom by the top edge of the "current" character box and, on the right, by the right edge of the "current" character box. If a new segment is found during phase three, the "current" character box is extended to include the new segment and phase three will be repeated. Phase three is completed when no additional segment is found to the top of the "current" character box.

The fourth phase of the boundary tracing procedure comprises searching the area below the bottom of the "current" character box. This area is bounded to the top by the bottom edge of the "current" character box, to the bottom by the bottom edge of the character search window and to the right by the right edge of the "current" character box. This area is also bounded, on the left, by the left edge of the "current" character box and this left boundary may, if necessary, be truncated by the left edge of the character search window. If a new segment is found during phase four the "current" character box is extended to include the new segment and phase four is repeated. Phase four is completed when no additional segment is found to the bottom of the extended character box. Once phase four is completed the "current" character box determines the full extent of the character being traced. The coordinates of the "current" character box are, in the manner described above, stored in registers 80–86 of boundary trace logic 24. These coordinates are used in ascertaining the validity of the boundary trace in the manner to be discussed below.

During the second, third and fourth phases the area of search never includes any previously located segment. Each segment detected during phase two will be traced, by boundary trace logic 24, prior to moving on to phase three, etc. As will be described in greater detail below, the chain codes commensurate with the traced segments and lakes will be sequentially loaded into separate of the chain code memories 750, 752 and 754 in order to enable information about each segment and lake to be separately processed.

The fifth phase of character tracing comprises a black point accounting procedure. The purpose of this phase is to locate and trace any lakes within the character and/or embedded segments that have not been found in phases 1-4. The need to search for lakes and embedded segments is determined by attempting to account for all the black points within the character box. Within a character box, the actual black point count is contributed by all the segments which comprise the character. The number of black points contributed by a segment without a lake is the segment grid count. The number of black points contributed by a segment with one or more lakes is in the sum of the segment grid count and the lake grid counts of all the lakes contained within the segment, segment grid counts being positive and lake grid counts being negative. By summing all the segment and lake grid counts, a calculated black point count is obtained. Any significant difference between the actual and calculated black point counts is an indication that there may be one or more untraced segments or lakes. The accounting procedure comprises three steps. In the first step the actual black point count within the character box is determined using accumulator 22. The actual black point count is the sum of all of the black points in all of the columns in the "current" character box. The actual black point count is stored in recognition processor memory 26.

In the second step, the calculated black point count is obtaining by summing all of the segment grid counts and lake grid counts of all segments and lakes which have been found. This calculation is performed by feature extraction logic 28 during a trace operation using the trace X and Y move direction data from registers 582 in trace logic 24 in the manner to be described below. To understand this calculation, a polygon with N verticies numbered 0 through N-1 in clockwise order may be considered. If the coordinates of each vertex $P_i$ are $(x_i \, y_i)$ then the area of the polygon is $$\tfrac{1}{2} \sum_{i=1}^{N-1} 2A_i \quad (1)$$

where $$2 A_i = [\Delta y_i(\delta x_i) - \Delta x_i(\delta y_i)] \quad (1a)$$

$N-1$ = the number of the last chain code element $a_i$ of the trace
$\delta x_i$ = the x component of chain code element $a_i$
$\delta y_i$ = the y component of chain code element $a_i$ and
$\Delta x_i = X_i - X_o$
$\Delta Y_i = y_i - y_o$ As each $\delta x_i$ or $\delta y_i$ is either 0 or $\pm 1$, the area computation circuitry of the feature extraction logic 28 computes the area of a segment (or lake) incrementally as the chain codes are being generated using simple efficient logic, i.e., the area computation runs in parallel with the trace operation.

Let I be the number of nodes in the interior of the polygon. Pick's Theorem states that:

$$A = (\tfrac{1}{2})N + I - 1.$$

If the polygon encloses a lake, the number of nodes constituting the lake (excluding the black points that encircle it) is the lake grid count. Thus, Lake Grid Count = $I = A - (\tfrac{1}{2})N + 1$.

If the polygon encloses a segment, the number of nodes constituting the segment, including those on its boundary, is the segment grid count. Thus, Segment Grid Count = $I + N = A + (\tfrac{1}{2})N + 1$.

In the third step the actual and computed black point counts are compared by recognition processor 18 and, if there is not a significant difference therebetween, all black points are considered to have been accounted for and phase five is completed. If there is a significant difference between the actual and computed black point counts, a search for additional segments and lakes is performed within the character box. If any new segment or lake is found, the routine is returned to the second step of phase five. Otherwise, the character tracing is deemed to be completed.

An exact accounting of black points is not always possible since a discrepancy may be caused by bridging and filtering by the boundary trace logic 24 and by "noise" in the character box. Thus, it is necessary to establish criteria which may be employed to decide when the difference between the actual and computed black point counts is significant.

In one reduction to practice of the invention, a difference between the actual and computed black point counts of eight had to be exceeded before the difference was considered significant.

As long as there is a significant difference between the actual and computed black point counts, a search for additional untraced segments and lakes within the character box will continue. This search is conducted by attempting to perform boundary traces at each black-to-white transition and at the last white-to-black transition along pre-selected vertical and horizontal vectors within the character box. If the attempt yields a good trace fully contained within the "current" character box and the segment or lake traced has not previously been traced, the new segment or lake is included as part of the character and the computed black point count is up-dated. The determination of whether the segment or lake has previously been traced is accomplished by recognition processor 18 through comparison of the data transferred from registers 80-86 of the boundary trace logic to memory 26 at the end of the previous trace(s) with the maximum and minimum coordinates of the newly traced segment/lake. If the coordinates are equal the segment has been previously traced. In one reduction to practice of the invention the pre-selected vertical and horizontal vectors, and the order in which they are searched, are as follows:

(1) Vertical vector at one-half the width of the character box;

(2) Vertical vector at one-quarter the width of the character box;

(3) Vertical vector at three-quarters of the width of the character box;

(4) Horizontal vector at one-half the height of the character box; and (5) Every vertical vector in the character box, proceeding from left to right.

As previously noted, vertical vectors are 2-bits wide and they are searched from top to bottom. The horizontal vector is 2-bits high and is searched from left to right. The search for additional lakes or segments will, of course, stop once the difference between the actual and computed black point counts falls below the selected level at which the difference becomes significant.

It is to be noted that the traces produced by the boundary trace logic 24 are subjected to two different types of checks. The first type of check is to determine validity and is related to the boundary trace hardware exception conditions, i.e., isolated black points, trace off-top or off-bottom, and move memory overflow. Further "hardware" exception conditions are trace off-left and trace off-right, these conditions being detected by recognition processor 18. The second type of check is made to assist in identifying the boundary of a character. The second type of check includes determining the following:

(1) Trace length too short;
(2) Trace or character too wide;
(3) Relative position of trace; and
(4) Too many segments/lakes in the character.

When a trace fails to pass a check, it is either regarded as not belonging to the current character, and ignored, or it is included as part of the current character with an appropriate exception bit set to indicate this condition to further processing.

With regard to the isolated black point check, as explained above the boundary trace logic 24 is initialized by providing it with the coordinates of the point of transition and the direction of searching when the white-to-black transition was detected. Once initialized the boundary trace logic will trace three moves. If there are only three points or less on the periphery of the segment, the sequencer 64 of boundary trace logic 24 will signal that the exception condition of an isolated black point has been detected. Isolated black points are regarded as "noise" on the document and are ignored, i.e., no "initialize done" signal is provided by sequencer 64 of boundary trace logic 24 and no chain codes are stored in feature extractor 28 chain code memories 750, 752 and 754.

Figure 16A:
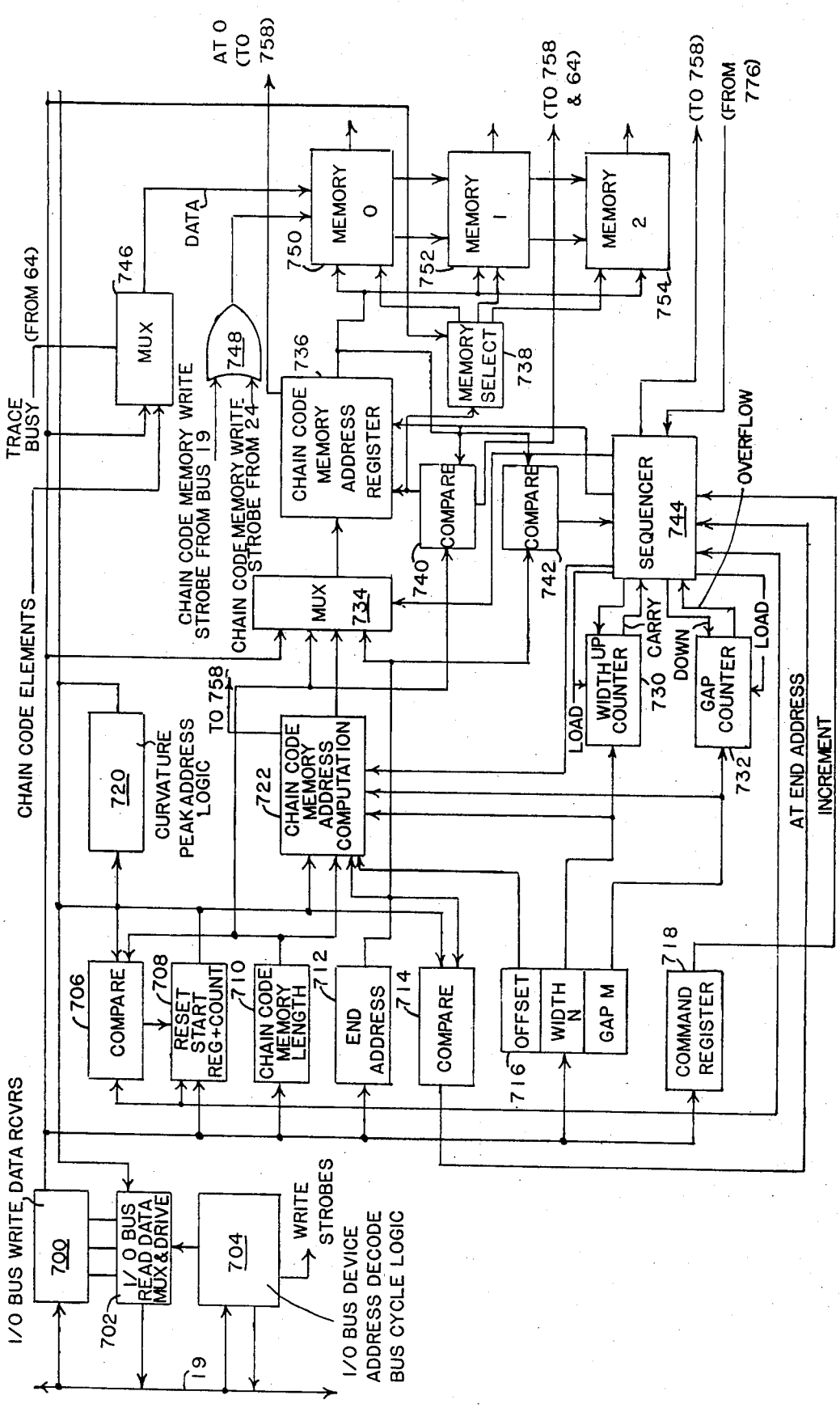
FIGS. 16A, B and C comprise a functional block diagram of the feature extraction logic of the apparatus of FIG. 1.

The checking to see whether a trace length is too short is accomplished by comparing the number stored in a chain code memory address register 736 (FIG. 16A) with a pre-selected number stored in recognition processor memory 26. All segment traces must meet a minimum trace length requirement. A segment with less than the minimum trace length, like an isolated black point, will be regarded as "noise" on the document. It is to be noted that lake traces are not subjected to the "trace length too short" check because small but significant lakes do occur. It is also to be noted that, while searching for segments in phases 1–4 of the character boundary tracing operation, the minimum trace length requirement is also applied to traces that are off-top or off-bottom. This results in off-top and off-bottom conditions caused by "noise" and slight protrusions of the character above and below the character box being ignored. However, during the search for the right edge of a character that goes off-top or off-bottom, the requirement of minimum trace length is not applied.

The "trace or character too wide" check is performed only when the first segment of the character is traced in the first phase of the boundary tracing operation. A trace of a character is considered too wide if its width exceeds one and one-quarter of the character width specified in an active font table stored in memory 26. If the segment is too wide, the "segment box" is returned as the "character box" with the character-too-wide status bit set. If the first segment is found while searching the left-most vertical vector of the character search window, the rest of the vector is searched for other segments. When a new segment is found along that vector, the character box will be expanded to include the new segment found. If the width of the resulting character box exceeds the too-wide threshold, the character is considered too wide. Character tracing will return the expanded character box with the character-too-wide status bit set. Any new segment found during phases 2–5 of the boundary tracing operation that would result in a character box that is too wide will be excluded from the current character.

The positions of a trace relative to a segment search window, character search window and character box are subjected to a number of tests to determine whether the trace found belongs to the current character. Thus, the right edge of a trace is compared with the left edge of the character search window during phase 1. This check is necessary to avoid the tracing of a segment of a character located to the left of the current character but having a portion which extends into the current character box.

A second kind of right edge check compares the right edge of a trace with the x-coordinate of the vertical vector where the transition that leads to the trace is found. This type of check is performed while searching for the right edge of a character after an off-top or off-bottom condition is detected in either of phases 1 or 2. This second type of right edge check is performed on all traces, whether with or without the boundary trace logic exception conditions having been detected, and assures that the search will continue to advance.

The "relative position of trace" check also includes a "center of segment check" which is performed only during phase 1 of the boundary trace operation. During this check the location of the center of a segment, as determined by recognition processor 18 by computing the average of x minimum and x maximum, is compared with the location of the left edge of the character search window. If the center of the segment is to the left of the left edge of the character search window, the segment is considered to be belonging to the previous character and is ignored. This check is performed to avoid the inclusion of a segment belonging to the previous character which happens to be traced because the "current character" is being traced at a lower threshold than that of the previous character, i.e., the black/white threshold will be recomputed for each character. For a trace that is too wide or which has chain code memory overflow, it is possible for a character search window to be located to the right of the center of the trace. Thus, the center of segment check is performed only on traces that are not too wide and have not resulted in a boundary trace logic exception condition being detected.

The location of the left edge of the segment being traced is also compared with the left edge of the character search window. Since all segments that cross the left edge of the character search window are located in boundary tracing operation phase 1, any trace that crosses the left edge of the character search window in phases 2–4 must belong to the previous character and must have been traced due to contour trace hardware filtering and/or tracing at a threshold lower than that used for the previous character.

The first type of check also includes a containment check which is performed on every additional segment or lake located during the 5th or black point accounting phase of the boundary trace operation. Since the extent of the character was determined during the previous phases of the boundary trace operation, all lakes and embedded segments belonging to the current character must be contained within the current character box. Any trace that fails this check is not considered part of the current character and is ignored. Since the segment search windows in phases 2–4 always leave a gap of one scan unit between themselves and the current character box, the containment check allows the segment box or lake box of the new trace to exceed the current character box by up to two scan units.

As previously described, the boundary trace logic detects whether the segment being traced is off-top or off-bottom of the character search window. Thus, the trace off-top detector 58 and the trace off bottom detector 60 define a vertical region in the line memory 16 where the character is expected to reside. Line memory data outside of this region may not contain valid data. If a trace should exceed either of these limits, the boundary trace will, in the manner described, terminate the trace by setting either the off-top or off-bottom exception bit, i.e., signals will be outputted from the appropriate of detectors 58 and 60 to sequencer 64 which will cause the trace operation to stop. The recognition processor 18 will "look" at the status register in data transceiver 52 of boundary trace logic 24 to determine why the trace was stopped. It is to be observed that, during phase 1 of the boundary tracing operation, a trace is subjected to the isolated black points, trace length too short and right edge checks prior to checking the trace for off-top or off-bottom conditions. This enables "noise" near the top or bottom of the character search window to be ignored. Similarly, slight protrusion of characters from the previous or next line will also be ignored. The right edge check prevents the off-top or off-bottom traces belonging to the previous character from causing the aforementioned exception bit to be set.

Similarly, in phases 2–4, isolated black points and minimum trace length checks are performed prior to the check for the trace off-top or off-bottom conditions. However, a left edge check is substituted for the right edge check prior to the checking for the trace off-top or off-bottom condition.

In the black point accounting phase any trace with an off-top or off-bottom condition is ignored, i.e., the trace could not have been completed during a previous phase.

When an off-top or off-bottom condition is detected by either of detectors 58 or 60 during the first four phases of the boundary tracing operation, and thus the exception status bit set by sequencer 64, the character box will contain the trace with the off-top/off-bottom condition. In addition, if an off-top or off-bottom condition is detected during either of phases 1 or 2, this will constitute a signal to the recognition processor that the right edge of the character must be determined. Accordingly, the character search window will be searched for additional traces located to the right of the current character box which has been expanded to include the trace that goes off-top or off-bottom. The area searched is the portion of the character search window which lies to the right of the current character box. If a good trace is found, i.e., a trace that does not have off-top, off-bottom, or move memory overflow, and if its length is too-short, the trace is ignored and the search continues. Regardless of whether the trace found is "good" or not, the right edge of the trace is then compared with the x-coordinate of the vector along which the transition that yields the trace is found. If the right edge is not to the right of the vector, the trace is ignored. A trace that has not been ignored will then be included as part of the character provided that the overall width does not result in a "character too-wide" condition. After the character box is expanded, the area to its right is again searched until the end of the character search window is reached.

If the capacity of a chain code memory in feature extraction logic 28 is exceeded during the tracing of a segment, the chain code memory overflow status bit will be set and the trace process stopped since the trace is longer than can be stored and thus must be noise, result from a misaligned document, etc., and thus not constitute data. In the first phase of the boundary trace operation a trace is subjected to the isolated black points check, the trace length too-short check and right edge check prior to checking for chain code memory overflow condition. The right edge check prevents the inclusion of traces with move memory overflow belonging to the previous character box. If the chain code memory overflow status bit is set, the recognition processor 18 will cause the character box to be up-dated to include the trace with chain code memory overflow, and character tracing is terminated. During the last four phases of a boundary trace operation a trace with move memory overflow is assumed to be part of the next character and is ignored.

The maximum number of segments and lakes, i.e., the check to determine whether there are too many segments/lakes in the character, is a software/hardware function., In one reduction to practice of the invention, the chain memories 750, 752 or 754 respectively store the chain code elements commensurate with the first three segments/lakes traced.

Feature extraction logic 28, in conjunction with processor 18, performs the function of searching each segment of the current character for the presence of certain geometric features. In accordance with the present invention, eight features have been selected. Examples of the chosen features, which are defined by boundary curvature, are shown in FIG. 10. Information concerning these features is collected, and coded and then used to represent the segments of the character during character classification.

Feature extraction is a two-step process. First, the chain code stored in memories 750, 752 or 754 is searched for regions of significant positive, i.e., convex, and negative, i.e., concave, curvature. If these regions meet certain requirements, the center or most significant point in that region is classified as one of four types of "point of interest". A point on the periphery of a segment will qualify as a point of interest if it meets heuristically determined conditions. In the second step, points of interest (IP's) are further classified as features based upon the contour of the surrounding area, i.e., the classification will depend upon various combinations of curvature and change in direction. Thus, as will be explained in greater detail below, the point of interest search is based upon the computation of an angle or measure of curvature at each point of a chain code sequence. The technique employed in feature classification comprises a convolution of the chain code sequence with a trapezoidal smoothing function followed by the application of a difference function. The actual calculation is described by:

$$^n\theta_i^m = \sum_{j=i-n-\frac{m}{2}+1}^{i-\frac{m}{2}} a_j - \sum_{j=i+\frac{m}{2}+1}^{i+\frac{m}{2}+n} a_j$$

where $a_j$ is the jth element of the chain code sequence, n is the group or number of chain code elements on each side of the point i included in the summation, m is the "gap" between the two summations, and $^n\theta_i^m$ is the angle or curvature at point i with group n and gap m. Values of m and n are chosen to best preserve the information concerning the feature shape while minimizing the digitization noise. The angle $^n\theta_i^m$ will be positive for convex regions and negative for concave regions. Its maximum value will usually be restricted to 4n, which is equivalent to a 180° clockwise change in direction.

Before describing the hardware which effects the calculations performed in feature extraction logic 28 hardware, the process will be illustrated by reference to FIGS. 11A-11C and 17. It will be presumed that the character "S" illustrated in FIG. 11A, has been found and its boundary completely traced. FIG. 11B represents the line memory image of the character of FIG. 11A as it would be "seen" by the character trace. In the example being described, the character consists of only one segment. The trace of this segment generated by the boundary trace logic 24 is represented in FIGURE 11C, the trace start point being indicated by the percent (%) sign.

The point of interest search follows the periphery of a segment, searching for regions that are significantly concave or convex such as a stroke ending and/or the smooth curved outer surface of the letter O. Based upon the amplitude of the curvature and the "duration" of the curvature, a point within a convex or concave region may be classified as one of the four types of points of interest. A list containing information about each point of interest is kept for each trace.

A level checking technique is used to detect points of interest along the trace periphery. The range of possible angles that can occur at a point on the trace periphery is broken into a series of consecutive levels. FIGS. 12A and 12B are respectively level checking tables used for segment and lake traces. Once the high and low exit values have been set along with indicators as to whether the maximum point or mid-point of a level are desired, successive points along the trace stored in the chain code memory are looked at until the current level has been exited. The high and low exit values, along with the trapezoidal smoothing function and difference functions, are established by experimentation and are stored in recognition processor memory 26.

It is to be noted that, before the point of interest search can be started, an appropriate search start point must be found on the trace periphery. The search start point must be within a relatively straight region of the periphery to guarantee that the search has not started near a point of interest. The start point is determined by searching for a point on the periphery with a near zero angle or curvature. In the case of very small or uniformly round traces a start point may not be found. If this happens, the trace will have no point of interest and therefore no features.

Once a search start point has been found, the search end point is determined. The feature extraction logic 28 automatically wraps around at the end of the segment trace in the chain code memory 42 so the trace end point is the point prior to the trace start point thus forming an effectively closed or continuous periphery or trace thereby allowing the entire trace to be searched in a continuous fashion.

Figure 13:
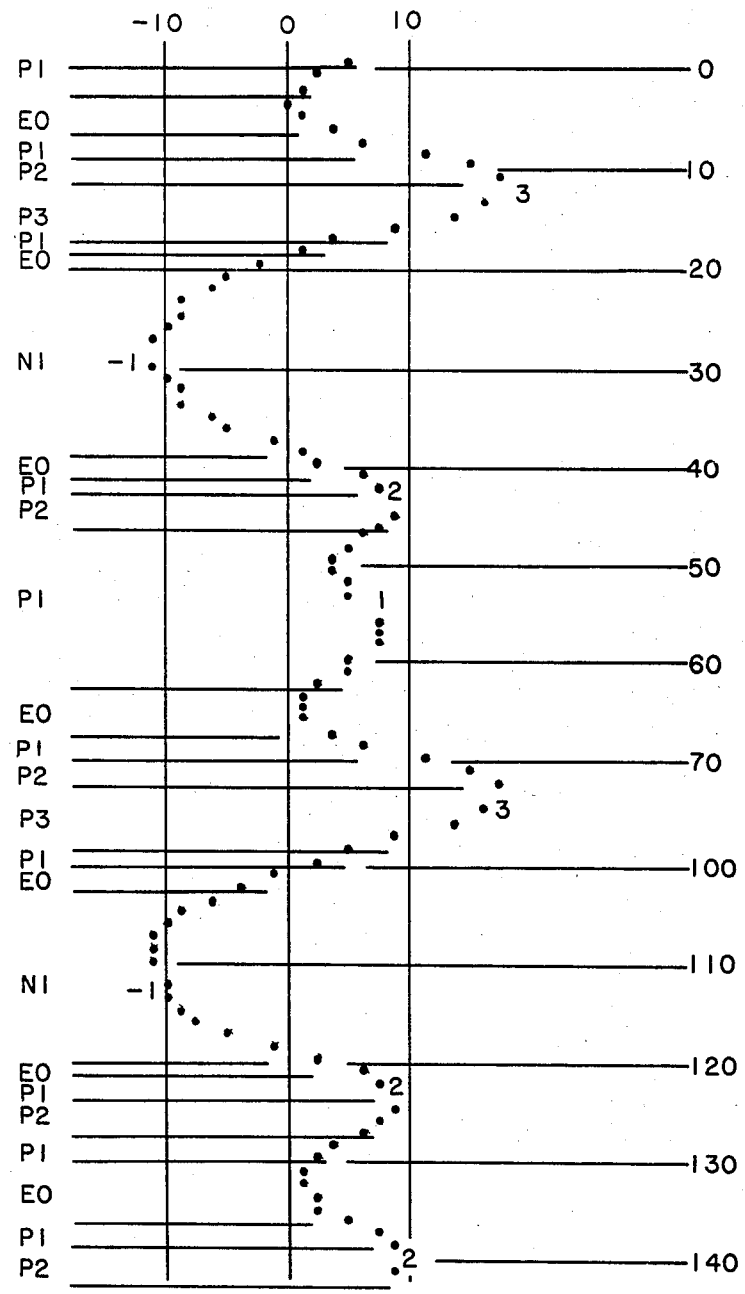
FIG. 13 is an angle plot depicting level transitions and interesting points on the boundary of the line memory image of the character depicted in FIG. 11A.

FIG. 13 is an angle plot for the example character of FIG. 11A. The first angle plotted corresponds to the trace start point (the % in FIG. 11C). FIG. 13 also shows the location of the search start and end points. The type of points of interest found during the search, and their location, are also indicated on FIG. 15.

Once the search start point has been found, the point of interest search process begins in Entry Level Zero (E0). The high exit value for E0 is 2, the low exit value is −1 inclusive. For the example character of FIG. 9, level E0 is exited at chain code memory address (MMA) 5 which has a value of 3. For level E0, the high and low exit minimum lengths have been made sufficiently large to insure that no points of interest are declared.

The point of interest search is now in positive level 1 (P1), which has a high exit value of 6 and a low exit value of 3. The search remains in this level only until MMA 7, which has a value of 11 (octal, i.e., base 8). No point of interest is declared for level P1 because the high exit minimum length is 7 and the duration in the level was only 2.

The search is now in level P2, with a high exit value of 14 (8) and a low exit value of 6. A high exit from low P2 into level P3 occurs at MMA 11. No level 2 point of interest is declared because the high exit minimum length required is set sufficiently high to insure that no points of interest are declared for high exits from level 2.

In level P3 the high exit value is set to the feature extraction logic hardware maximum, and the low exit value is set to 7. Level P3 is exited at MMA $16_{(8)}$. A type 3 point of interest is declared, because the minimum length specified is 1. This forces an point of interest to be declared anytime level P3 is exited. For level P3 the point with the greatest angle is declared as the point of interest. In the example being described, the point of interest is at MMA $12_{(8)}$. Had there been two or more points with the same greatest value, the mid-point of these points would have been declared as the point of interest.

Level P3 exited into level P1 which has a high exit value of 6 and a low exit value of 3. This level is exited immediately into level E0 at MMA $17_{(8)}$.

A low exit is taken from E0 at MMA $20_{(8)}$. A −1 type point of interest is declared when level N1 is exited at MMA $37_{(8)}$. In this case the point of interest is declared at the mid-point of the level (at MMA $27_{(8)}$). FIG. 12 provides specific information concerning all level transitions that occurred. These transitions and the points of interest declared are indicated on FIG. 14. The point of interest search is completed when the search end point is reached, i.e., MMA 1 in the example given where the search start point was MMA 2. An point of interest entry is made in a list for each interesting point that is found on the trace. This entry contains sixteen words of information about each point of interest. Some of this information is collected when the point of interest entry is created, i.e., when the point of interest is declared, and the remainder of the information is collected when the point of interest search has been completed. In the example being described, eight points of interest were found. The information collected when the point of interest is declared is its level and its address in the chain code memory. The remaining information will be discussed below in the description of the operation of the feature extraction logic.

Once the point of interest search has been completed and point of interest entries have been filled in, each point of interest is further classified as one of the eight features represented in FIG. 10. This classification is in accordance with the following tests which are performed sequentially for each point of interest type, all numbers being in octal.

---

For Point of Interest Type −1:
if (Angle Sum ≦ −37) Feature Type = Bay
else if (Angle 4-2 ≦ −3 AND
−37 < Angle Sum ≦ −13) Feature Type = Inlet
else Feature Type = Null
For Point of Interest Type 1:
Feature Type = Arc
For point of Interest Type 2:
if (|Angle 4-2 − Angle 4-0| ≦ 2 AND
|Angle 4-2 − Angle 4-10| ≦ 2 AND
|Angle 4-0 − Angle 4-10| ≦ 2) Feature Type = Wedge
else if ((120 ≦ Angle Sum ≦ 130) OR
(Angle 4-2 ≧ 14 AND
Angle 4-10 + Angle 4-20 ≧ 25)) Feature Type = Spur
else if (Angle 4-10 ≦ 3 AND
Angle 4-20 ≦ 3 AND
Angle 4-2 ≧ 11) Feature Type = Stub
else Feature Type = Curl
For Point of Interest Type 3:
if ((Angle 4-2 > 15 AND
Angle Sum > 115) OR
Angle 4-10 + Angle 4-20 > 24) Feature Type = Spur
else if (Angle 4-10 ≦ 10 OR
Angle 4-20 ≦ 10) Feature Type = Stub
else Feature Type = Spur

---

As each point of interest is classified as a feature, a feature summary word is created. This word contains the feature type, (one of eight), a direction (one of eight) and an X and Y position (16 possibilities). These feature summary words are placed in a feature summary word list as they are created. The order of the words in the list indicates the clockwise order of the features on the character trace. FIG. 15 shows the location and type of each feature on the character trace of FIG. 11C. The position boundaries are also indicated on FIG. 15.

Figure 16B:
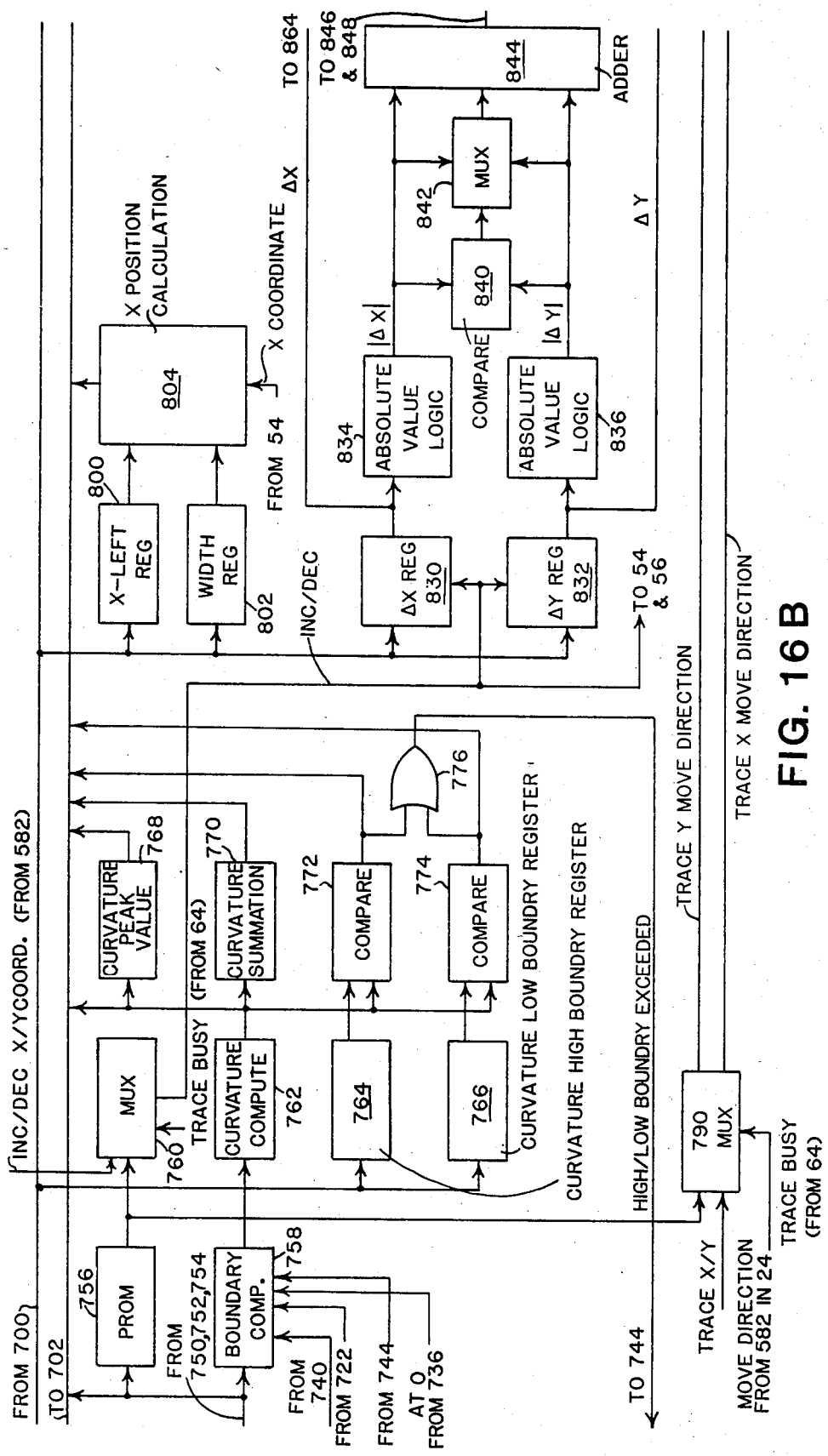
Figure 16C:
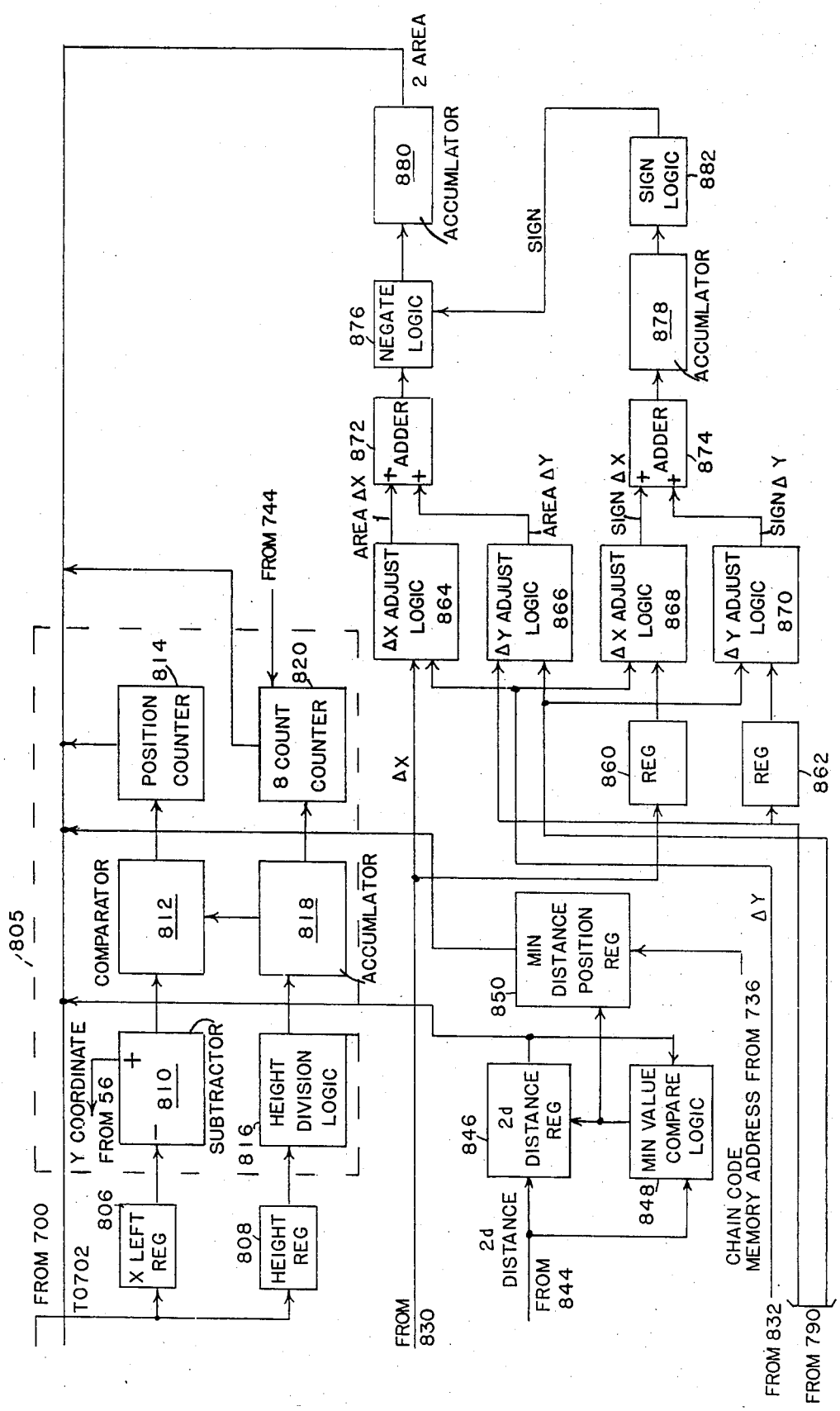
Figure 17:
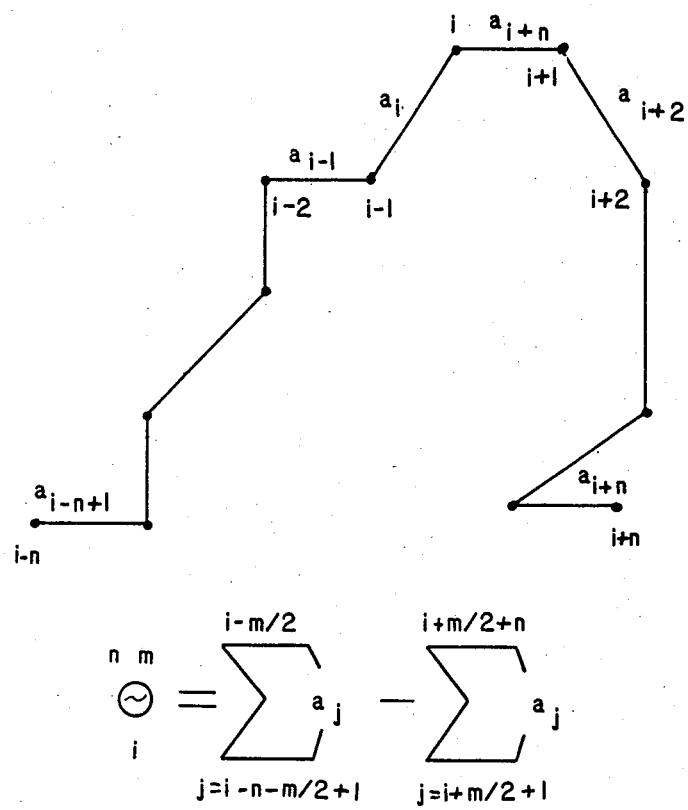
FIG. 17 is a representation of the feature extraction process.

Feature extraction logic 28 is shown in functional block diagram form in FIG. 16. FIG. 16 will be described by discussing the various operations performed in feature extraction. Thus, in order to perform a curvature computation the recognition processor 18 must load the appropriate data into feature extraction logic 28, the data being routed from processor 18 over input-/output bus 19 through receivers 700 to the various registers in feature extraction logic 28. The input/output bus device address decoder, and associated bus cycle logic circuitry, 704 sense when the processor 18 is writing data to feature extraction logic 28 and generate the required write strobes to cause storage of data in the proper register. The chain code memory, in the example being described, actually includes three memories 750, 752 and 754. The proper memory must be selected for the chain code data for each segment and lake. This is accomplished by data loaded into the chain code memory select logic 738 from processor 18, the chain code memory select logic 738 enabling one of the three chain code memories to first receive the desired trace and subsequently to enable reading of the trace. The data from processor 18 also includes a chain code memory length parameter which is loaded into chain code memory length register 710. The data loaded into chain code memory length register 710 is used by a chain code memory address computation circuit 722 and comparators 706 and 740 to enable "wrap around" access of data in the chain code memory, i.e., a trace is a closed curve and therefore the chain code should be stored in a "circular" memory. Since most feature extraction calculations require accessing chain code elements either forward or backwards along the trace from some current point, chain code memory address register 736 is either incremented or decremented by sequencer 744, or offset both plus and minus, by address computation circuit 722. Since this forward and backward "movement" along the boundary includes crossing the start and end points of the trace, logic in circuit 722 and comparators 740 and 706 compensate for this occurrence. Since the trace lengths differ, register 710 is needed to define the length which is the address of the last point of the trace in chain code memory.

The start address register and counter 708 will be loaded with the start point data which, if curvature about a single point is to be determined, represents the address in one of chain code memories 750, 752 or 754 of the point of interest about which the curvature is to be calculated. The calculation of curvature about a point is employed to classify a point of interest by type.

Curvature "low boundary" data is loaded into a low boundary register 766 for comparison against results of a curvature computation, performed in curvature computation circuit 762, in a comparator 774. This comparison enables the recognition processor 18 to see if the computed curvature value is below a preset "low boundary".

Similarly, a curvature "high boundary" register 764, which cooperates with comparator 772, is included.

If the compare option is not used, i.e., in the computation of curvature about a single point, register 766 and-/or 764 must be set beyond the low and/or high values from circuit 762 or to minimum and/or maximum when a sequential curvature calculation, to be discussed below, is performed.

The feature extraction logic also includes a command register 718 which is loaded with data from recognition processor 18, command register 718 providing control inputs to sequencer 744. Thus, data loaded into command register 718 will inform sequencer 744 that, for example, a curvature calculation about a single point is to be performed.

The feature extractor 28 additionally includes a curvature parameter register 716. The data loaded into register 716 includes a 6-bit offset number which will be added to contents of the start address register 708 by address computation logic 722 to determine the address in the chain code memory of the point of interest on the trace which can be offset from the point addressed by start register 708. Thus, logic circuit 722 corrects the address to memories 750, 752 and 754 if the offset from register 716 causes the resultant address to cross the start or end of the trace thus carrying out the wrap-around access of data in the chain code memories as described above. The curvature parameter register 716 also receives a "width" value which is one less than the number of adjacent chain code elements or group in each of the two groups of elements summed in the curvature computation. Additionally, register 716 stores a "gap" value which is one-half the number of chain code elements between the two groups of elements which are summed in the curvature calculation. Consequently, the gap is always an even value. The loading of data into register 716 also generates the start command which is detected by sequencer 744 to start the curvature computation operation.

The computation of curvature about a single point of interest is controlled by sequencer 744 and proceeds as follows. A "busy" flag will be set, width counter 730 will be loaded with the compliment of the data in curvature parameter register 716 and gap counter 732 will be loaded with the corresponding data from register 716. Recognition processor 18 can test the busy flag to determine when the feature extraction logic has completed any commanded operation. The accumulator in curvature computation logic 762 is cleared. The chain code memory address register 736 is loaded with the address from the chain code memory address computation circuit 722 and multiplexer 734 is set accordingly. Sequencer 744 decrements counter 732 and in synchronism decrements address register 736 down resulting in "skipping over" chain code elements in the backwards direction, i.e., the "gap". Logic in address register 736 detects if the address from the chain code memory address register 736 reaches zero which will cause register 736 to be loaded with the chain code length data from register 710 on the next count-down pulse from sequencer 744, multiplexer 734 being set accordingly. The foregoing provides "wrap around" in reverse motion across the trace start/end point. The boundary compensation circuit 758 is "flagged", i.e., the trace start/last point has been crossed during a curvature computation operation. The boundary compensation circuit 758 corrects for the 360° rotation of the chain code elements that occurs during a boundary trace. Sequencer 744 tests for an "overflow" signal from the "gap" counter 732 to stop the process of skipping over "gaps". Sequencer 744 continues decrementing address register 736, and starts counting width counter 730 up in synchronism. The corrected chain code elements from the boundary compensation circuit 758 are added to the the accumulator in computation circuit 762 in synchronism with the counting of counters 736 and 730 thus performing the positive summation of the curvature calculation (Equation 2 above). Sequencer 744 tests for "carry" from counter 730 to determine when the last addition is to be performed and then stops the operation. Subsequently, the width and gap counters and the chain code memory address register are again loaded as above and compensation logic 758 is reset. Sequencer 744 then counts the gap counter 732 down and counts address counter 736 up in synchronism thus "skipping over" the "gap" in the forward direction. A comparator 740 detects if the address from address counter 736 reaches the chain code memory length stored in register 710 thus indicating that the address has reached the start/end of the trace. Comparator 740 will cause chain code memory address register 736 to be cleared on the next count forward pulse from sequencer 744, multiplexer 734 being set accordingly, thus providing the "wrap around" in forward motion across the trace start-/end point. The boundary compensation circuit 758 will be "flagged" in the manner described above, i.e., correction of the chain code elements is required to compensate for the net 360° rotation of the chain code element from start to end of the boundary trace operation. Sequencer 744 tests for "overflow" from the "gap" counter 732 and, when "overflow" occurs, will stop the process of skipping over the "gap". Sequencer 744, in synchronism, continues counting address counter 736 up (forward), starts counting width counter 730 up and subtracts corrected chain code elements provided by boundary compensation circuit 758 from the accumulator in computation circuit 762 thus performing the negative summation in Equation (2). Sequencer 744 tests for a "carry" from the width counter 730 to determine when the last subtraction is to be performed and then stops the operation. When the curvature operation is complete, sequencer 744 removes the "busy" flag and resets to the stand-by state to await the next command from processor 18. The recognition processor 18 tests for a "busy" flag to go false, there being a dedicated line on the input/output bus 19 for this function and a flag test and skip instruction in processor 18 which results in a rapid test for the busy status of the feature extractor 28. When the curvature computation is completed, processor 18 can read the curvature value in computation circuit 762 and optionally high/low boundary status in comparators 772 and 774. The input/output logic in circuit 704 will set the multiplexers and drivers of circuit 702 to route the desired data in feature extraction logic 28 onto bus 19 and thus into processor 18.

The above-described procedure enables the calculation of the curvature of the trace about a single point. It is also necessary to compute the curvature of the trace about a sequential series of points to declare points of interest in the first instance. To accomplish the latter function, the processor loads the chain code memory select circuit 738 and the chain code memory length register 710 in the manner described above. Also, the start point address is loaded into start address register 708, this data representing the address in the chain code memories of the first chain code element on the trace of the sequential series of elements of interest, i.e. the series of chain code elements about which the curvature is computed are sequentially addressed in the "forward" direction of the trace. The end address is loaded into register 712 and represents the last chain code element of the series of elements on the trace. Data commensurate with the curvature low boundary is loaded into boundary register 766 to be compared against the curvature value resulting from the curvature computation in comparator 774, the output of comparator 774 being tested by sequencer 744 during the sequential curvature computation operation. The sequencer will stop the operation if the low boundary is exceeded.

In the manner described immediately above, the curvature high boundary register 764 is loaded with data which will be compared, in comparator 772, with the results of the curvature computation. The command word is loaded into command register 718 and will inform sequencer 744 that a sequential curvature calculation is to be performed. The curvature parameter register 716 is loaded with data in the manner described above except that the offset will be zero for a sequential curvature operation. The curvature summation accumulator in circuit 770, a curvature peak value logic circuit 768, and a curvature peak value chain code element address logic circuit 720 are cleared when the curvature parameter register 716 is loaded. This starts the sequential curvature operation series.

The sequential curvature computation is controlled by sequencer 744 and proceeds as follows. First, the "busy" flag is set. The curvature computation for the first point of interest of the sequence of points is performed as described above. When the curvature computation is complete, sequencer 744 checks to see if one of several stop conditions exists. A stop condition will exist if the comparator logic 714 indicates that the start address counter 708 has counted to the value in the end address register 712. The stop condition will also occur if gate 776 senses that either of comparators 772 or 774 indicates that a boundary has been exceeded. If either stop condition occurs, the sequencer 744 will stop the process, clear the "busy" flag and reset. However, if a stop condition does not occur, sequencer 744 will continue the operation whereby the curvature for the next point in the sequence be computed by curvature computation logic 762 following a series of further operations will Thus, sequencer 744 generates a "summation clock" causing the curvature summation logic 770 to add the curvature value from the curvature computation circuit 762 to an accumulator in circuit 770 to generate the curvature summation value. Also, the "summation clock" will cause the peak value logic circuit 768 to compare the computed curvature value against a value stored in a register in logic circuit 768. If the computed value is larger than the value in the peak value register in circuit 768, the computed value will be stored in the register 778 and, in parallel, the current value in start address counter 708 will be stored in the peak address register in a curvature peak address logic circuit 720 thus saving the address identifying the point along the series of points of interest at which the peak value of curvature occurred. If the computed curvature value in computation circuit 762 is smaller than the value stored in the register 768, there is no action in register in logic circuit 768 in response to the summation clock. The curvature peak address logic circuit 720 also contains logic to determine the address midway between the addresses of two peak values which have the same curvature value, i.e., the median peak address. Whenever a new peak value is stored in peak value register 768, a median address counter in logic circuit 720 is also loaded with the current value in start register 708. When the value calculated by computation circuit 762 is less than the value in the register in peak value register 768 the median address counter is incremented every other summation clock cycle from sequencer 744. Should the value calculated by circuit 762 equal the value in register 768, the value in the median address counter in logic circuit 720 is loaded into the peak address register in circuit 720 thus storing the median address. The summation clock from sequencer 744 will also increment the start address counter in the register/counter 708 thus pointing to the next point in the sequence of points of interest. If comparator 706 senses that the value in the start address counter of register/counter 708 is at value in the length register 710, indicating the last point of the trace, the summation clock will reset the counter in register/counter 708 to zero instead of being incremented thus implementing wrap around. Following the generation of the summation clock, sequencer 744 will sequence the computing of the curvature for the next point identified by counter 708 in the sequential curvature operation. Sequencer 744 sequences through a four-step algorithm to compute the curvature for these subsequent points along the sequence of points of interest, i.e., since all but four summed terms in curvature equation (2) for two adjacent points on a trace are the same, it is necessary to add and subtract only a total of four terms in accumulator 762 for each succeeding curvature calculation thus speeding up the sequential curvature operation. The algorithm "subtracts", from the value in the curvature accumulator of computation circuit 762, the two chain code elements from the previous curvature computation which are not included in the current curvature computation. The algorithm also "adds", to the value in the curvature accumulator, the two new chain code elements used in the current curvature calculation that were not used in the previous curvature computation, these two new elements being added to and subtracted from accumulator 762 according to curvature equation (2). The chain code memory address computation circuit 722 generates the addresses of the chain code elements in one of memories 750, 752 and 754 to access the chain code elements to be added to and subtracted from the values stored in the curvature accumulator of computation circuit 762 as commanded by sequencer 744 using the data in address register and counter 708 and the gap and width values in the curvature parameter register 716. The address computation circuit 722 also uses the length data stored in register 710 to compensate for crossing the start/end boundary to provide the requisite wrap-around capability. The boundary compensation circuit 758 also receives "compensate" signals from computation circuit 722 and corrects the chain code elements when the trace start/end boundary is crossed.

When the operation control by sequencer 744, as explained in the immediately preceeding paragraph, is completed, sequencer 744 will test the stop conditions as described above and will continue the above-described operation if the stop conditions fail.

The recognition processor 18 tests for the feature extraction logic being "not busy" and, when "not busy", reads out the data from various registers and accumulators through the multiplexer in circuit 702 to determine the cause of operation termination and the computation results in the manner described above with respect to the explanation of the computation of curvature of the trace about a single point. In so doing, the processor 18 tests the high/low boundary states in comparators 772 and 774 to see if the sequential curvature computation operation stopped due to a curvature high/low boundary value being reached. Processor 18 can also read the peak value of the curvatures computed in curvature peak value logic circuit 768 and the address, in logic circuit 720, representing the peak value of curvature which processor 18 may further determine to be a point of interest. Also, the summation of all of the curvature values computed, as stored in the curvature summation circuit 770, will be read by processor 18.

The feature extraction logic also computes the direction in which the feature at an interesting point is pointing. This is accomplished by computing the "average" direction in which the defined groups of chain code elements are "pointing" about the point of interest. The feature extraction direction computation is a summation of the specified elements, the sum of which must be normalized by recognition processor 18 by division by the number of elements to find the "average" direction. A 90° counter-clockwise rotation of the normalized summation value yields the direction in which the feature points because the normalized value represents an average direction of movement along the trace which is essentially tangential to the trace at the point of interest whereas the pointing direction is perpendicular to the trace at the point of interest.

Feature extraction logic 28 also performs an absolute position operation in order to find the x and y coordinates in line memory planes 16 of a point of interest on the boundary of a trace. In order to perform this operation, the absolute x and y coordinates of some other point on the boundary of the trace must be known. The absolute position determination operation is initiated by processor 18 loading the data to be discussed below into feature extraction logic 28 and the boundary trace logic 24. With regard to boundary trace logic 24, the x and y coordinate registers 54 and 56, which can be incremented and decremented by PROM 756 and multiplexer 760 of feature extraction logic 28, provide the absolute coordinates of a point of interest for the absolute position detection and other operations.

The data loaded by processor 18 at the initiation of an absolute position detection operation includes the chain code memory selection, inputted to memory select circuit 738, and the chain code memory length which is loaded into register 710, both in the manner described above relative to the computation of the curvature of the trace about a single point. Additionally, the start address, i.e., the address of the point having known coordinates, is loaded into the chain code memory address register 736. Boundary trace logic registers 54 and 56 will receive data commensurate with the x and y coordinates respectively of the start point (in line memory planes 16). The end address, i.e., the address of the point of interest for which the absolute coordinates are being found, will be loaded into end address register 712 of feature extraction logic 28. Finally, command register 718 receives data which will cause this register to tell the sequencer 744 to start doing an absolute position operation.

Sequencer 744 will set the "busy flag" and, subsequently, the address in register 736 will cause the chain code memory selected by the data stored in memory select circuit 738 to output a chain code element to PROM 756. PROM 756 coverts the "polar-like" coordinate direction representation of the chain code element into x and y rectangular direction coordinates which have values of +1, −1, or 0, these values being equivalent to increment, decrement or hold signals. Multiplexer 760 converts the signals into increment/decrement pulses upon command from sequencer 744. These pulses result in the incrementing, decrementing or holding the absolute coordinate values which have been stored in registers 54 and 56 of the boundary trace logic. Since boundary trace logic 24 is not busy, the "trace busy" signal to multiplexer 760 is false thus selecting signals from PROM 756.

Continuing with an explanation of the absolute position operation, the sequencer 744 increments register 736 in synchronism with increment/decrement pulses from multiplexer 760 and tests the output of comparator 742 to see if there is a "compare true", i.e., to test whether the absolute coordinates of the point of interest have been found. Comparator 742 receives, as inputs, the data in chain code memory address register 736 and in end register 712. Incidentally, in the manner described above with respect to the computation of the curvature of the trace about a single point, during incrementing of register 736 if compare logic 740 provides a "compare true" signal to register 736, indicating that register 736 is at the last address as stored in register 710, register 736 will be cleared on the next increment pulse from sequencer 744 thus providing "wrap around". If a "compare true" output is provided by comparator 742, indicating that the absolute coordinates of the point of interest have been found, the sequencer stops, clears the "busy flag" and resets. If the compare is not true the sequencer 744 continues the absolute position operation as described above.

When recognition processor 18 tests the flag not busy, the absolute coordinates of the point of interest may be read from boundary trace logic address registers 54 and 56 over input/output bus 19.

Feature extraction logic 28 also is used to find the relative position of a point of interest within a defined region or "box". In performing this relative position operation, feature extraction logic 28 effectively divides both the x and y dimensions of the "box" into eight parts each resulting in sixty-four sub-divisions or "sub boxes". The feature extractor then determines in which of these sub-boxes the point of interest lies. As in the case of the absolute position operation, the absolute coordinates in line memory planes 16 of some point on the trace boundary must be known in order to determine relative position. Additionally, the absolute coordinates in line memory planes 16 of the "box" must be known. In determining relative position, recognition processor 18 loads the following into feature extraction logic 28 and boundary trace logic 24 in the manner described above:

Chain code memory select (into 738)
Chain code memory length (into 710)
Start address (into 736)
X-coordinate (into 54)
Y-coordinate (into 56)

In addition, data is loaded into register 712 which represents the address of the point of interest for which the relative position is to be found. Also, register 800 is loaded with data which defines the x-coordinate of the left side of the box and register 802 is loaded with data which defines the x dimension of the box. Similarly, register 806 is loaded with data which defines the y-coordinate of the top of the "box" while register 808 is loaded with data which defines the y dimension of the box. Finally, the command register 718 is instructed to start doing a relative position operation.

During the relative position operation the sequencer 744 causes the absolute position operation to proceed as follows:
Set busy flag
Find the absolute coordinate of the point of interest as described above;
Clear counters 814, 820 and accumulator 818 in logic circuit 805. The same operation is performed on similar counters and accumulators in the x position calculation logic 704 which includes the same sub-systems as shown on the drawing for the y position calculation logic 705.

Sequencer 744 sends clock pulses to counters 814 and 820 and to accumulator 818 in logic 805 and to the equivalent counters and accumulator in calculation circuit 804 in synchronism.

The value in accumulator 818 increases in steps equivalent to ⅛ the height of the "box" as a result of logic circuit 816 generating values equivalent to ⅛ the box height using the height value in register 808. Counter 814 increments in synchronism until comparator 812 senses that the number in accumulator 818 is larger than the output of subtractor 810 at which time the output of comparator 812 prevents counter 814 from counting further.

Counter 820, which is counting in synchronism with counter 814 and accumulator 818, is tested by sequencer 744 to sense when eight clock cycles have passed indicating when the output of accumulator 818 has reached the full height of the box. At this point the relative position operation is halted, the busy flag cleared and sequencer 744 resets.

The value in position counter 814 represents the relative position of the point of interest in the y direction. Counter 814 can have a value of from 0 to 7 where 0 is at the top of the box. The operation with respect to the x position in circuit 804 is similar. The recognition processor 18 can read the relative x and y positions respectively from the x position calculation logic 804 and counter 814 over input/output bus 19.

In determining the "2d" distance between two points of interest on the trace boundary, the feature extraction logic 28 process implements the following computation:

$$2d = |\Delta x| + |\Delta y| + max(|\Delta x|, |\Delta y|) \qquad (3)$$

where
- $\Delta x$ is the x distance between the two points, and
- $\Delta y$ is the y distance between the two points.

The distance operation is initiated by recognition processor 18 loading the following data into feature extraction logic 28:

(1) chain code memory select (into 738);
(2) chain code memory length (into 710)
(3) start address, i.e., the address of one of the two points of interest which is loaded into register 736;
(4) end address, i.e., the address of the other point of interest, which is loaded into register 712;
(5) clear the $\Delta x$ register 830;
(6) clear the $\Delta y$ register 832;
(7) load command register 718 with data which will tell sequencer 744 to start the 2d distance operation.

The sequencer 744 causes the 2d distance operation to proceed as follows:

(1) the busy flag is set;
(2) increment/decrement pulses from multiplexer 760 are generated as described above, in the description of the absolute position operation; thus causing the $\Delta x$ and $\Delta y$ registers 830 and 832 to accumulate the $\Delta x$ and $\Delta y$ values from the start point of interest to the point represented by the current address in register 736. Register 736 is counted up in synchronism by sequencer 744 with the increment/decrement pulses from multiplexer 760 with "wrap-around" as described above in the absolute position operation;
(3) the process of step (2) immediately above continues until compare logic 742 stops the process as also described above;
(4) $\Delta x$ register 830 and $\Delta y$ register 832 now contain the $\Delta x$ and $\Delta y$ distances between the two points of interest. Since the values in registers 830 and 832 are "signed", these values must be converted by the absolute value logic circuits 834 and 836 to absolute numbers. The compare logic 840 senses the larger of $\Delta x$ from logic circuit 834 or $\Delta y$ from logic circuit 836 and sets multiplexer 842 to input the larger value into adder 844. Adder 844 sums its three inputs thus implementing the 2d equation above with the sum then being stored in register 846;
(5) sequencer 744 clears the busy flag and resets. Recognition processor 18 can read the 2d distance value from register 846. The minimum 2d distance is of interest in that it locates a point along a defined segment of the boundary trace closest to a "reference" point on the trace but not within the defined section of trace. The minimum 2d distance is computed by first performing the 2d distance operation as described above where the start address is that of the reference point and the end address is that of the first point along the boundary trace segment to be searched. This pre-sets the $\Delta x$ value in register 830, the $\Delta y$ value in register 832 and the 2d distance in register 846 from the reference point to the first point on the segment. The recognition processor 16 then loads the following:

(1) end address, i.e., the address of the last point on the trace segment to be searched, is loaded into register 712;
(2) command data is loaded into command register 718 which tells sequencer to start the minimum 2d distance operation.

The sequencer 744 then causes the minimum 2d distance operation to proceed as follows:

(1) busy flag is set;
(2) $\Delta x$ register 830 and $\Delta y$ register 832 accumulate $\Delta x$ and $\Delta y$ values as register 736 generates chain code memory addresses as described above in the description of the 2d distance operation. At the same time, logic 834, 836, 840, 842 and 844 computes the 2d distance from the reference point to the current point on the segment represented by the address from the chain code memory address register 736. Compare logic 848 compares the values from adder 844 and register 846, and if the value from register 844 is smaller, i.e., a minimum value, register 846 is up-dated with the new minimum value and register 850 is up-dated with the address from register 736 indicating the address of the point closest to the reference point.
(3) the process in step (2) immediately above continues until compare logic 742 signals sequencer 744 to stop whe the last point has been tested. The busy flag is then cleared and sequencer 744 resets.

Processor 18 can now read the address of the point closest to the reference point from register 850 and the minimum distance from register 846.

The present invention may compute area either during a boundary trace operation or when commanded by recognition processor 18. The area to be determined can be that of either an entire closed trace of a segment or that of a "partial" trace, i.e., a section of a segment, when the area computed is that enclosed by the trace boundary between two points of interest which define the partial trace. In the latter case, accordingly, the area computed is that defined by the partial trace and the chord drawn between the two points of interest. The value of the area computed will actually be twice the true area (2A) and will be a signed number such that the area of a segment, i.e., net convex curvature, is positive while that of a lake, i.e., net concave curvature, is negative. The 2A area computation is done incrementally as the boundary is traced or followed from the first point of interest, which will be the start of trace, to the second point of interest, which will be the end of trace. Obviously, for an entire closed trace, the second point of interest will be the point immediately in back of the first point of interest on the trace.

In performing the area computation the $\Delta x$ value accumulated in register 830 and the $\Delta y$ value accumulated in register 832 are combined with the trace x and y move direction signals provided by PROM 756 and outputted from multiplexer 790. These move direction signals are utilized in the Δx and Δy adjust circuitry 864 and 866. The resulting Δx and Δy signals are accumulated in an accumulator 880, as the boundary is traced, according to the following restated version of Equation (1a):

$$2A = \sum_{i=p}^{\delta} [\delta y_i(\Delta x_i) - \delta x_i(\Delta y_i)]$$

where $\delta x_i$ = trace i = p move direction from multiplexer 790 for point i $\delta Y_i$ = trace y move direction from multiplexer 790

$\Delta x_i = \sum_{j=p}^{i-1} \delta x_j$ from register 830 which is the x distance from the start point to the current point on the boundary $R_y y_i = \sum_{j=p}^{i-1} \delta y_j$ from register 832

$\delta x_i = x_i - x_{i-1}, \delta y_i = y_i - y_{i-1}$

The start point of interest (p) is stored in the chain code memory address register 736 when the area computation operation is initialized. The second point of interest (q) which is stored in end address register 712. Logic circuit 864 performs the $\delta y_i(\Delta x_i)$ computation and logic circuit 866 performs the $-\delta x_i(\Delta y_i)$ computation. Adder 872 sums the outputs of logic circuits 864 and 866. The output of adder 882 is delivered to a "negate" logic circuit 876 and will pass through circuit 876 without negation and be accumulated in accumulator 880 incrementally as the boundary is traced or followed. Registers 860 and 862 are preset to 0 by processor 18 for the area computation operation thus causing the outputs from logic circuits 868, 870, 874 and 878 to all be 0. This, in turn, causes the sign logic circuit 882 to not cause negate logic 876 to change the sign of the value from adder 872 which is passed to accumulator 880 through the negate logic circuit 876.

Recognition processor 18 loads the following data into feature extraction logic 28:

(1) The chain code memory select (into 738)
(2) The chain code memory length (into 710)
(3) The start address, which is loaded into register 736, representing the start point of interest which is the start of the trace over which the area operation is to be performed.
(4) The end address, loaded into register 712, representing the end point of interest which is the end of the trace over which the area operation is to be performed. For a closed trace, as noted above, the end point will be the point immediately behind the start point.
(5) Δx register 830 is cleared
(6) Δy register 832 is cleared
(7) The feature extraction process is initialized by transfer of data, under command of recognition processor 18, from register 830 into register 860 and from register 832 into register 862 thus clearing registers 860 and 862. Data from recognition processor 18 also causes accumulators 880 and 878 to clear.
(8) Data is loaded into command register 718 instructing sequencer 744 to start the 2A area operation.

Upon completion of initialization, the sequencer 744 will cause the 2A area computation operation to proceed as follows:

(1) The "busy flag" is set;
(2) Multiplexer 760 will provide increment/decrement x/y pulses which will cause $\Delta x_i$ to accumulate in register 830 and $\Delta y_i$ to accumulate in register 832;
(3) Accumulate pulses are generated and delivered to area accumulator 880 thus accumulating the incremental area values calculated by logic circuits 864 and from the $\Delta x_i$ value from register 830 and the $\Delta y_i$ value from register 832 and from the trace x and y move directions outputted from multiplexer 790. The logic circuit 864 consists of inverters, adders and multiplexers which pass either 0, $\Delta X_i$, or negated $\Delta X_i$, as a function of $\delta y_i$ to perform the $\delta y_i(\Delta x_i)$ computation. Logic circuit 866 performs the $-\delta x_i(\Delta Y_i)$ computation in a similar fashion. Circuit 876 is an exclusive OR gate and adder which either passes or negates the value from circuit 872 as a function of the sign from circuit 882 which, for the 2A operation, is set to always pass the value from circuit 872 since registers 860 and 862 have been cleared. The multiplexers 760 and 790 are set by "trace busy" signal being false to select the trace x/y move directions from PROM 756 as a result of the boundary trace logic 24 being not busy.
(4) Sequencer 744 provides increment pulses to chain code memory address register 736 causing sequential access of chain code elements from one of memories 750, 752 or 754 in synchronism with steps (2) and (3) above. Compare logic 740 in conjunction with logic in register 736 provides "wrap around" capability as described above.
(5) Steps (2)–(4) continue in synchronism accumulating incremental areas in accumulator 880 according to the 2A area summation equation above until compare logic 742 signals sequencer 744 that the second point has been reached on the boundary thus stopping the increment pulses. The busy flag is then cleared and sequencer 744 resets.

Upon clearing the busy flag, processor 18 can read the 2A value from accumulator 880 over input/output bus 19.

If the 2A area operation is to be performed during the boundary trace operation, the Δx register 830, Δy register 832, registers 860 and 862 and accumulators 880 and 878 are cleared as described above before sending the trace continue command to boundary trace logic 24. The "trace busy" signal sets multiplexers 760 and 790 to pass trace x and y move direction signals from the coordinate clocks register 582 of trace controller 66 of the boundary trace logic 24.

A further feature extraction logic operation comprises the computation of the approximate area of deviation of a boundary between two points, on the boundary from a straight line drawn between the two points, this computation providing an indication of the straightness of the segment between the two points. The deviation operation consists of calculating the absolute area enclosed by the boundary and the chord drawn between the two points. This is accomplished by computing the incremental area in the manner described above in the discussion of the 2A operation. However, in the deviation operation, the negate logic 876, controlled by accumulator 878 and sign logic 882, will negate or not negate the incremental areas depending upon which side of the chord the current point on the boundary being followed lies. The exercise of control over negate logic 876 thus allows the accumulator 880 to accumulate an absolute area. The output of the sign logic 882 is an indication of whether the slope of the line from the start point to the current point is less than or greater than the slope of the chord from the start point to the end point and thus is an indication of which side of the chord the current point is on, i.e., is Dx/Dy less than or greater than $\Delta x_i/\Delta y_i$, i.e., is:

$$(Dy \cdot \Delta X_i) - (Dx \cdot \Delta y_i) < 0, \text{ or } > 0? \quad (5)$$

where
Dx = total x distance from start to end point
Dy = total y distance from start to end point
$\Delta x_i$ = x distance from start to current point
$\Delta y_i$ = y distance from start to current point.

Since $\Delta x_i$ of the current point is the accumulation of trace x move direction signals generated from the start point to the current point and $\Delta y_i$ of the current point is the accumulation of the trace y move direction signals generated from the start point to the current point:

$$\Delta x_j = \sum_{j=0}^{i-1} \delta x_i \text{ and} \quad (6)$$

$$\Delta y_j = \sum_{j=0}^{i-1} \delta y_i$$

Accumulator 878 contains $(DY \cdot \Delta X_i) - (Dx \cdot \Delta Y_i)$ by accumulating $$\left( Dy \cdot \sum_{j=0}^{i-1} \delta x_j \right) - \left( Dx \cdot \sum_{j=0}^{i-1} \delta y_j \right)$$

which can be expressed as:

$$\sum_{j=0}^{i-1} [(Dy \cdot \delta x_i) - (Dx \cdot \delta y_i)] \quad (7)$$

Register 860 contains Dx and register 862 contains Dy. These two values are computed by running the two d distance operation, described above, from the start point, the two points on the boundary between which the boundary deviation is to be found to the end point thus resulting in register 830 generating Dx and register 832 generating Dy. The contents of register 830 are then transferred to register 860 and the contents of register 832 are transferred to register 862 as described in the 2A area operation above. Registers 830 and 832 and accumulators 878 and 880 are cleared and the 2A area operation performed from start to end point. However, since registers 860 and 862 are no longer 0, accumulator 878 will accumulate the summation of the signals provided by logic circuits 868 and 870, i.e., logic circuit 868 performs the following calculation:

$$Dy \cdot \delta x_j$$

and logic circuit 870 performs the following calculation:

$$-Dx \cdot \delta y_j$$

The sign of the value in accumulator 878 indicates on which side of the chord the current point lies and controls the negate logic 876 through the sign logic circuit 882. The deviation operation proceeds in the same manner as the 2A area computation described above with the exception that registers 860 and 862 are loaded with Dx and Dy respectively from the 2d distance operation instead of being cleared.

To briefly summarize the above, the sequential curvature operation will be employed to find points of interest, the peak value circuits 720 and 768 providing information commensurate with the value and location of the points of interest. The curvature about a single point operation is employed to classify the points of interest which are found. The direction and position calculations are performed to obtain data included in the summary word lists. The results of the distance and area computations are sometimes used for substitution prevention.

As will be described in greater detail below, the results of the calculations performed in feature extraction logic 28 are stored, in recognition processor memory 26, in feature list form and also in abbreviated summary word list form. In accordance with the present invention, the information of feature type, position and direction is compactly stored in a manner which allows the high speed testing of this information. The 16-bit words which contain this compacted information may be referred to as "summary words". The summary word form permits a simple masking i.e., logical "and", and testing, i.e., compare, procedure to determine whether a feature and its attributes fall within some desired or undesired range. The summary word form is also used to store information about the number of lakes and segments, their positions and areas, and about the number of geometrical features of different types.

Once the summary words for the topological and geometrical characteristics of an input pattern have been generated and stored, character "rule" testing of the summary words will be performed. As used herein, the term "rule" means a set of tests that are performed on summary words or point of interest list elements. Each topologically distinct prototype of a character is represented by a rule. In one reduction to practice of the invention, which is capable of reading hand printed numerals 0–9, capital letters, and the hyphen, i.e., thirty-seven characters, one hundred fifty rules are adequate for character identification with acceptably low rejection and substitution rates.

The testing will proceed from a simple check of the number of lakes and/or segments to a complicated check of the type, position, direction and sequence of occurrence of many features, both desired and undesired, on the boundary of a segment. Each test has an associated range of feature attributes as well as the expected answer for the test to be correctly answered. In order to enhance the speed of processing, frequently used tests are microcoded. The less frequently used tests are callable sub-routines.

If all tests in a rule are successfully completed, the rule is considered successful and the character has usually been identified. However, there are among the characters very similar conflict pairs that cannot be resolved on the basis of the available standard tests. In such cases, special substitution prevention code is used that carefully examines certain key portions of an input pattern to try to further separate such conflict situations. These key portions are examined using the information that is stored in chain code memory and in the interesting point lists rather than relying on the summary words. If the pattern properly falls within a desired parameter range in the substitution prevention code, the pattern is identified and the associated ASCII code is transmitted to the user. If no match is found among all of the rules in the enabled font, the character is declared to be a reject.

In the interest of expediting testing, the summary words comprise information about the character in a form of a range testing code which is further described below. General information about the character itself is encoded along with specific information about each character trace and about features found on each trace. The information is encoded such that multiple aspects of the character can be tested simultaneously using a single pair of mask and test words. This encoding also allows testing each aspect for a range of values rather than just a single value.

In the formation of the summary words, there will be one word that contains summary information about the character as a whole. This 16-bit word, which contains the segment and lake count of the character, has the following format:

| t | t | t | t | t | t | t | t | b | b | b | b | s | s | s | s |
|---|---|---|---|---|---|---|---|---|---|---|---|---|---|---|---|
| 15 | | | | | | | 8 | 7 | | | 4 | 3 | | | 0 | where:
tttttttt is the code for the total feature count for this segment,

| 00000000 = 0 | 00000001 = 1 | 00000011 = 2 | 00000111 = 3 |
|---|---|---|---|
| 00001111 = 4 | 00011111 = 5 | 00111111 = 6 | 01111111 = 7 |
| 11111111 = 9 | 11111110 = 9 | 11111100 = 10 | 11111000 = 11 |
| 11110000 = 12 | 11100000 = 13 | 11000000 = 14 | 10000000 = 15 or more | bbbb is the code for the number of inlets and bays for this segment, and
ssss is the code for the number of stubs and spurs for this segment.

| 0000 = 0 | 0001 = 1 | 0011 = 2 | 0111 = 3 |
|---|---|---|---|
| 1111 = 4 | 1110 = 5 | 1100 = 6 | 1000 = 7 or more |

| 0 | 0 | 0 | 0 | 0 | 0 | 0 | 0 | L | L | L | L | S | S | S | S |
|---|---|---|---|---|---|---|---|---|---|---|---|---|---|---|---|
| 15 | | | | | | | 8 | 7 | | | 4 | 3 | | | 0 | where:
LLLL is the code representing the number of interior traces (lakes) in the current character and
SSSS is the code for the number of exterior traces (segments) in the current character according to the following table:

| 0000 = 0 | 0001 = 1 | 0011 = 2 | 0111 = 3 |
|---|---|---|---|
| 1111 = 4 | 1110 = 5 or more | | |

The format of the second segment feature summary word is:

| n | n | n | n | n | n | n | n | p | p | p | p | p | p | p | p |
|---|---|---|---|---|---|---|---|---|---|---|---|---|---|---|---|
| 15 | | | | | | | 8 | 7 | | | | | | | 0 | where:
nnnnnnnn is the code for the number of negative features (excluding the null type features, i.e., slightly negative features,) on the segment, and
pppppppp is the code for the number of positive features on the segment.

| 00000000 = 0 | 00000001 = 1 | 00000011 = 2 | 00000111 = 3 |
|---|---|---|---|
| 00001111 = 4 | 00011111 = 5 | 00111111 = 6 | 01111111 = 7 |
| 11111111 = 8 | 11111110 = 6 | 11111100 = 10 | 11111000 = 11 |
| 11110000 = 12 | 11100000 = 13 | 11000000 = 14 | 10000000 = 15 or more |

There are three different summary words created for each segment of the current character. These three words summarize information about the segment itself and about the number and type of features found on the segment. The first word contains information about the position of each segment in the character box and thus is most useful for classifying multi-segmented characters. Since the minor segments of a multi-segmented characters are usually simple bars, i.e., straight segments, the segment words for all minor segments contain information describing the orientation and relative length of the segments. This word has the following format:

There is only one word that contains lake summary information. This work, which contains the information about the position and relative size of the lake, has the following format:

| u | a | a | a | a | y | y | y | x | x | x | u | u | u | u | u |
|---|---|---|---|---|---|---|---|---|---|---|---|---|---|---|---|
| 15 14 | | | | 11 | 10 | | 8 | 7 | | 5 | 4 | | | | 0 | where:
aaaa is the code for the relative size of the lake,

| 0000 = small | 0001 = small-medium |
|---|---|
| 0011 = medium-large | 0111 = large | yyy is the code for the y position, and
xxx is the code for the x position.

| 000 = position 0 | 001 = position 1 |
|---|---|
| 011 = postion 2 | 111 = position 3 |

| u | u | u | o | o | y | y | y | x | x | x | X | X | X | X | X |
|---|---|---|---|---|---|---|---|---|---|---|---|---|---|---|---|
| 15 | 13 | 12 | 11 | 10 | | 8 | 7 | | 5 | 4 | | | | | 0 | where:
u is unused
oo is the code for the orientation of the segment (minor segments only),

| 00 = horizontal | 01 = upstroke |
|---|---|
| 11 = vertical | 10 = downstroke | yyy is the code for the y position of the segment, and
xxx is the code for the x position of the segment according to the following scheme

| 000 = position 0 | 001 = position 1 | 011 = position 2 |
|---|---|---|
| 111 = position 3 | | | xxxxx is the code for the relative length of the segment (minor segments only)

| 00001 = length 1 | 00011 = length 2 |
|---|---|
| 00111 = length 3 | 01111 = length 4 |

A feature summary word list is created for each segment of the current character. A list is also created for the lake of single lake characters. The first word of this list contains the number of features found on the segment lake. This is followed by a summary word for each feature. The list of summary words is repeated in memory to provide automatic wrap-around during testing. The format of the feature summary work is:

| 0 | d | d | d | d | y | y | y | x | x | x | t | t | t | t | t |
|---|---|---|---|---|---|---|---|---|---|---|---|---|---|---|---|
| 15 14 | | | | 11 | 10 | | 8 | 7 | | 5 | 4 | | | | 0 | where:
dddd is the code for the direction of the feature,

The other two words which "describe" each segment consist of segment feature summary words. These words contain information about the number of different features that were found on each segment. The format of the segment feature summary work 0 is:

| 0000 = E | 0001 = NE | 0011 = N | 0111 = NW |
|---|---|---|---|
| 1111 = W | 1110 = SW | 1100 = S | 1000 = SE | yyy is the code for the y position of the feature,
xxx is the code for the x position of the feature, and
ttttt is the code for the feature type.

| / 11000 = INLET | / 1000 = BAY / |
| / 00000 = NULL FEATURE | / 00001 = ARC / |
| / 00011 = CURL | / 00111 = WEDGE / |
| / 01111 = STUB | / 11111 = SPUR / |
| 000 = position 0 | 001 = position 1 |
| 011 = position 2 | 111 = position 3 |

As noted above, in one reduction to practice of the invention the classification procedure employed 150 rules, each rule being associated with a certain character prototype. Each rule is a section of executable code. The entire set of rules is sub-divided into three parts corresponding to three different fonts, i.e., alphanumeric, numeric and alphabetical-only. There are three lists of enabled rules, namely a list of alphanumeric rules, a list of numeric rules and a list of alphabetical rules. In turn, each list is divided into four parts with the sub-lists corresponding to characters with one, two, three, or four segments. The rules within a sub-list are ordered by the frequency of occurrence of the corresponding prototypes. For example, the first rule in the alphabetic list is a rule for the most common prototype of the character "A", the second is the most common prototype for the "B", etc. The last entry of each sub-list contains the address of the reject processing for characters that are unrecognizable. Such a structure for the enabled rule list allows the required maintainability and flexibility. For example, all rules required for a particular application can be extracted from the general enabled rule list which includes all existing rules.

Continuing to discuss the example which employs about 150 rules, in one reduction to practice 117 of these rules are one-segment rules and ten are two-segment rules for twenty-six alphabetical characters, ten numerical characters and one special, i.e., hyphen, character. Thus, there are about three and one-half rules per character on the average. A list of the numeric rules is comprised of forty-seven rules, forty-six being one-segment rules and one being a two-segment rule. This averages 4.7 rules per character. The alphabetical rules list contains 114 rules of which 10.5 are one-segment rules. Thus, there are 4.5 rules per alphabetical character. Some rules are used in more than one rule list. The basic difference between the alphanumeric list and the numeric and alphabetical lists is that a number of rules for prototypes which do have conflicts and cannot be included in the alphanumeric rule list have been included in both the numeric and alphabetical lists. For example, the rule for the closed loop letter "G" is included in alphabetical enabled rule list and is not included in the alphanumeric list due to an obvious conflict with the character "6" (six).

Figure 18:
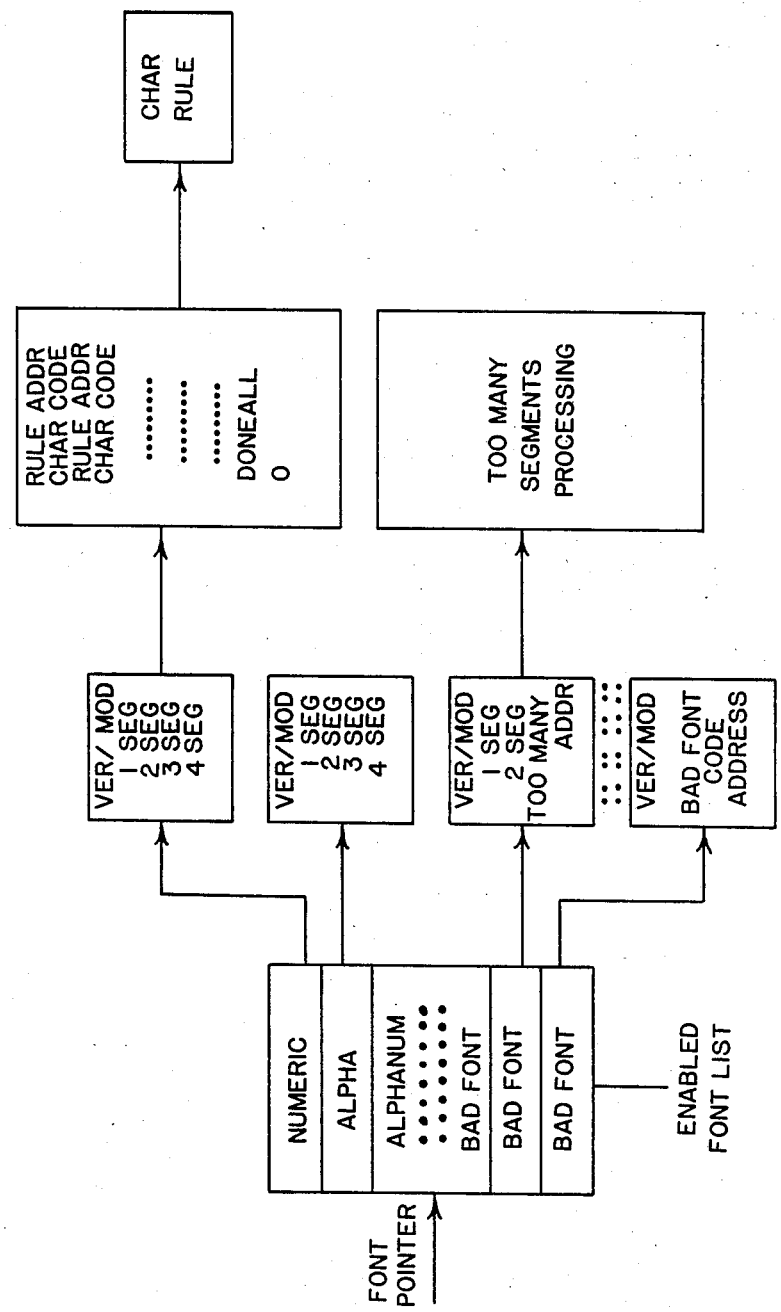
FIG. 18 depicts the structure and use of rule lists in accordance with the invention.

The structure and use of enabled rule lists and font tables may be seen from FIG. 18. The enabled font list is a sixteen word list which contains an address for each alpha hand print font which is enabled. Using FONTPTR as the base address, the font select code is used as an index into this list to retrieve the address of the correct font list. If the selected font is not enabled, the address points to the "Bad Font Processing" address. This list is normally stored in ROM code in the recognition processor memory 26.

Regarding the tables of enabled rule lists, the first word of this five word table contains two ASCII characters which indicate the version and modification. The remaining four words contain the address of the enabled rule list for characters with one, two, three and four segments respectively. If an enabled rule list does not exist for a given number of segments, the address points to the address of the "Too Many Segments" processing. The "Enabled Rules Lists" themselves contain a variable number of two word entries. The first word is the address of a character prototype rule, the second word is the ASCII code of the character. The last entry of each list contains the address of the reject processing which is for characters that are unrecognizable.

The Character Prototype Rules consist of a sequence of specialized tests and substitutions prevention code. If a test fails, a break is made out of the rule and execution is started in the next rule on the enabled rules list. If the rule is completed successfully, i.e., the character is recognized, the ASCII code for the character is obtained from the location which follows the address of the rule in the enabled rules list.

Each rule is executable code and is composed of a set of binary tests and expected answers, which either may be affirmative or negative, to the tests. A character is considered to be accepted by a rule when the answer to each test within the rule matches the answer that is expected for the test. Otherwise, the character is rejected by the rule and is considered by the following rule. Within any rule, tests are ordered by their speed of execution. Thus, simple and fast tests which check topological and global information about characters are executed first.

The first test in every rule is a microcoded routine which, for the purposes of this explanation, may be called "CSWORD". This first test compares the number of segments and lakes of a character with expected numbers. The expected number of segments and lakes are given by 16-bit words following the test call. If the answer to the first test is affirmative, and the actual number of segments and lakes matches the expected numbers, the next test is executed. The second test is usually performed by the same microcoded routine "CSWORD" and compares the total number of features, number of spurs/stubs and number of bays/inlets with expected quantities. Like the expected number of segments and lakes, this information is encoded and stored in the form of a pair of mask/test words which follow the test call. This second test may be followed by a similar test which compares the total number of convexities and concavities on the character's periphery. In the case where the character contains a lake or lakes, a special test has to be executed which checks the position(s) of the lake(s) center and its (their) size(s). In the case of two lakes, another test is employed to check vertical overlapping of the lakes. This is done by a routine known as "C2LAKES". A further test which is often used for the character with lakes is a check for the internal spur or stub, i.e., a protrusion inside the lake. This test is particularly useful at separating such conflict pairs as "Q" and 9 and "B" and "D".

Figure 19:
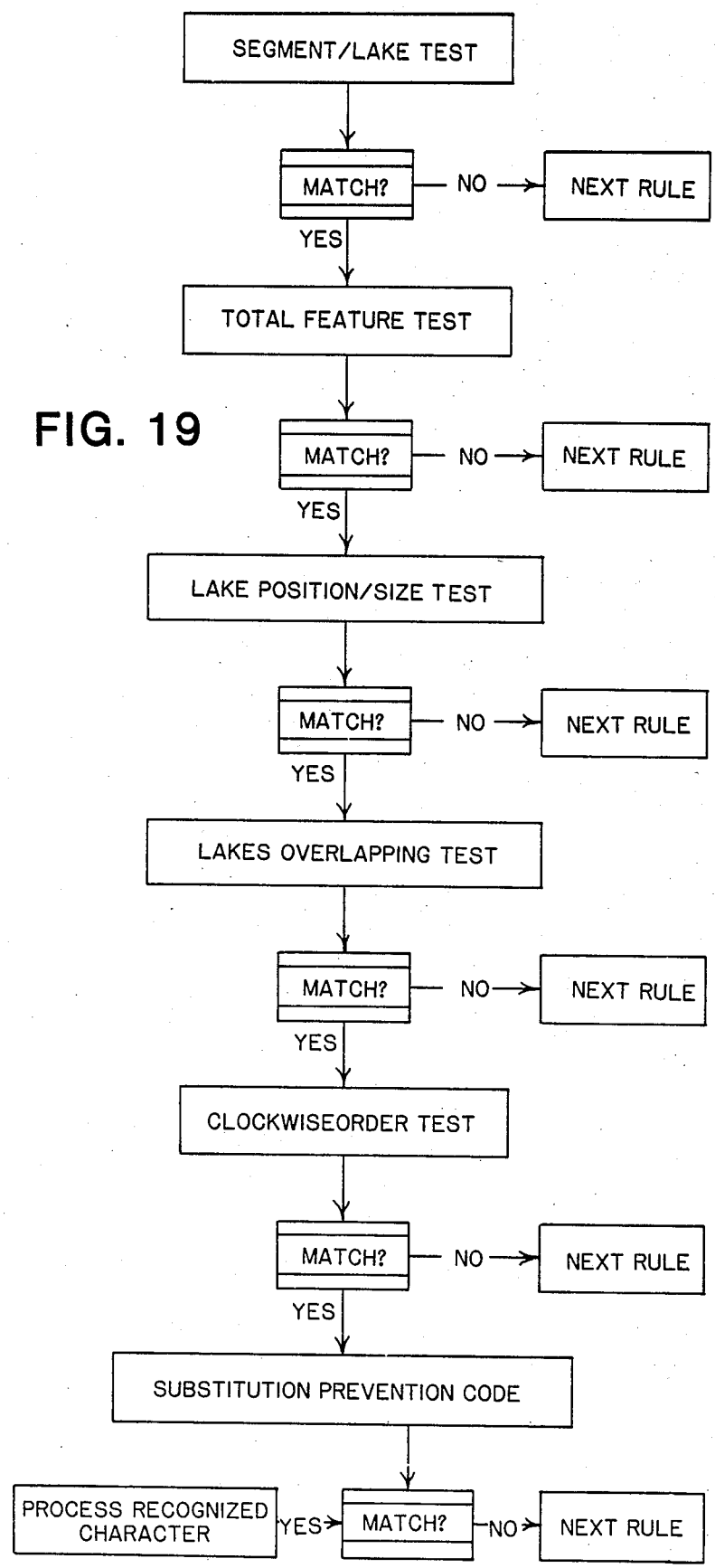
FIG. 19 is a flow chart for testing by a typical rule.

The fast "preliminary" tests are followed by more powerful and necessarily more time-consuming structural "clockwise order" tests and, if required, substitution prevention code. The flow chart for a typical rule is given by FIG. 19 with the code for the rule of FIG.

19 being shown on FIG. 20. In the case of a multi-segment character, each segment is tested by a separate set of tests including a "clockwise order" test.

To further discuss the "clockwise order" test, the basic test within every rule is a structural clockwise order test that replaces the parsing procedure in the syntactical approach to patter recognition which has characterized the prior art. In the prior art, using the decision theoretic approach, identification of characters was attempted by simply testing for the presence or absence of certain geometric and/or topological features. In accordance with the present invention, identification of characters is based on the testing for the presence of desired geometrical features in a defined sequence of occurrence on the boundary. Additionally, the testing procedure may include checks for certain undesired features between the desired features on the boundary. Further, in accordance with the invention, features are tested to insure that they are within a range of values.

Figures 21A, 21B:
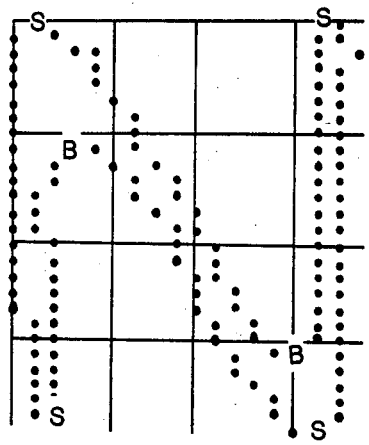
FIGS. 21A and 21B depict a character "image" and its feature list.

A "clockwise order" test as employed in the practice of the present invention may be understood by consideration of FIGS. 21A and 21B which respectively comprise the "image" of the character "N", as outputted from line memory with features indicated, and a list of these features. Any imaginable character "N" may be described by the feature list of FIG. 21B bearing in mind that the features and feature attributes have to be relaxed in order to accommodate position, direction and style variations. Starting from the lower bay (B X3, Y3, N), this bay might have any x and y position and a N, NE, or NW direction depending on the orientation of the character. Thus, the expected range for the bay is B;/X0123,Y0123;/N,NE,NW (type; position; direction). Moving along the character's periphery in the clockwise direction, the next feature encountered is a spur, namely :S;/X3,YO;N. This spur might be a stub, if the end of the stroke is short, and have x position 2, y position 1 and NE or NW direction. Thus, a general description of spur S;/X3,YO;/N is S(T); X23,YO1;/N-,NE,NW. Proceeding in this manner, a general structural description of the character "N" may be given as follows:

| B | X0123 | Y0123 | N,NE.NW |
| S(T) | X23 | Y01 | N,NE,NW |
| S(T,W,C) | X23 | Y23 | S,SE,SW |
| B | X0123 | Y0123 | S,SE,SW |
| S(T) | X01 | Y23 | S,SE,SW |
| S(T,W,C) | X01 | Y01 | N,NE,NW |

Using the range testing code and the mask/test technique, every entry in the immediately above table can be represented by a pair of mask and test words. The "clockwise order" test is a microcoded routine which makes a comparison of an actual feature list for an inputted character and a given list of mask/test words in clockwise order. If certain features in the feature list fall within a pre-specified range and the number of features in the feature list is more or less equal to the number of entries in the "clockwise order" table, the character is considered to be accepted by the "clockwise order" test. For example, the character "N" is accepted by "clockwise order" test defined in the above table. However, in many cases some sub-set of a character's feature list fits a given "clockwise order" test despite the fact that the character is not described by the given test. For example, the character "W" with the following feature list:

| (C;/X1,Y0;/N) | (B;/X2,Y3;/N) | (S;/X3,Y0;/NE) | (W;/X2, Y3;/SP) |
| (B;/X1,Y2;/S) | (T;/X0,Y3;/SW) | (S;/X0,Y0;/NW) | B,X0, Y2,N, | will be accepted by the "clockwise order" test for the character "N" given by the above table. Accordingly, a special "clockwise order" test with "undesirable" features will be performed. A feature which is supposed to be reliably present in a character is called desirable or skeletal. Microcoded tests may be employed to detect one or two undesirable features between every two desirable features. An undesirable feature is expected to be reliably absent in the rule prototype, i.e., the prototype for which the rule has been designed. If some feature of the input character matches a certain undesirable feature in the "clockwise order" test, the character is rejected. For example, the undesirable feature (B;X0123 Y0123; any direction) can be chosen between the last and first entries in above feature list table for the character "N" in order to reject character "W". This "undesirable" feature is reliably absent in "N".

Two types of "clockwise order" test which include undesirable features have been developed. One of these tests allows for detection of undesirable feature between every two desirable features while the other allows detection of two undesirable features between every two desirable features. A "dummy" feature is a pair of mask and test words for which no possible summary word exists. In other words, the "dummy" mask applied to any summary word is never equal to the "dummy" test. In one reduction to practice, 0 and 100000 are used for "dummy" mask and "dummy" test respectively. An example of "clockwise order" test with one dummy feature, feature (6), and five undesirable features for the character "R" is shown on FIG. 19. The dummy feature can be easily replaced with an undesired feature.

As explained above, the summary word form and the list of summary words permit efficient matching of an input pattern against a series of stored prototype patterns. The prototype patterns are stored as combinations of tests with pre-specified mask and compare words, along with specialized in-depth testing code. The input patterns are stored as feature summary word lists and detailed feature lists. The character peripheries that are stored as move code sequences are also available to the classification code when needed. The testing to ascertain whether a given feature (or combination of features) falls within a desired range in order to match a stored pattern is carried out by several types of tests which have been put into Recognition Processor microcode. Some of the more commonly used tests are the 1. CSWORD test, or check summary word test,
2. CSWLST test, or check summary word list test,
3. CLOKAL test, or clockwise order test without undesired features,
4. CLOKU1 test, or clockwise order test with one undesired feature possible between desired features, and
5. CLOKU2 test, or clockwise order test with two undesired features permitted between adjacent desired features.

Figure 24:
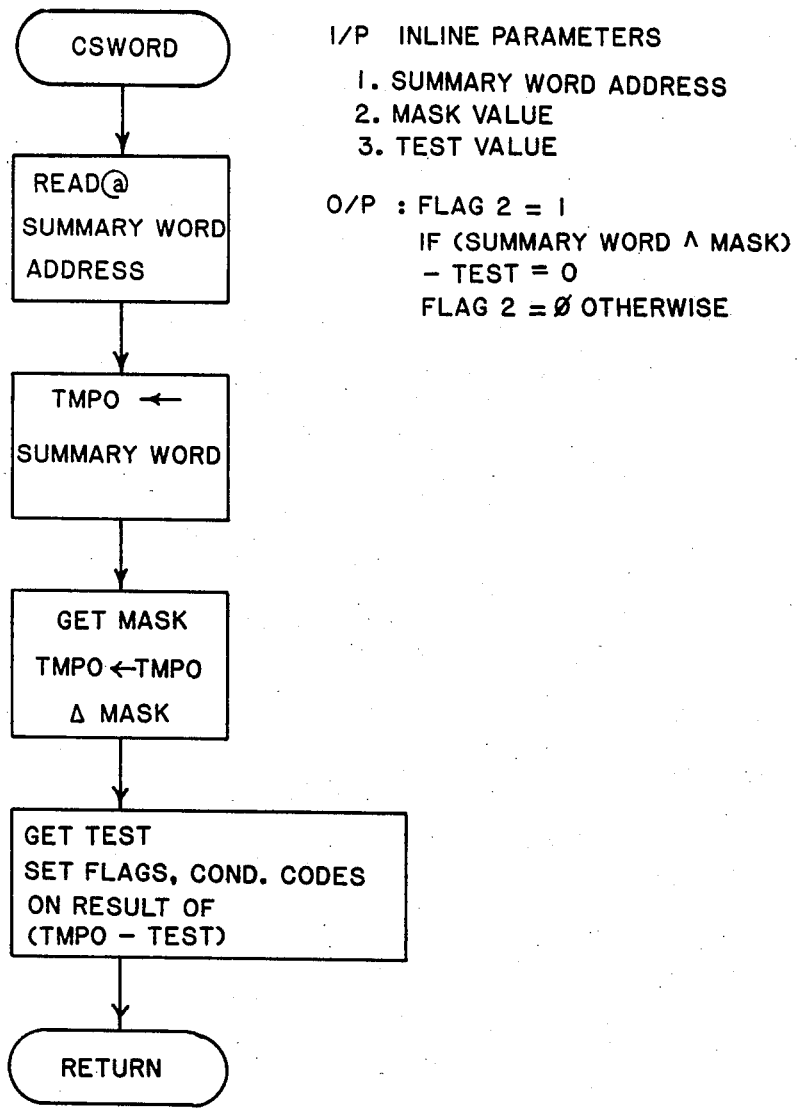
FIG. 24 is a flow chart for a summary word routine.

The operation of the simplest of these tests may be understood by reference to FIG. 24, which contains a flow chart diagram of the algorithm for this test, designated a Check Summary Word test or CSWORD test. As well, the figure has a representation of the section of Recognition Processor memory which contains the operation code for CSWORD.

The required input parameters for the routine CSWORD are stored in the Recognition Processor memory in the locations immediately following the CSWORD operation code. The parameters are:

1. the address of the summary word in Recognition Processor memory,
2. the mask word to be employed by this test, and
3. the compare word to be employed by this test.

The summary word is first loaded into a temporary storage location (TEMPO) after which, the logical product (bit by bit AND operation) of the mask word and the contents of the TEMPO location is stored back into TEMPO. Subsequently, the compare word is subtracted from the contents of TEMPO and the Recognition Processor Flag bits and Condition Codes are set according to the outcome of this subtraction. If the test word matches the contents of the temporary location, Flag #2 is set and the CSWORD test is considered to have been satisfied.

Figure 25:
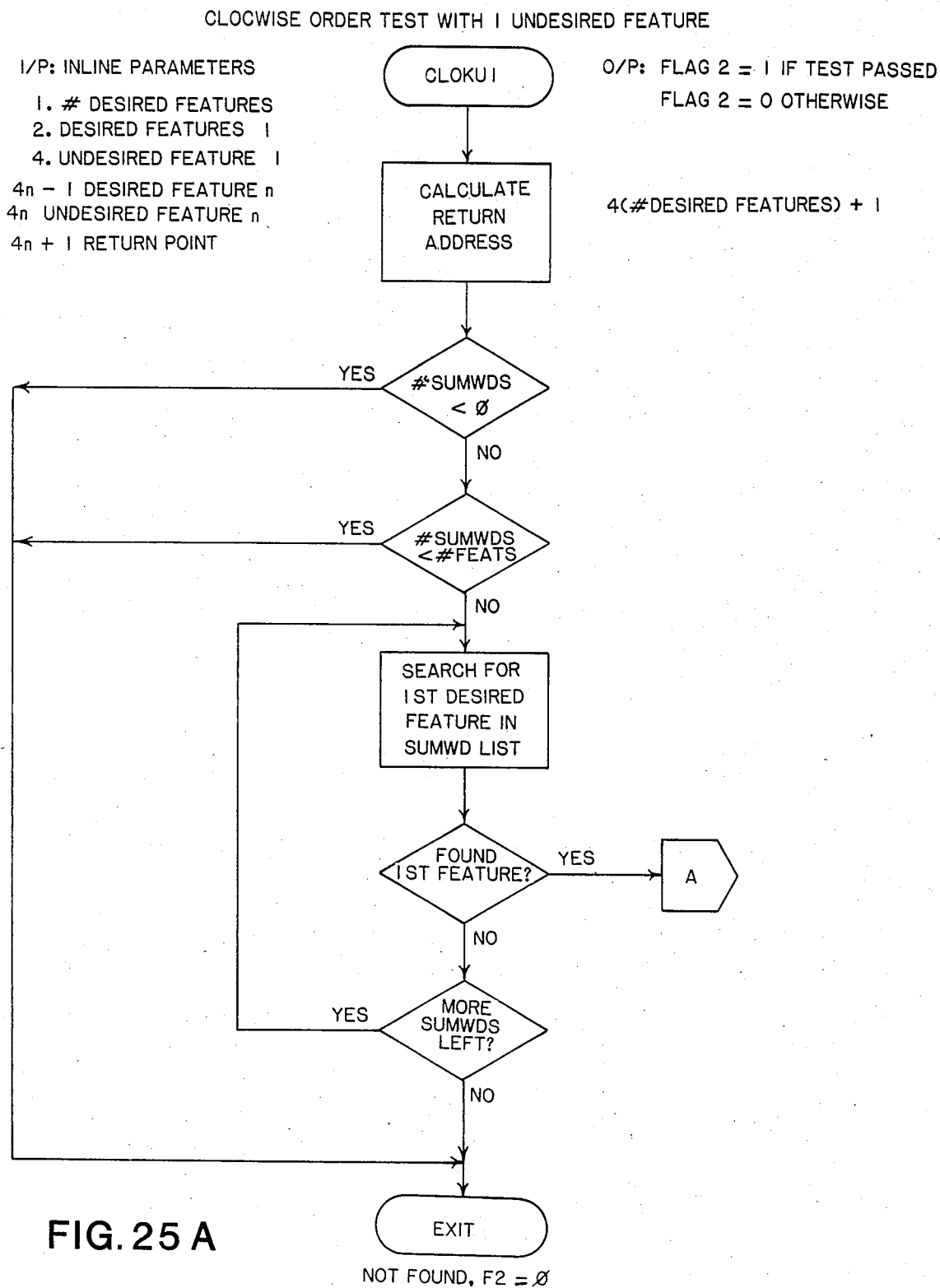
FIGS. 25A, B and C comprise a flow chart for a feature test with "undesired" features included.
Figure 25B:
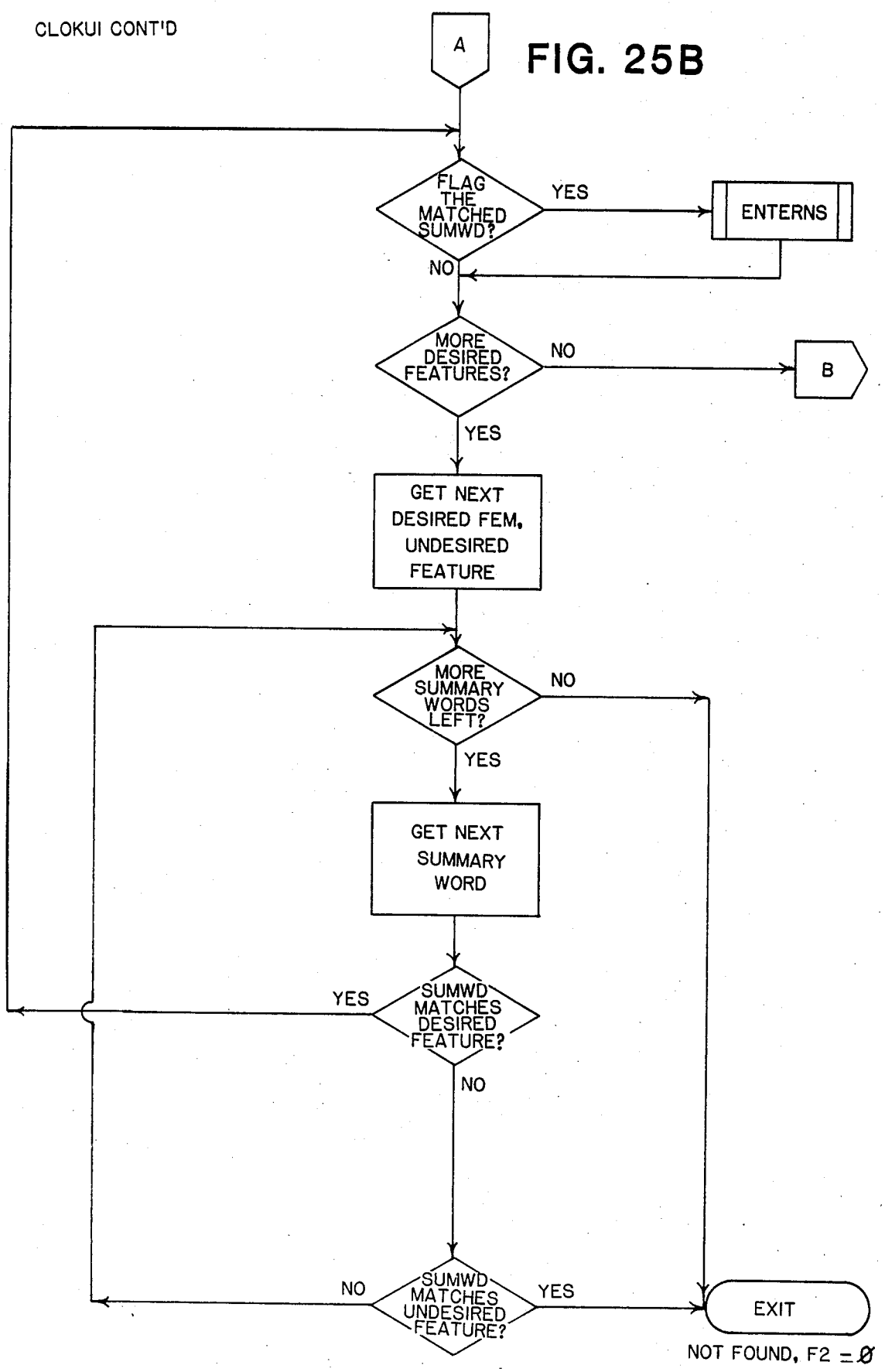
Figure 25C:
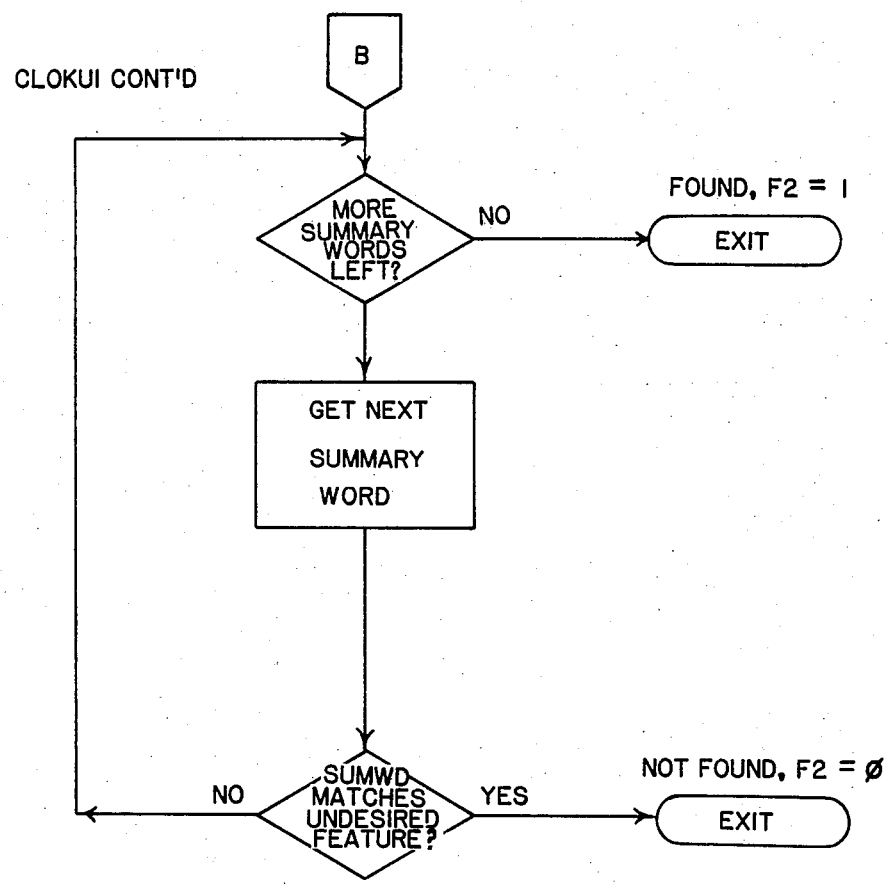

A test that is typical of the more complicated clockwise order type of tests may be understood by reference to FIGS. 25A and B which is the flow chart (and representation of relevant Recognition Processor memory) for the clockwise order test with one undesired feature (CLOKU1). The purpose of this test is to ascertain whether a given set of features is present on the boundary of a segment or lake, and whether these features are present in a specific clockwise order. As well, this test has the capability to generate a mismatch condition if a feature on the boundary which is between two desired features matches a specified "undesired" feature. An additional capability of this test is its ability to specify which desired features should be "tagged" or identified for use in further in-depth testing procedures. This combination of capabilities results in a very powerful technique for the selection of patterns which are more carefully constrained than would be the case if the entire set of features were merely required to be present in any order on the boundary of the character, possibly with many other features present.

The input parameters for this test are the address of the summary word list, the number of desired features on the boundary, the mask words and the compare words for the desired features, and the mask words and the compare words for the undesired features. A register (R10) in the Recognition Processor is used to hold the address of a memory location which contains the address of the summary word list. The number of desired features, and the mask and compare words for desired and undesired features, are stored in the locations of the Recognition Processor memory that follow the CLOKU1 operation code.

The CLOKU1 test first ensures that the number of desired features is less than or equal to the number of summary words in the summary word list. Next, a search of the summary word list is made for a match to the first desired feature. If no match is found among the stored summary words, the test fails and flag 2 is cleared. Execution continues at the location following the list of parameters for the test. If a match if found, the CLOKU1 microcode checks the bit which is used to indicate whether this is a feature for which additional testing needs to be done. If the indicator bit is set, the microcode jumps to a special section which contains the instructions to store the entry number of the chosen feature; that is, its sequence number in the list of stored summary words.

Following the check of the indicator bit, CLOKU1 determines whether there are additional desired features which must be processed. If there are, the mask and compare words for the next desired and undesired features are loaded into temporary storage locations. If there are additional summary words, CLOKU1 checks to see if the next summary word matches the desired feature, or if not, whether it matches the undesired feature. A match to the desired feature causes a loop to the point of the check of the indicator bit. A match to an undesired feature causes a fail of the test. Likewise, if the list of summary words is exhausted without a match to a desired feature, the test fails.

As previously indicated, the basic part of every rule in classification code is a careful description of the character's shape by means of "clockwise order" test with, in most cases, or without undesirable features. In some rare cases it may be necessary, for substitution prevention, to use a test in the "negative" sense. That is, for a character to be accepted, the expected answer for the test is negative. Among those tests which can be applied in a negative mode are a search for a feature of certain type, a search for given numbers of features of certain type and a "clockwise order" test without undesired features.

As briefly noted above, in certain difficult cases the set of features may be insufficient to enable distinction between two or more apparently different characters i.e., two different characters which appear structurally identical. In such situations special algorithms which operate directly on the chain code rather than on the set of identified features are employed. For example, the characters "U" and "V" are often written in a nearly indistinguishable form. A calculation based on the sharpness of internal or external angle, or calculations of the ratio of area enclosed to the character size, is necessary to resolve this situation. In general, for every two conflict characters the recognition decision is based on a calculation of certain geometrical parameters of the character shape and on a comparison of those parameters with heuristically determined thresholds.

As a general rule, there are two possibilities for making a decision based on comparison with a threshold. Every character under consideration belongs either to class 1, i.e., a decision parameter greater than the threshold, or class 2, a decision parameter less than or equal to the threshold. In addition to this "binary decision", a pair of thresholds may be determined and a character considered to be belonging to class 1 if the decision parameter is more than the first threshold and as belonging to class 2 if the decision parameter is less than the second threshold. If the value of the decision parameter happens to be between the values of thresholds then the character is considered as ambiguous. In accordance with a preferred embodiment of the present invention, both approaches are used depending on the type of conflict pair. In the case when two thresholds are used, the rules for each prototype of the corresponding conflict pair are provided with the same substitution prevention code, but with different thresholds and inequality types.

Each entry in the "clockwise order" test is associated with a certain point on the periphery of the character. Each feature in the feature list for a given character is associated with one of 16 positions (4×4) and eight possible directions. If more precise information about a feature position and direction is required, such information may be obtained from the point of interest type list for the feature. A feature sometimes cannot be uniquely identified on the basis of its type, position and direction alone. However, that feature can usually be identified on the basis of the order of its occurrence. Thus, in order to identify the feature the "clockwise order" test must be flagged, i.e., the first bit in the mask word has to be set. The foregoing enables one to-one correspondence between the features identified during the "clockwise order" testing with the entires in the point of interest list.

Figure 22:
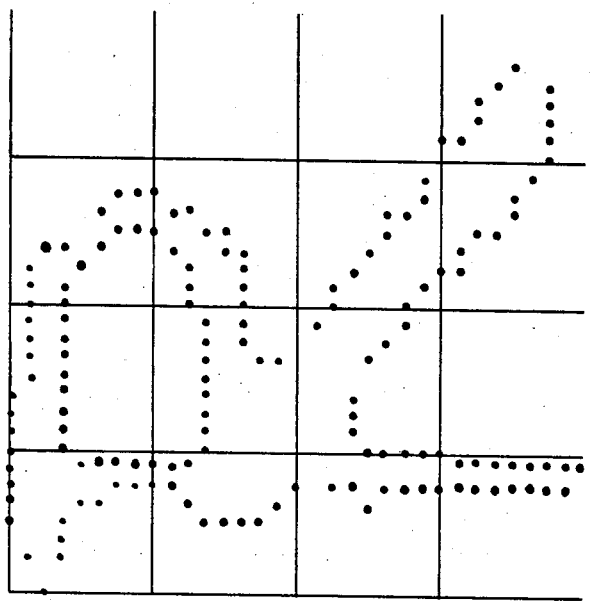
FIG. 22 is an example of a character with its associated rule lists.

The most common substitution prevention code is a comparison of the appropriate or two-dimensional distance between two points on the periphery of the character with a given threshold, i.e., a minimum or maximum distance between two "features". The distance between two points can be calculated directly in scan-units using feature extraction logic, as described above, or can be converted to a normalized form by the recognition processor. The normalization can be done with respect to the height, width, diagonal or some other measure of the character box. As an example, as depicted in FIG. 22, the characters "H" and "N" are structurally identical, i.e., they have identical sets of features in clockwise order. However, the visible difference between them can be determined by means of the relative positions of the bays. In the character "H", the bay facing North has to be higher than the bay facing South while the opposite is true for the character "N". In the example being described, the distance between two bays along the Y axis for character "H" has to be more than 0, i.e., the lower bay is considered to be the first one, the upper bay is the second one, the Y axis is directed from the North to the South and there is a heuristically determined threshold.

Figure 23:
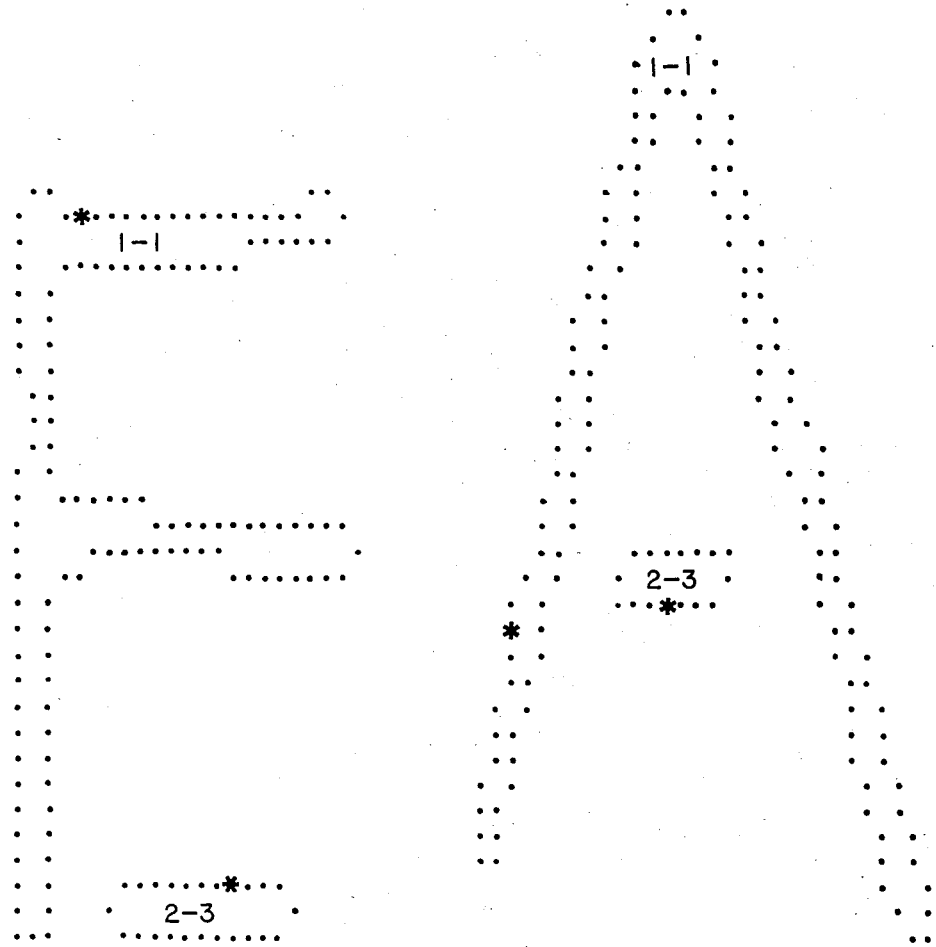
FIG. 23 is an example of two further character images depicting trace sequences.

Another example is shown in FIG. 23 which depicts possible "images" of the characters "4" and "X". In order to distinguish between the two characters of FIG. 23, these characters having structurally identical sets of features, the angle between features No. 1 and 5 is checked. For the character "X" this angle has to be about 180° while for the character "4" this angle may be between approximately 45°, and 135°.

In order to enable distinction between such pairs of characters as "9" and "4", "U" and "V" and "O" and "D" determination of the straightness of a line is required. A special routine which utilizes the feature extraction logic deviation computation is available to calculate a deviation of a contour from a straight line between two given points on the periphery of a character. The area enclosed between the boundary trace and a straight line connecting two given points is computed, normalized to the square of the distance between these points and may be compared with a threshold value.

An end of a stroke is usually described by the type of feature called a "spur" or a "stub". There are a number of different shapes for the end of stroke which are represented as a "spur" after feature extraction. It is often necessary to distinguish these spurs in order to prevent substitution. For example, an "H" and an "M" without a convexity at the middle or a "9" and an "8" with the bottom lake filled in are often difficult to classify. However, the spurs at the top are different for an "H" and a "M" while the "spurs" at the bottom are also often different for "9" and "8". A routine which analyzes the increasing thickness of a stroke starting from the point with maximal curvature may be employed. The successive distances between the opposite points on the sides of the strokes contour are calculated by the feature extraction logic and all the increments until the predetermined end point are summed. The start and the end points are flagged in the "clockwise order" test. The sum of the increments is normalized to the distance between the start and the end points and compared with a threshold value.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An identification process comprising the steps of:
    storing information commensurate with at least a portion of the boundary of an object to be identified;
    analyzing the stored information to ascertain the location of points on the object boundary which meet preselected curvature conditions, at least some of said ascertained points being points of peak curvature which lie within regions of preselected length and curvature on the object boundary;
    further analyzing the stored information to determine the geometric shape of the object boundary regions adjacent to the ascertained points;
    identifying each of the analyzed boundary regions as a feature of a preselected set of features on the basis of geometric shape;
    additionally analyzing the stored information to determine the position relative to the object as a whole of each identified feature;
    also analyzing the stored information to determine the direction of each feature relative to a predetermined orientation;
    preparing a range testable encoded description of the said object boundary portion in the entirety;
    preparing a range testable encoded description at the identified features on the said boundary portion and their interrelationship;
    generating a series of generalized descriptions which define the geometric shape of all probable permutations of the objects to be recognized, said generalized descriptions including both desired and undesired features and being in the said range testable code;
    comparing the encoded descriptions with generalized descriptions of the series of generalized descriptions; and
    noting the identify of the object when the encoded descriptions match a generalized description.

2. The method of claim 1 wherein the object to be identified is a pattern and wherein the step of storing the information comprises:
    creating a binary two-dimensional representation of the pattern; and
    generating and storing signals commensurate with the directional changes between adjacent points which comprise the binary representation of the pattern as the boundary of the pattern representation is traced in a first direction.

3. The method of claim 2 wherein the step of generating and storing signals commensurate with directional changes comprises:

tracing the boundary of a first segment of the pattern and generating an encoded chain signal commensurate with the changes in direction required for tracing;

determining if the pattern contains a second segment or a region entirely enclosed within a previously traced segment;

tracing the boundary of any second segment and of any such enclosed region and generating an encoded chain signal commensurate with the changes in direction required for tracing; and storing the encoded signals commensurate with the traced segments and enclosed regions in separately accessible memory locations.

4. The method of claim 1 wherein the step of generating a series of generalized descriptions comprises:

producing a series of questions and answers which represent all common topologically unique prototypes of all expected objects.

5. The method of claim 3 wherein the step of comparing comprises:

testing the encoded description of the entire pattern boundary against generalized descriptions comprising the number of segments and enclosed regions and, said generalized descriptions also comprising the number of features identified; and testing the encoded description of the identified features and their interrelationships against generalized descriptions comprising desired features in sequential order with at least some of the desired features being separated by at least a first undesired feature.

6. The method of claim 6 wherein the step of creating a binary two dimensional representation comprises:

producing an image of a portion of a document, the image including at least a first pattern to be identified; and digitizing and storing the image.

7. The method of claim 6 wherein the steps of tracing comprise:

scanning the digitized image to locate a transition between the two binary levels.

8. The method of claim 3 wherein the step of generating a series of generalized descriptions comprise:

producing a series of questions and answers which represent all common topologically unique prototypes of all expected patterns.

9. The method of claim 8 wherein the step of comparing comprises:

testing the encoded description of the entire pattern boundary against generalized descriptions comprising the number of segments and enclosed regions and comprising the number of features identified; and testing the encoded description of the identified features and their interrelationships against generalized descriptions comprising desired features in sequential order with at least some of the desired features being separated by at least a first undesired feature.

10. The method of claim 9 wherein the step of creating a binary two dimensional representation comprises:

producing an image of a portion of a document, the image including at least a first pattern to be identified; and digitizing and storing the image.

11. The method of claim 10 wherein the steps of tracing comprise:

scanning the digitized image to locate a transition between the two binary levels.

12. A process for the identification of a pattern imprinted upon a document comprising the steps of:

creating and storing a binary two dimensional representation of an image of a pattern to be identified;

completely tracing the exterior boundary of the stored image representation in a first direction, the trace thus encompassing boundary regions having curvature;

identifying regions on the traced boundary which have a curvature which satisfies preselected criteria including magnitude and type, regions of convex curvature being identified by detecting points of peak curvature therein;

classifying each identified region on the basis of geometric shape;

determining the orientation of each classified region relative to a predetermined coordinate system;

preparing and storing a range testable encoded description of the boundary of the pattern to be identified as a function of the shapes of the identified regions, their orientation and their relative position on the traced boundary;

generated and storing a compact range testable description of each topologically unique prototype of each pattern to be identified, said prototype description including information commensurate with regions of both desired and undesired shape; and serially comparing the range testable encoded description of the boundary of the pattern to be identified with the prototype descriptions and noting the identify of the pattern when the descriptions match.

13. The method of claim 12 wherein the step of tracing comprises:

producing and storing a chain code description of the traced boundary, said chain code description being commensurate with the directional changes between adjacent points on the boundary of the stored image representation during the tracing thereof in the said first direction; and wherein the step of identifying regions comprises:

analyzing the chain code description to locate regions of convex curvature exceeding predetermined curvature limits;

further analyzing the located regions of convex curvature to determine the point of peak curvature therein; and storing the address of each point of peak curvature.

* * * * *